(12) United States Patent
LeBlanc et al.

(10) Patent No.: US 9,010,838 B2
(45) Date of Patent: Apr. 21, 2015

(54) SIDEWALL PANEL AND TARPAULIN COVER SYSTEM FOR FLAT BED TRAILERS, AND TRUCK TRAILER INCORPORATING SAME

(71) Applicants: Sheri LeBlanc, Windsor (CA); Tim DeMonte, Toronto (CA); Walt DeMonte, Windsor (CA)

(72) Inventors: Sheri LeBlanc, Windsor (CA); Tim DeMonte, Toronto (CA); Walt DeMonte, Windsor (CA)

( * ) Notice: Subject to any disclaimer, the term of this patent is extended or adjusted under 35 U.S.C. 154(b) by 0 days.

(21) Appl. No.: 13/663,746

(22) Filed: Oct. 30, 2012

(65) Prior Publication Data

US 2013/0168990 A1    Jul. 4, 2013

Related U.S. Application Data

(60) Division of application No. 12/462,844, filed on Aug. 10, 2009, now Pat. No. 8,303,017, which is a continuation-in-part of application No. 12/072,614, filed on Feb. 27, 2008, now Pat. No. 7,571,949, which is a division of application No. 11/486,958, filed on Jul. 14, 2006, now Pat. No. 7,350,842.

(60) Provisional application No. 61/152,814, filed on Feb. 16, 2009.

(51) Int. Cl.
| | |
|---|---|
| B62D 27/00 | (2006.01) |
| B62D 27/06 | (2006.01) |
| B62D 33/02 | (2006.01) |
| B62D 25/02 | (2006.01) |

(52) U.S. Cl.
CPC ............ *B62D 27/06* (2013.01); *B62D 33/0207* (2013.01); *B62D 33/0222* (2013.01); *B62D 25/02* (2013.01)

(58) Field of Classification Search
CPC .................................. B60J 7/10; B60J 7/185
USPC ............ 296/100.01, 100.11, 100.12, 100.15, 296/100.16, 100.18, 104, 105
See application file for complete search history.

(56) References Cited

U.S. PATENT DOCUMENTS

| | | | |
|---|---|---|---|
| 761,456 A * | 5/1904 | Dewes | ............................ 296/36 |
| 1,159,867 A | 11/1915 | Rands | |
| 1,226,159 A | 5/1917 | Allmand | |
| 1,944,440 A | 1/1934 | Lehman | |

(Continued)

FOREIGN PATENT DOCUMENTS

| | | | |
|---|---|---|---|
| DE | 3541812 C1 * | 3/1987 | |
| DE | 20305486 U1 * | 7/2003 | |

(Continued)

*Primary Examiner* — Glen Dayoan
*Assistant Examiner* — Paul Chenevert
(74) *Attorney, Agent, or Firm* — Carrier Blackman & Associates, P.C.; Joseph P. Carrier; William D. Blackman

(57) ABSTRACT

A cover system for a substantially flat support surface on a vehicle includes plural removable panels configured to be disposed at opposite lateral sides of the support surface, lower supports which support lower surfaces of the panels and upper rails which retains upper surfaces of the panels at the opposite lateral sides of the support surface. Edge portions of the panels are shaped to overlap with the edge portions of adjacent side panels such that outermost surfaces of the panels extend substantially continuously when the panels are operatively disposed at the opposite lateral sides of the support surface. Each of the panels includes retaining device selectively fixing a lower portion of the panel on the vehicle.

10 Claims, 63 Drawing Sheets

(56) References Cited

U.S. PATENT DOCUMENTS

| | | | |
|---|---|---|---|
| 2,329,791 A | 9/1943 | Sevison | |
| 2,428,731 A | 10/1947 | Abrams | |
| 2,465,621 A * | 3/1949 | Wheeler | 280/762 |
| 2,911,254 A * | 11/1959 | Schumacher | 296/100.15 |
| 2,979,788 A | 4/1961 | Richardson | |
| 3,231,305 A * | 1/1966 | Beckman | 296/100.12 |
| 3,273,296 A | 9/1966 | Soulon | |
| 3,511,408 A * | 5/1970 | Hughes | 160/329 |
| 3,665,646 A | 5/1972 | Niemanns | |
| 3,712,005 A | 1/1973 | Eschbach et al. | |
| 3,794,375 A | 2/1974 | Woodward | |
| 3,811,724 A | 5/1974 | Woodward | |
| 3,871,702 A | 3/1975 | Glassmeyer | |
| 4,018,480 A | 4/1977 | Stone | |
| 4,027,436 A | 6/1977 | Daly | |
| 4,036,521 A * | 7/1977 | Clenet | 296/100.15 |
| 4,042,275 A | 8/1977 | Glassmeyer et al. | |
| 4,067,601 A | 1/1978 | Tuerk | |
| 4,236,748 A | 12/1980 | Cloutier et al. | |
| 4,418,956 A | 12/1983 | Yamamoto et al. | |
| 4,523,784 A * | 6/1985 | Aspen | 296/100.15 |
| 4,657,062 A * | 4/1987 | Tuerk | 160/243 |
| 4,685,721 A | 8/1987 | Banerjea | |
| 4,789,196 A * | 12/1988 | Fields | 296/100.18 |
| 4,823,707 A * | 4/1989 | Salsbury et al. | 105/377.02 |
| 4,836,492 A * | 6/1989 | Kennedy et al. | 248/676 |
| 4,902,064 A * | 2/1990 | Tuerk et al. | 296/100.12 |
| 4,995,663 A * | 2/1991 | Weaver et al. | 296/100.11 |
| 5,007,672 A | 4/1991 | Koch | |
| 5,014,471 A | 5/1991 | Ballstadt | |
| 5,041,318 A | 8/1991 | Hulls | |
| 5,080,422 A | 1/1992 | DeMonte et al. | |
| 5,152,575 A | 10/1992 | DeMonte et al. | |
| 5,180,203 A * | 1/1993 | Goudy | 296/98 |
| 5,218,743 A * | 6/1993 | Miller | 24/68 CD |
| 5,320,396 A | 6/1994 | Petelka | |
| 5,403,063 A | 4/1995 | Sjostedt et al. | |
| 5,429,408 A * | 7/1995 | Henning et al. | 296/100.12 |
| 5,509,714 A | 4/1996 | Schmidt | |
| 5,528,864 A | 6/1996 | Jennings | |
| 5,584,527 A | 12/1996 | Sitter | |
| 5,706,753 A * | 1/1998 | Menne et al. | 114/361 |
| 5,758,922 A * | 6/1998 | Wheatley | 296/100.15 |
| 5,924,759 A | 7/1999 | DeMonte et al. | |
| 5,984,379 A * | 11/1999 | Michel et al. | 296/100.16 |
| 6,193,299 B1 * | 2/2001 | Than | 296/100.15 |
| 6,276,748 B1 | 8/2001 | Gobessi et al. | |
| 6,322,127 B1 | 11/2001 | Masterson et al. | |
| 6,435,599 B2 * | 8/2002 | Than | 296/143 |
| 6,478,308 B1 | 11/2002 | McMillin et al. | |
| 6,931,798 B1 | 8/2005 | Pocai | |
| 6,976,433 B1 * | 12/2005 | Neumann | 105/377.03 |
| 7,219,477 B2 | 5/2007 | Leffler | |
| 7,299,597 B2 | 11/2007 | Holt | |
| 7,520,558 B2 * | 4/2009 | Conny et al. | 296/185.1 |
| 7,658,578 B1 * | 2/2010 | Weibl | 410/97 |
| 7,823,957 B2 * | 11/2010 | Williamson et al. | 296/100.16 |
| 8,146,982 B2 * | 4/2012 | Williamson et al. | 296/100.16 |
| 2002/0063439 A1 * | 5/2002 | Bouchard | 296/100.18 |
| 2007/0204553 A1 | 9/2007 | Bunker, II | |
| 2010/0007164 A1 | 1/2010 | Harrison | |

FOREIGN PATENT DOCUMENTS

| | | |
|---|---|---|
| EP | 0 310 157 A1 | 4/1989 |
| EP | 0 412 802 A1 | 2/1991 |
| EP | 825049 A1 * | 2/1998 |
| FR | 2914885 A1 * | 10/2008 |
| GB | 2 241 516 A | 9/1991 |
| JP | 58-161635 A | 9/1983 |
| JP | 4108932 A | 4/1992 |

* cited by examiner

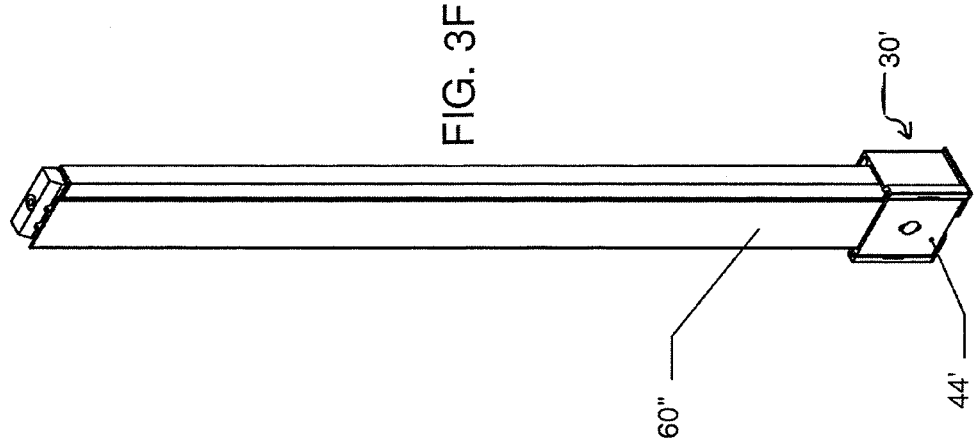

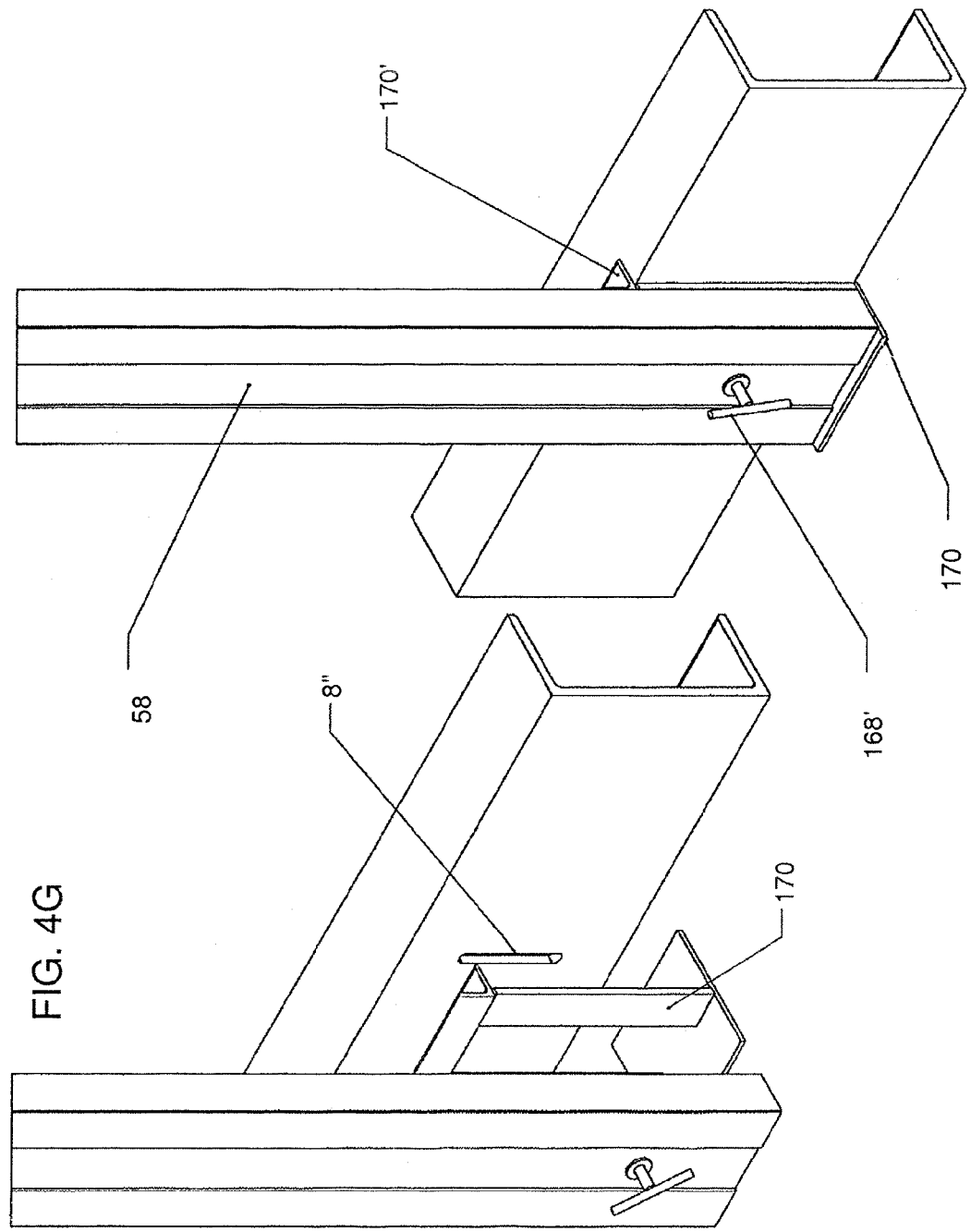

FIG. 7A
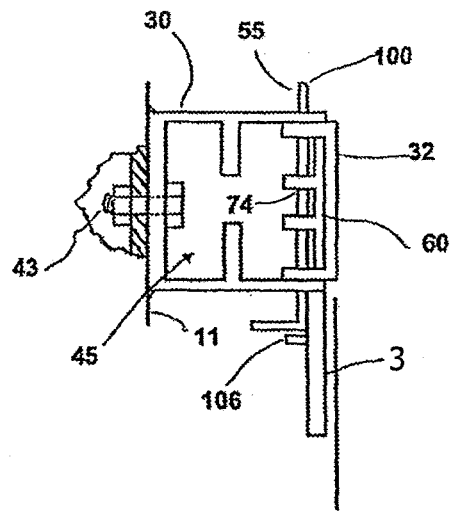
FIG. 7B
FIG. 7C
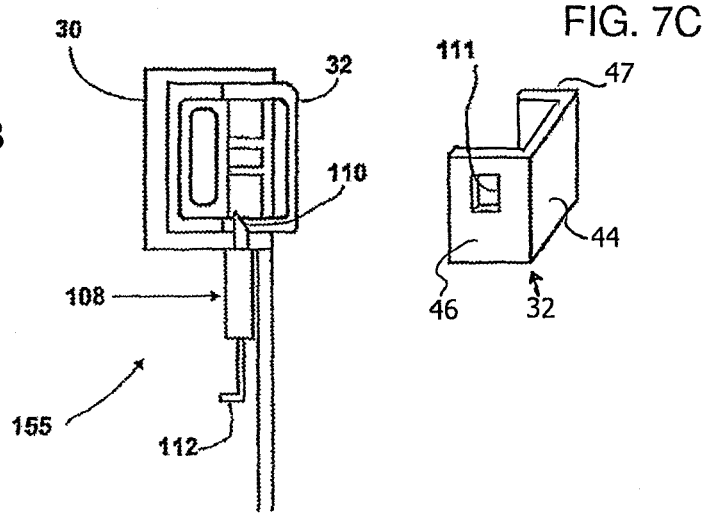

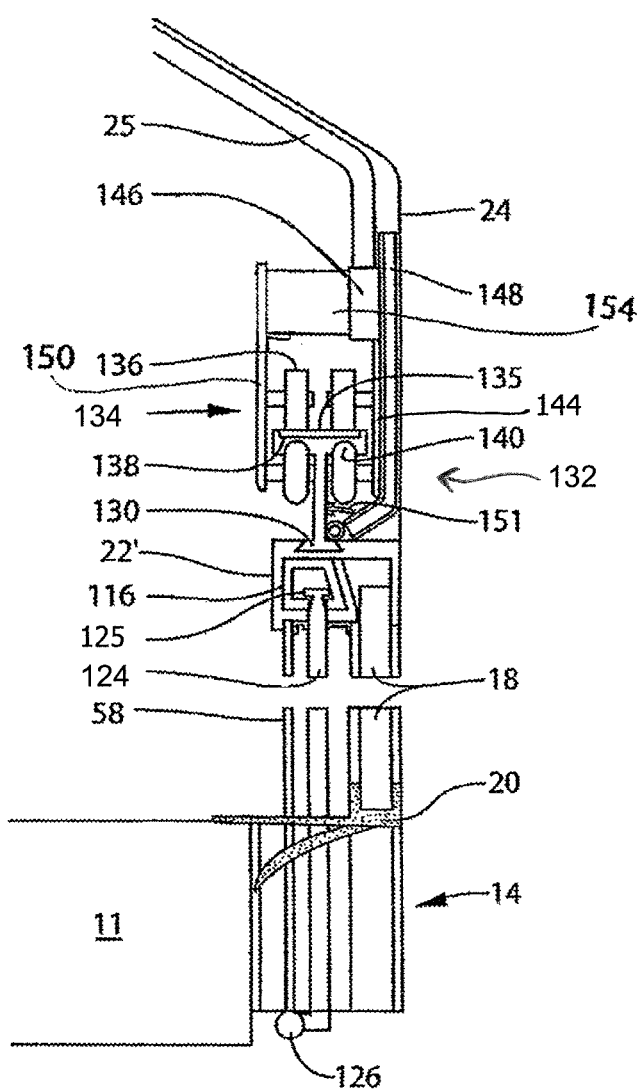

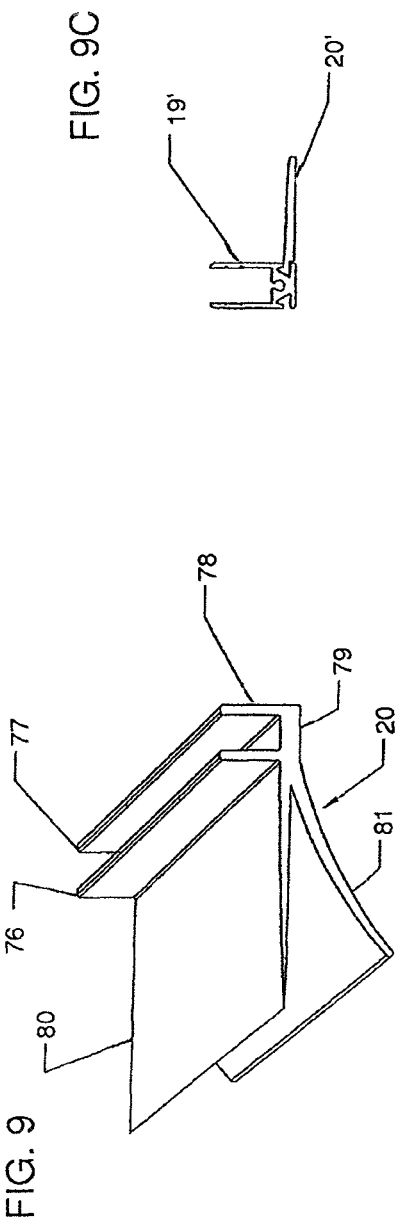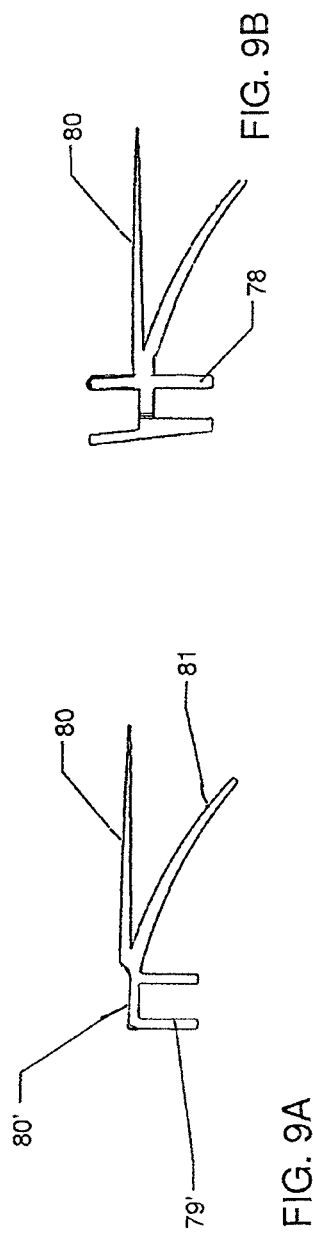

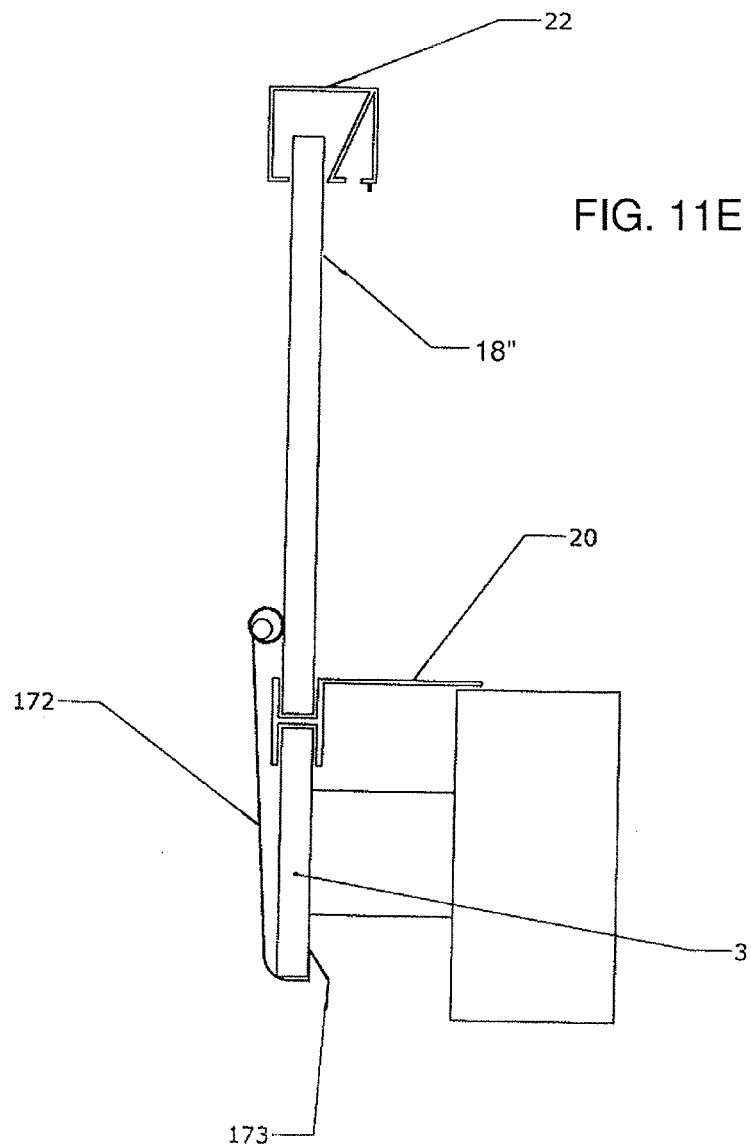

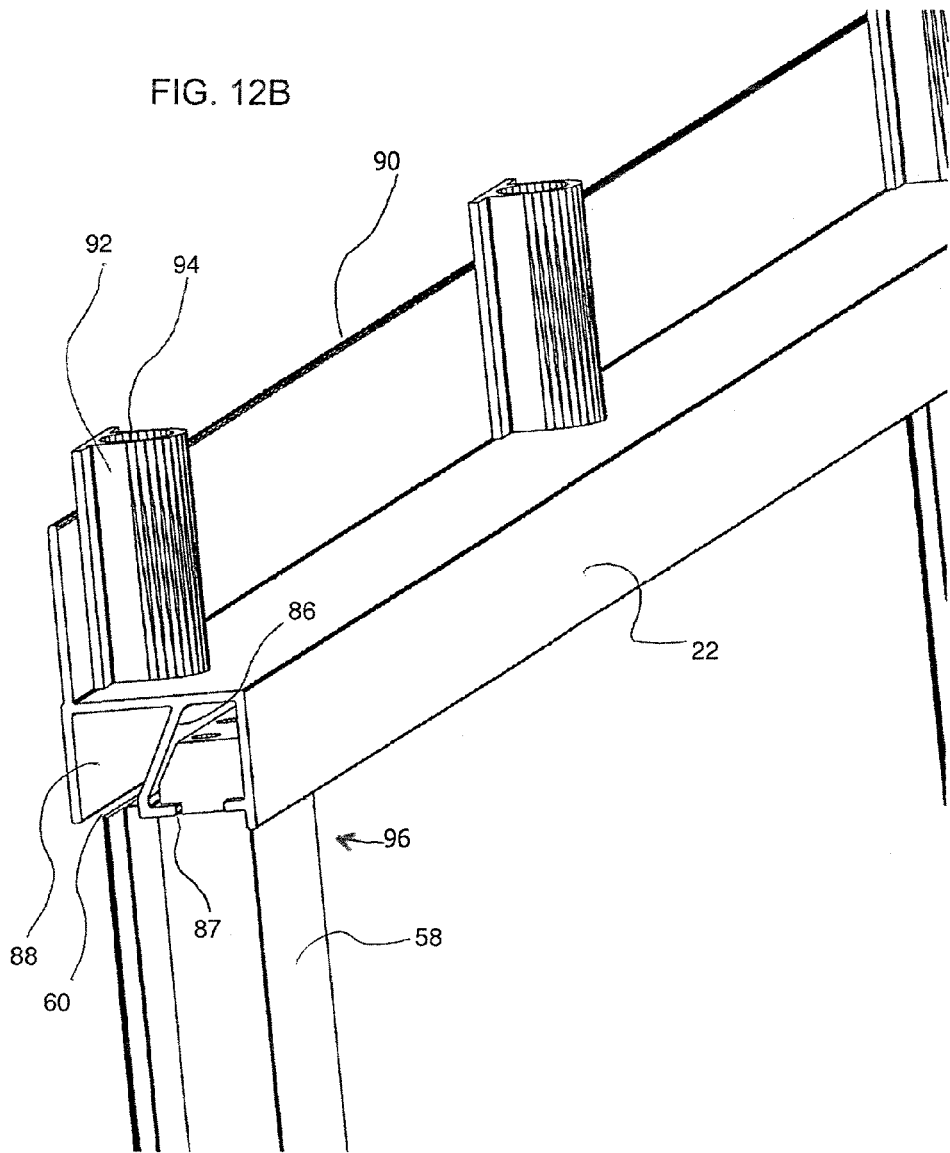

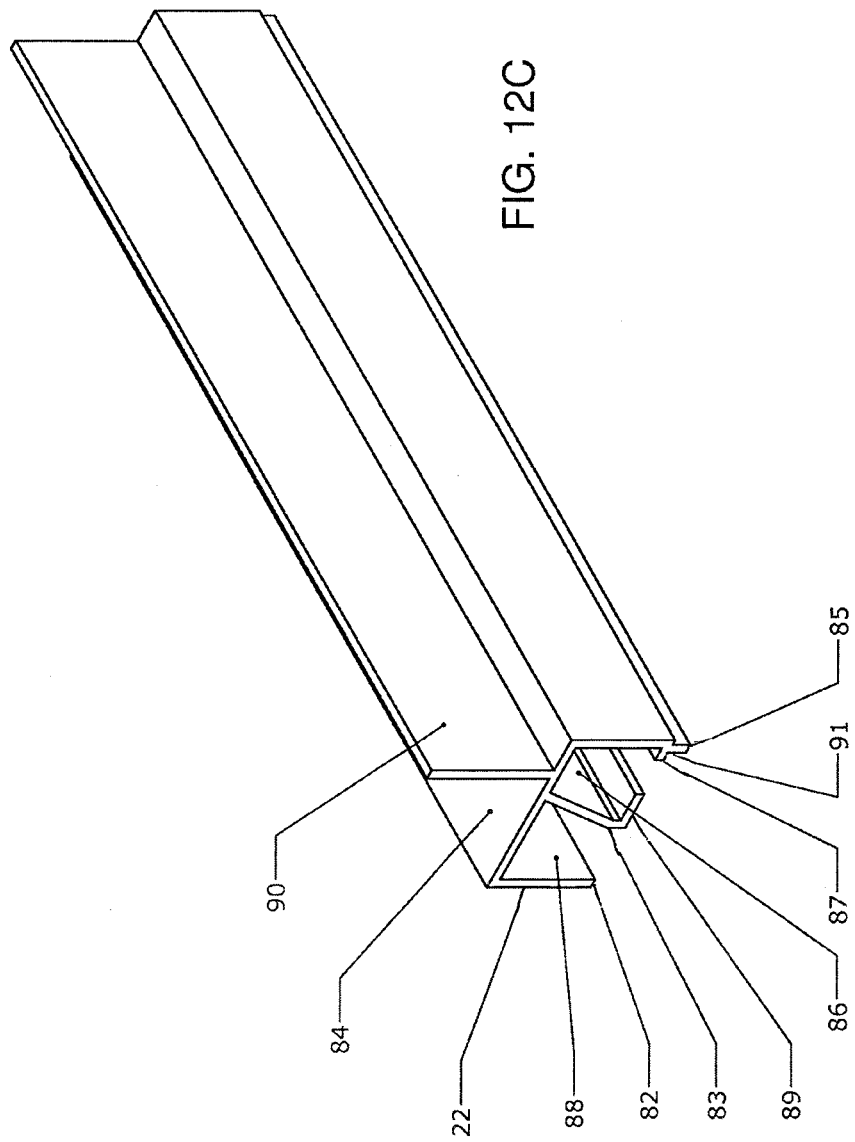

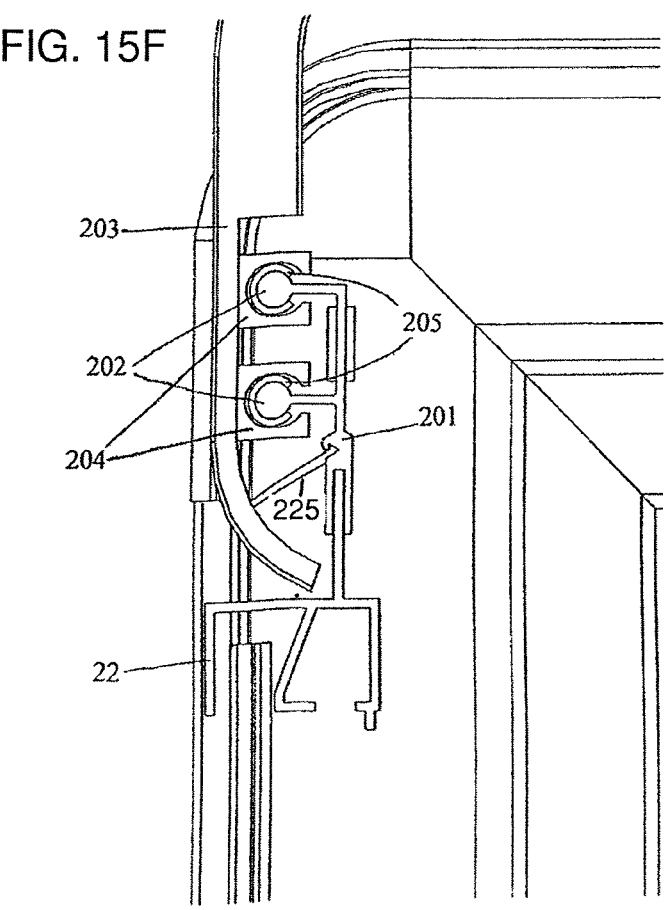

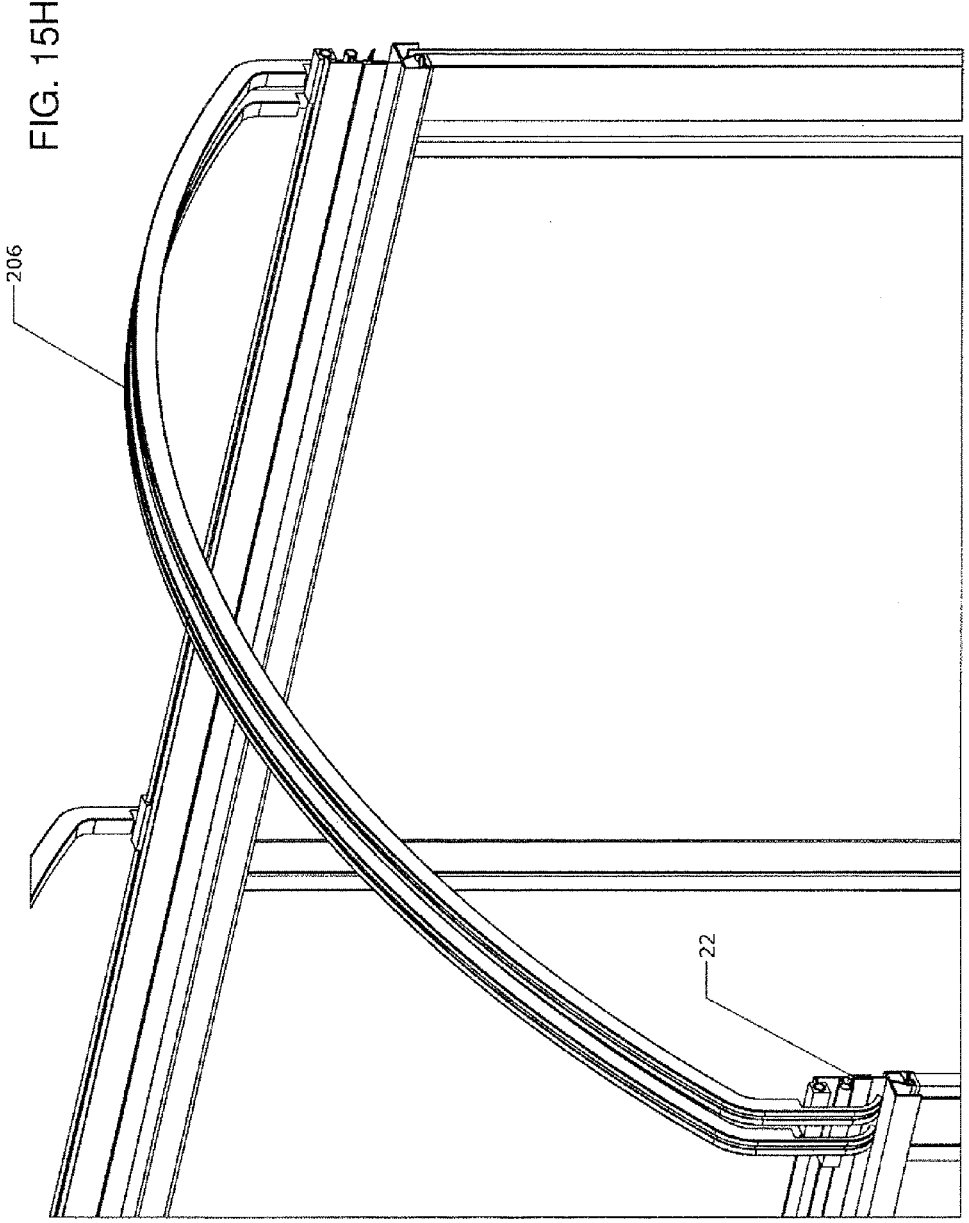

A + C   Run on outside

B + D   Run on inside

To achieve Total Compaction

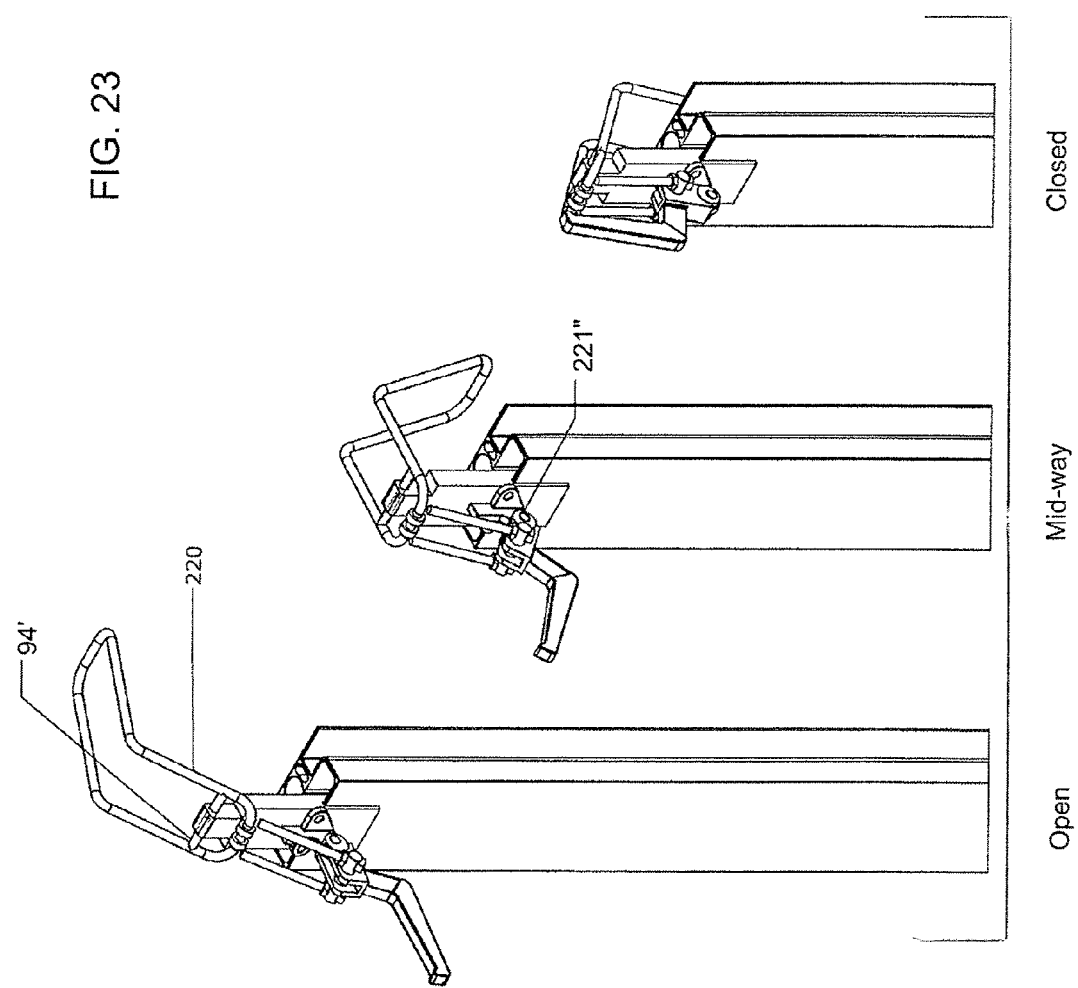

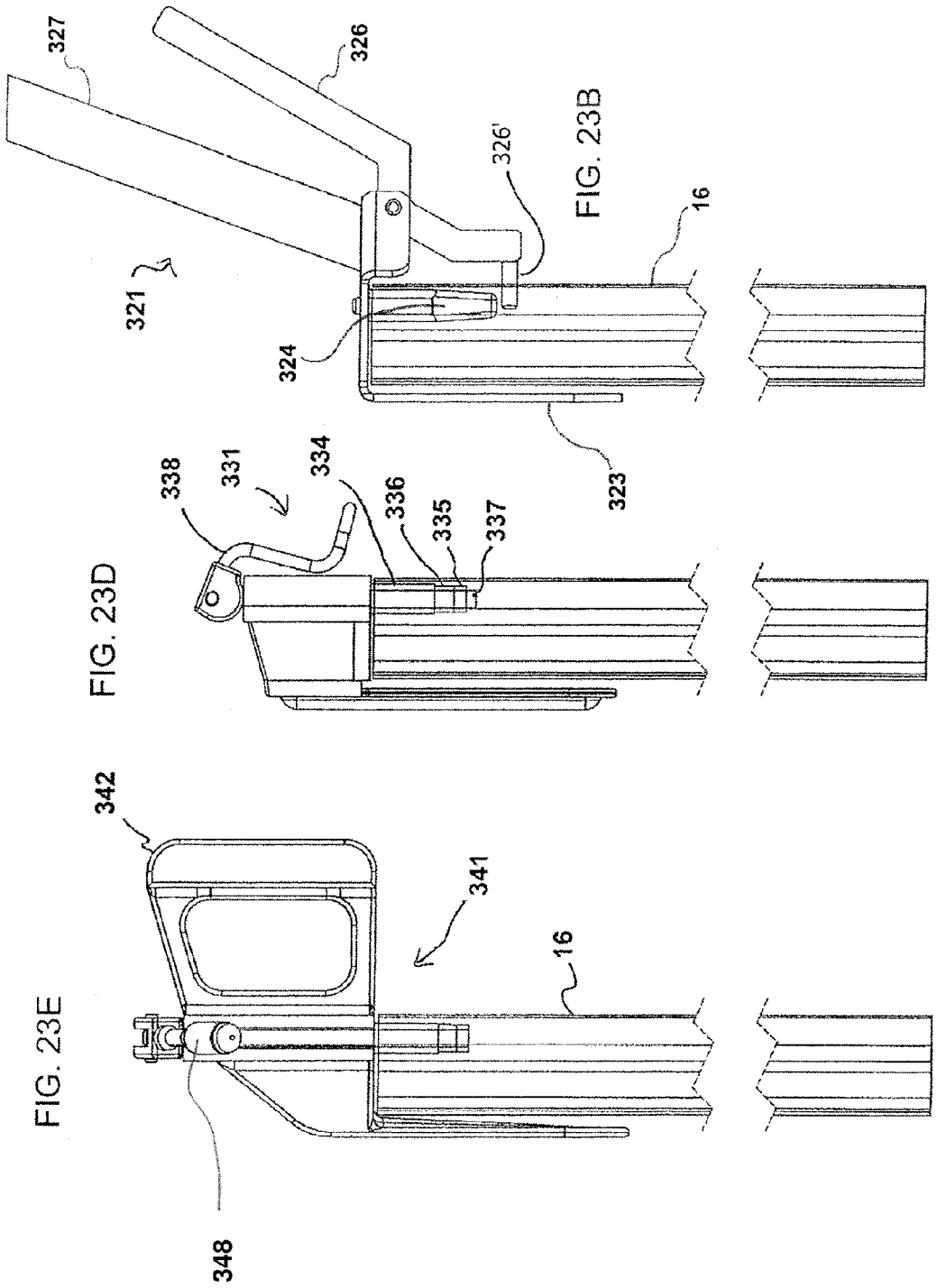

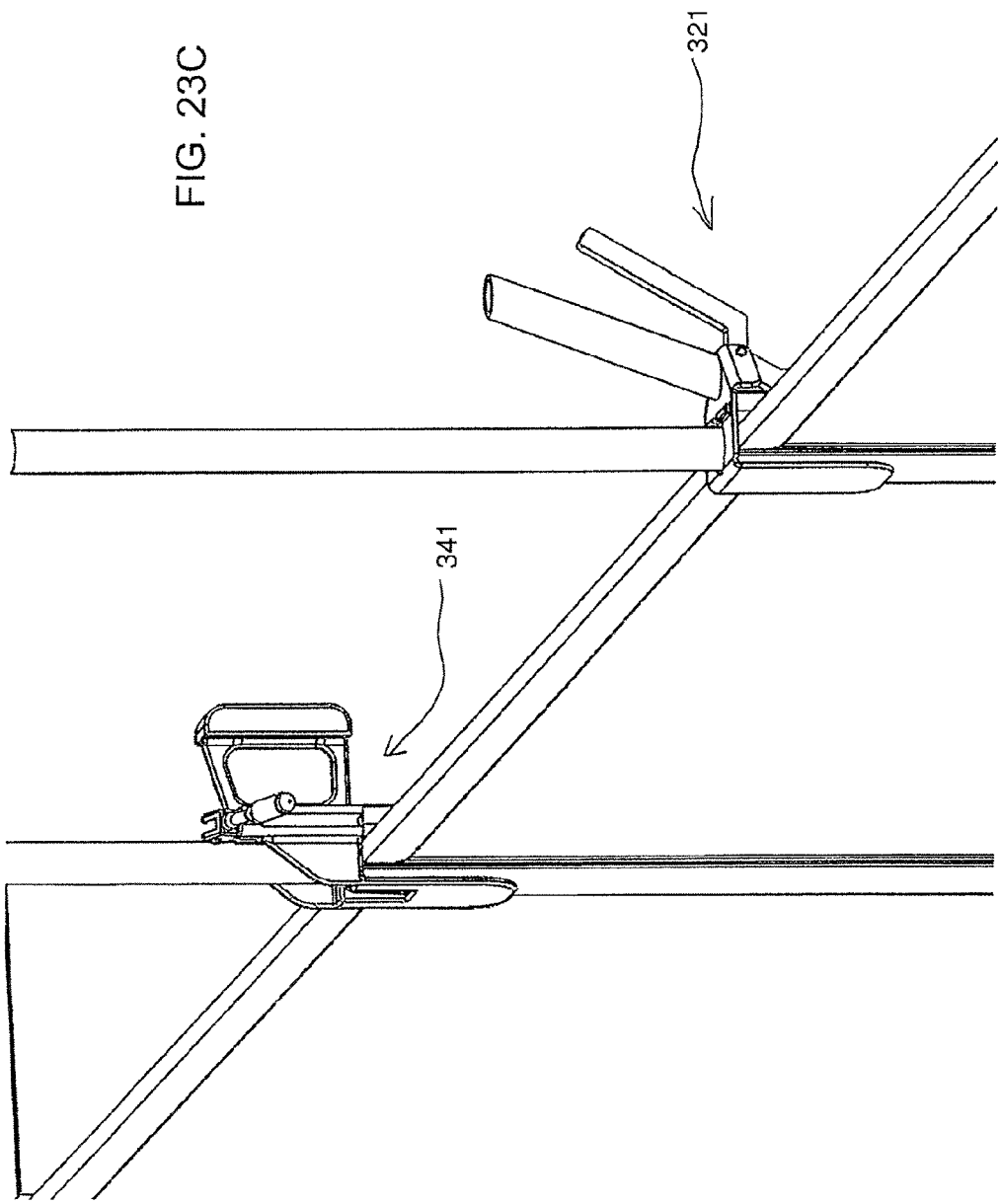

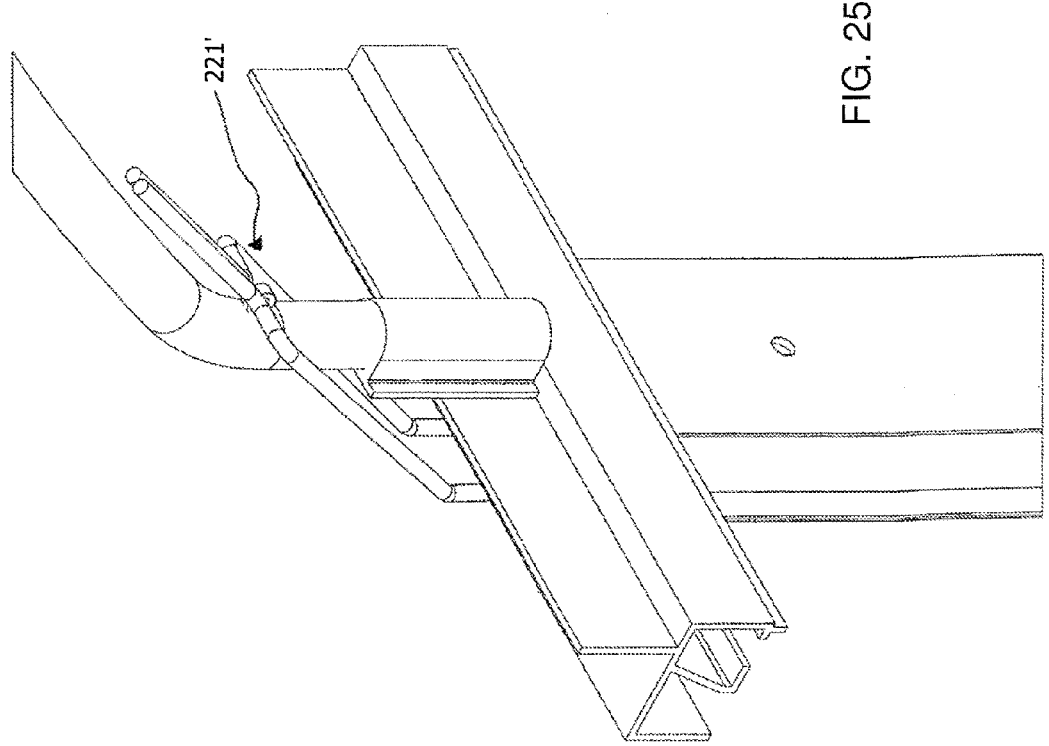

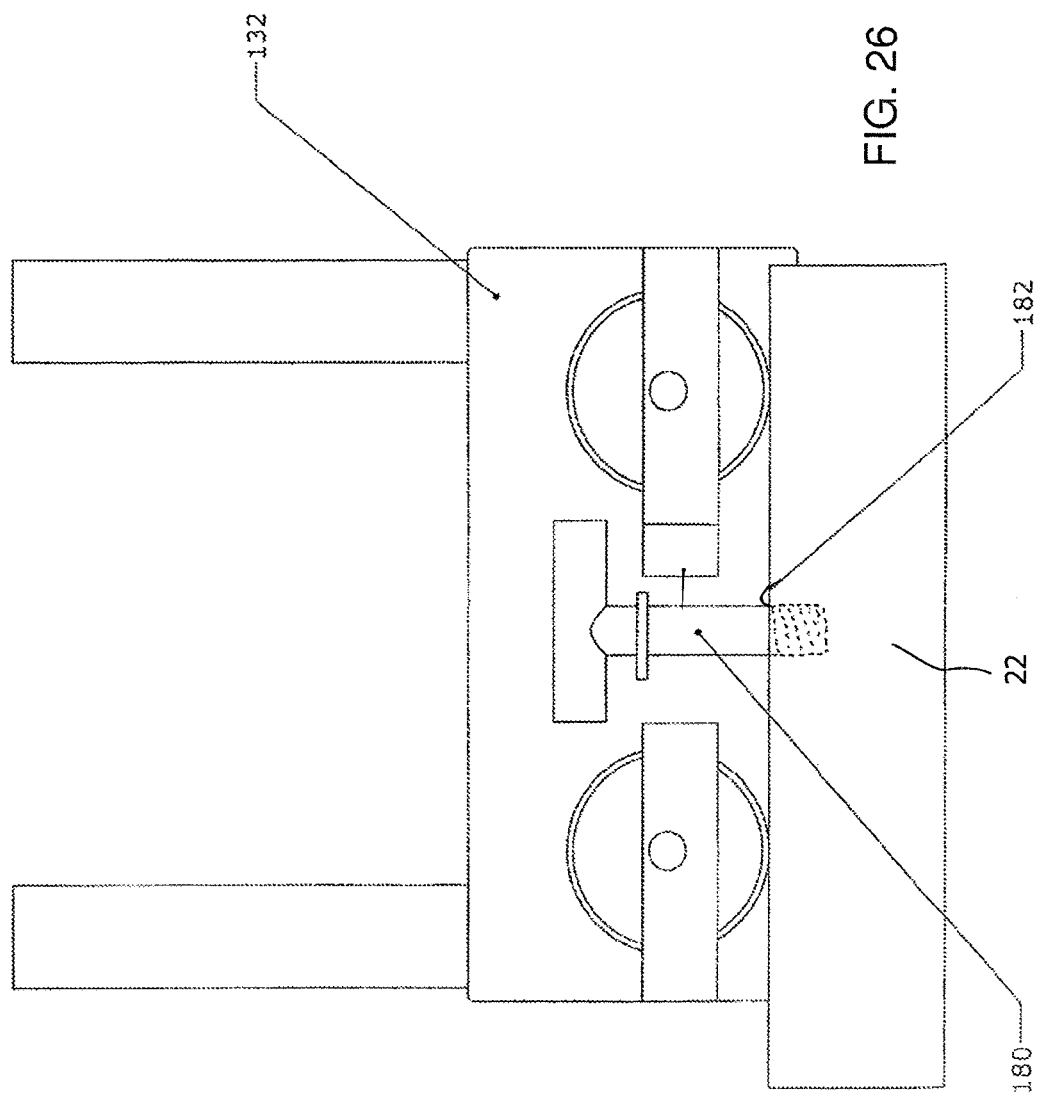

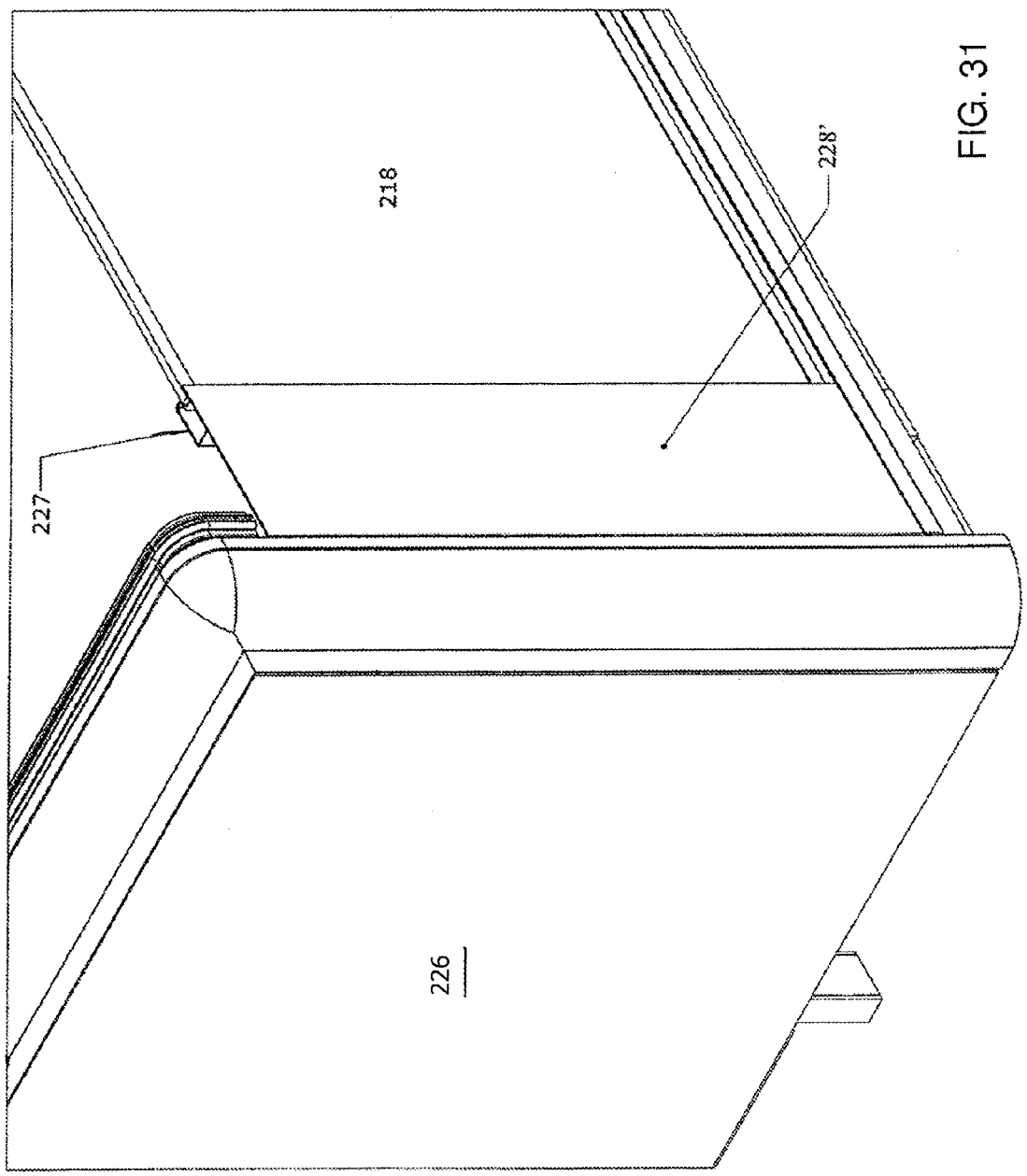

SIDEWALL PANEL AND TARPAULIN COVER SYSTEM FOR FLAT BED TRAILERS, AND TRUCK TRAILER INCORPORATING SAME

CROSS REFERENCE TO RELATED APPLICATIONS

The present application is a divisional of and claims priority under 35 USC 120 based on U.S. patent application Ser. No. 12/462,844 filed 10 Aug. 2009 (now U.S. Pat. No. 8,303,017), which claims priority from Provisional Application 61/152,814 filed on 16 Feb. 2009, and which is a Continuation-in-part of U.S. patent application Ser. No. 12/072,614, filed 27 Feb. 2008 (now U.S. Pat. No. 7,571,949), which is a divisional of U.S. patent application Ser. No. 11/486,958, filed 14 Jul. 2006 (now U.S. Pat. No. 7,350,842). The entire disclosures of these prior applications are incorporated herein by reference.

BACKGROUND OF THE INVENTION

1. Field of the Invention

The present invention relates to a system and apparatus for enclosing a flat bed trailer or vehicle with removable sidewall panels and a bow-supported tarpaulin cover, and also relates to a flatbed truck trailer incorporating the cover system. More particularly, the present invention relates to such a removable cover system, and various components of the system, which provides improved convenience, safety, weather-resistance, fuel and storage efficiency, aesthetic appeal, as well as additional advantages, in comparison to other known tarpaulin cover systems which may be used for covering flatbed trailer surfaces and the like.

2. Description of the Background Art

Removable cover systems for flatbed trailers and the like, including stake-supported panels extending longitudinally along sides of the trailer and a bow-supported tarp cover secured over the trailer and the upper portions of the panels are well known. These systems are typically referred to as tarp-and-rack systems or side kits. Versions of the conventional systems have been commercially available for many years and are relatively popular in North America.

The conventional systems generally include removable panels, panel-supporting stakes, stake-supporting pockets provided in spaced fashion along the lateral sides of a flatbed trailer and which removably receive/retain lower ends of the stakes, tarp-supporting bows, each having lower ends detachably supported by a pair of the stakes on opposite sides of the trailer, a tarp cover which may be selectively draped over and supported by the bows, and elastic straps which secure the lower edges of the tarp cover to the trailer. In use of the conventional systems the tarp cover may be selectively removed or folded, one or more of the bows removed, one or more of the stakes removed, and one or more of the panels removed over to expose portions of the covered flatbed surface so that cargo may be selectively loaded onto or removed from the exposed portions of the covered surface.

FIG. 21 herein depicts a lateral side portion of a flatbed trailer 1 having conventional stake-retaining pockets 2 fixed/welded to a steel or other metal member 8 extending along a lateral side surface of the trailer's bed, and a flat elongate bumper bar or rail 3 fixed to the outside surfaces of the pockets. FIG. 22 herein depicts a conventional stake 4 which secures a vertical side edge of a panel 5 inserted in a receiving recess 6 of the stake, where the stake is suspended above a receptacle socket 7 of a conventional pocket 2. In the conventional system depicted in FIG. 22, the panel 5 is rested on and is supported by an upper side edge portion of the bed of the trailer 1 or on the member 8, while the stake 4 is supported in the pocket 2 such that an inwardly-facing side of the stake includes a pair of slots 6 which receive and retain vertically-extending edges of a pair of the panels 5, and a main body portion of the stake 4 extends outwardly beyond the side edge of the trailer 1, and outboard of the panel 5.

The conventional systems are mostly effective for their intended purpose, which is reflected by the fact that the conventional system has not changed significantly over the years and remains popular in the trucking industry. Over the years, some efforts have been made to address a number of disadvantages associated with the conventional systems, including those discussed below.

U.S. Pat. No. 3,794,375 to Woodward (the '375 patent) discloses a flatbed enclosure system having stakes, panels and a tarp cover, but wherein the panel edge receiving recesses of the stakes are notched in a vertically spaced manner and the edges of the panels having associated recesses defined therealong as shown in FIG. 10 of the '375 patent. With such structure, the stake does not have to be completely removed in order to release the panels, and this is desirable because the stakes are typically around four feet long, and are usually removed by sliding their entire length vertically above the panels. Due to the notched structure, a panel may be raised only a few inches until the recesses in its side edges are aligned away from the stake notches, at which point the panel may be removed with the stake still retained on the trailer.

U.S. Pat. No. 3,811,724 to Woodward (the '724 patent) discloses a flatbed enclosure system having two-section stakes, wherein an inner section may be separated from an outer section via vertical sliding movement to facilitate removal of the panels, which have vertical side edges retained in recesses defined between the two sections of the stakes. However, an individual must typically be standing inside the trailer to manipulate the two-section stakes, e.g., while standing in the trailer the individual may lift and remove the smaller inner section of the stake, while the larger outer section of the stake remains in the supporting pocket.

Also, this patent discloses special cargo-securing brackets (see FIGS. 6-7 of the '724 patent) having first ends fixed to sides of the flatbed, and which extend inwardly of the cargo space between the upper surface of the flatbed and the lower edges of the panels such that the second ends of the brackets may have cargo-securing straps or chains connected thereto. These brackets avoid the conventional necessity of extending the cargo-securing straps and chains between the flatbed and lower edges of the panels, and thus also avoid the conventional gaps created by same.

U.S. Pat. No. 4,067,601 to Tuerk discloses a stake arrangement for these types of systems in which the stakes are generally triangular in cross sectional shape rather than rectangular, while a lower portion of the stake, as received by the retaining pockets on the trailer, is provided with a jacket which strengthens and enlarges the stake at the lower portion, and is tapered or the like to provide a relatively tight fit between the outer surface of the jacket and the inner surface of a retaining pocket.

U.S. Pat. No. 5,320,396 to Petelka discloses a flatbed enclosure system having a stake construction in which an outer surface of the stake is rounded off, to improve the aerodynamics of the trailer when the enclosure system is installed.

U.S. Pat. No. 4,042,275 to Glassmeyer et al. discloses a cap that attaches to the upper end of stakes used in a flatbed enclosure system. The cap prevents water and debris from entering the inner cavity of the stake. Additionally, the stake cap also provides a receiving hole for the end of a tarp support bow.

The known tarp-and-rack systems provide several beneficial features, including that they are partially or fully removable, thereby permitting a user to uncover only selected portions of the trailer for loading and unloading cargo, and because the systems are relatively inexpensive in comparison, for example, to permanent trailer cover systems such as the aluminum shells used to cover many trailers.

However, the known systems still have disadvantages associated therewith. For example, it is labor-intensive to install or remove such a system, e.g., edges of the tarp cover are secured with numerous elastic cords or the like to the flatbed trailer, the stakes and panels must be individually, manually installed and removed, and the person operator doing the installation and removal must typically be standing on the trailer, which is highly inconvenient (especially if cargo is loaded on the trailer), and also potentially dangerous.

Further, the stakes extend outwardly of the panels, such that the system does not have a smooth continuous outer surface and is not particularly aerodynamic. Often there is a loose fit between the stakes and retaining pockets for same provided at the sides of the trailer, such that the stakes and the panels rattle and move when the vehicle is traveling.

Still further, lower edges of the panels are typically supported on upper, outermost surfaces of the flatbed. This not only reduces cargo space on the trailer, but due to curvature of the flatbed in the longitudinal direction, gaps are formed between the panels and the trailer surface, permitting water, dirt and other matter to enter the enclosed space within the cover system, which is undesirable for many reasons. Further, if the cargo must be secured to the trailer, as is often the case, securing straps and chains must typically pass between the panels and the flatbed surface creating additional gaps as discussed above. Also, the conventional systems do not have a particularly aesthetic appearance.

Although some of the disadvantages of some older conventional systems have been addressed, as discussed above, a need still exists in the art for an improved flatbed cover system which more completely addresses all of the disadvantages attendant the conventional systems. In particular, there is a need for such an improved system that may be readily, conveniently and safely installed or removed by an individual standing at ground level adjacent a flatbed trailer, has significantly improved aerodynamic, water- and weather-tight, has aesthetic characteristics, has a reduced number of parts, and is otherwise functionally, structurally and aesthetically superior to the conventional trailer cover systems.

SUMMARY OF THE INVENTION

The present invention has been created with the intention of meeting the discussed need.

It is an object of the present invention to provide a flexible seal mechanism for use with a cover system having removable panels, which seal mechanism cooperates with the panels to provide an excellent barrier against water and other foreign matter entering into a cargo storage space within the system, is convenient to use, and may be retrofitted to conventional systems as well as being used as a component of the novel cover system of the present application.

It is another object of the present invention to provide an improved tarpaulin and stake-supported panel cover system for a flatbed trailer which, according to an illustrative embodiment hereof, includes a plurality of panels and support stakes, a flexible seal mechanism, and an elevated, optionally retractable tarpaulin cover system, which combine to form a high quality, versatile enclosure with enhanced characteristics, including protection for cargo on the trailer, simplicity and safety of use, aerodynamics, and appearance.

It is a further object of this invention to provide sidewall panels and support mechanisms such that the panels form a substantially flat and uniform outer sidewall surface along lateral sides of a flatbed trailer using a reduced number of components for improved aerodynamics, improved appearance, reduced weight and cost, and increased cargo space.

It is a yet another object of this invention to provide a cover system of the discussed type that allows for stakes used for retaining the sidewalls to be attached to the system and easily removable from the system without the use of retaining pockets.

It is another object of this invention to provide a cover system of the discussed type that eliminates the conventional need for numerous ropes or elastic straps for securing a tarp cover of the system.

It is still another object of this invention to provide a cover system of the discussed type including a support mechanism for a tarp cover of the system, which greatly facilitates manipulation of the tarp cover by an operator and also greatly improves the aerodynamics, securability, durability, and aesthetic appearance of the cover.

According to a first aspect of the invention there is provided a sealing device for use in a cover system for a substantially flat support surface on a vehicle including vertically-extending removable panels, the sealing device comprising a first portion which is adapted to securely engage lower surfaces of the panels, and a second flexible portion which extends continuously from the first portion and is adapted to sealingly engage the vehicle. The sealing device may extend substantially along the full length of the lateral sides and rear of the vehicle, and the second flexible portion may include multiple spaced arms which are adapted to engage different surfaces of the vehicle, e.g., the upper supporting surface and a vertical side surface, to more surely prevent passage of water and other foreign matter into the covered storage space.

Such a sealing device according to the first aspect of the invention is very advantageous because (among other reasons) there tends to be substantial spaces between the lower portions of the panels and vehicle, and the seal is effective to prevent water and other foreign matter from passing through the spaces into the covered storage area. Also, because the second portion of the seal is flexible, cargo-securing chains, ropes, straps, etc. may readily pass between the seal and the vehicle via flexing of the second portion, and the flexed second portion remains in close contact therewith as an effective seal.

According to a second aspect of the invention, there is provided a cover system for a substantially flat support surface on a vehicle including plural removable panels, a lower support adapted to support lower surfaces of the panels when the panels are operatively disposed at a lateral side of the flat support surface, and an upper rail adapted to retain upper surfaces of the panels when the panels are operatively disposed at a lateral side of the flat support surface, wherein edge portions of said panels are shaped to overlap with the edge portions of adjacent side panels such that outermost surfaces of the side panels extend substantially continuously when the panels are operatively disposed at a lateral side of the flat support surface. The cover system according to the second aspect may also include retaining devices such as clips operatively associated with the panels for selectively, immovably securing the panels on the vehicle, handles provided with the panels, and seals provided with the overlapping portions of the panel edges. Additionally, the lower support may comprise the sealing device according to the first aspect of the invention.

Such structure according to the second aspect is advantageous because (among other reasons): it provides the cover system with a desirably aerodynamic, aesthetic and smooth outer surface; it increases the effective usable storage space for cargo on the support surface; and also because it permits reduction of a number of the support posts and post-retaining pockets conventionally used in the cover system, and correspondingly reduces the cost and weight of the system.

According to a third aspect of the invention, there is provided a cover system for a substantially flat support surface on a vehicle including stake-supported removable panels, comprising a plurality of stakes include retaining slots adapted to securely receive vertically extending edges of the removable panels, and fastening devices which are adapted to selectively immovably fix the stakes directly to the vehicle or to a spacing member fixed to the vehicle. The fastening devices may include stabilizing pins, flanges, etc. which engage the vehicle or the spacing member, and securing members which may be selectively manipulated by an operator for securing and detaching the stakes to the vehicle or spacing members.

Such a stake according to the third aspect of the invention is advantageous because (among other reasons): it eliminates the pockets which are conventionally required to receive and retain lower portions of the stakes on the vehicle; it provides greater design freedom in locating the stakes on the vehicle; and facilitates attachment and detachment of the stakes relative to the system and the vehicle.

According to a fourth aspect of the invention, the cover system may also include a tarp cover, supporting bows which support the tarp cover when the cover is extended over the flat support surface and include bow ends which are detachably connected to the upper rail, and a securing mechanism which secures edges of the tarp cover closely adjacent to the bow ends and the upper rail, wherein the securing mechanism is disposed inwardly of the tarp cover. The securing mechanism may be operatively connected to one or more of the bows, and the cover system may include a plurality of the securing mechanisms connected to different ones of the bows, as well as a seal extending from the upper rail which engages the edges of the tarp cover to restrict/prevent water and foreign matter from passing therebetween.

Such a cover system according to the fourth aspect of the invention is very advantageous because (among other reasons): the bows and the tarp cover are more securely maintained in desired positions on the vehicle, with little movement of same while the vehicle is traveling in comparison to conventional cover systems; the bows may be located with greater freedom along the upper rail because their locations need not correspond to locations of the supporting stakes as in the conventional systems; cargo within the cover system is better protected from water and foreign matter because of the seal; the cover is more aerodynamic and aesthetic in appearance than the conventional systems which use elastic straps and ropes to secure the tarp cover to a vehicle; etc.

According to a fifth aspect of the invention, the cover system may also include a guide assembly which is operatively connected to the upper rail such that it can be easily moved along the rail when desired by an operator, and which is also operatively connected to the ends of the supporting bows such that the bows and the tarp cover may be moved together with the guide assembly along the upper rail when desired for covering and exposing the flat support surface of the vehicle. The guide assembly and cover system may include various means for facilitating movement of the assembly along the upper rail, such as carriage wheels which engage and roll along the rail, carriage sliders which engage and slide along the rail, an air-assist mechanism which discharges air between the sliders and opposing surfaces of the rail to reduce sliding friction between the sliders and the opposing surfaces; replaceable plastic members provided with the upper rail to be engaged by the wheels or sliders of the guide assembly, and which may be easily replaced when they become worn; etc. Additionally, the cover system may include a locking mechanism which locks the guide assembly to the upper rail in an end position of the guide assembly, corresponding to a fully covering position of the tarp cover, as well as a tensioning mechanism which tensions the tarp cover when it is in its fully covering position, and a seal extending from the upper rail which engages the edges of the tarp cover to restrict/prevent water and foreign matter from passing therebetween. The locking and tensioning mechanisms may be combined together, and may be adapted to be actuated by an operator standing adjacent to the vehicle at a level below the tarp cover.

Such a cover system according to the fifth aspect of the invention is very advantageous because (among other reasons): the tarp cover system may be easily and conveniently moved to a desired position by a person standing on the ground adjacent to the trailer; cargo within the cover system is better protected from water and foreign matter because of the seal; the cover is more aerodynamic and aesthetic in appearance than the conventional systems which use elastic straps and ropes to secure the tarp cover to a vehicle; etc.

For a more complete understanding of the present invention, the reader is referred to the following detailed description section, which should be read in conjunction with the accompanying drawings showing present embodiments of the invention. Throughout the following detailed description and in the drawings, like numbers refer to like parts.

INTENT OF DISCLOSURE

Although the following disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found.

There have been chosen specific embodiments of a cover system according to the invention and specific alternative structures and modifications thereto, the embodiments chosen for the purposes of illustration and description of the structure and method of the invention are shown in the accompanying drawings forming a part of the specification.

BRIEF DESCRIPTION OF THE DRAWINGS

FIG. 3F is a perspective view of the pocket of FIG. 3E coupled to a stake.

FIG. 4G is a perspective view of another embodiment of a pocketless stake according to the invention.

FIG. 4I is sectional view of the modified pocket and stake of FIG. 4H.

FIG. 7A is a plan view, partially cut away, of an embodiment of a pocket latch according to the invention, which mechanism secures the stake within the closed retainer pocket, with an inner portion of the stake omitted from the drawing for illustrative purposes.

FIG. 7B is a top plan view of another embodiment of the pocket latch according to the invention.

FIG. 7C is a perspective view of the movable pocket section modified to cooperatively receive a latch of the locking mechanism of FIG. 7B therein.

FIG. 8 is a sectional view showing a side portion of a trailer bed and cover system according to an embodiment of the invention.

FIG. 9 is a perspective view of a sectional piece of a sealing member according to an embodiment of the invention.

FIG. 9A is a cross sectional view of another embodiment of a sealing member according to the invention.

FIG. 9B is a cross sectional view of still another embodiment of a sealing member according to the invention.

FIG. 9C is a cross sectional view of a portion of a panel frame according to an embodiment of the invention, wherein the portion of the frame is integrally provided with an elongate slot that slidingly receives an edge of a seal member.

FIG. 11E is a side sectional view of the embodiment of FIG. 11D.

FIG. 12B is a detail perspective view of an enlarged portion of FIG. 12A, showing an end portion of a rail section and part of a locking structure.

FIG. 12C is a perspective view of a short segment of the top rail according to an embodiment of the invention.

FIG. 15F is a side sectional view of sliding support for the tarp cover according to an embodiment of the invention.

FIG. 15H is a perspective view of the system of FIGS. 15F, 15G.

FIG. 23A is a perspective view showing a latch mechanism for a tarp cover according to another embodiment of the invention.

FIG. 23B is a side sectional view showing the latch mechanism of FIG. 23A.

FIG. 23C is a perspective view showing the latch mechanisms of FIGS. 23A, 23E mounted on stakes of a cover system.

FIG. 23D is a side sectional view showing a latch mechanism for a tarp cover according to another embodiment of the invention.

FIG. 23E is a side sectional view showing a latch mechanism for a tarp cover according to another embodiment of the invention.

FIG. 25 is a perspective view of a latch mechanism for a tarp cover according to still another embodiment of the invention.

FIG. 26 is a front view of a guide assembly locking mechanism according to an embodiment of the invention.

FIG. 31 is a perspective view of a front portion of the cover system of FIG. 28.

DETAILED DESCRIPTION OF PRESENTLY CONTEMPLATED EMBODIMENTS

Overview

A number of selected illustrative embodiments of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art. These illustrative embodiments are removable cover systems for being mounted on flatbed trailers, other vehicles or the like, and various components of such systems.

Figure 1:
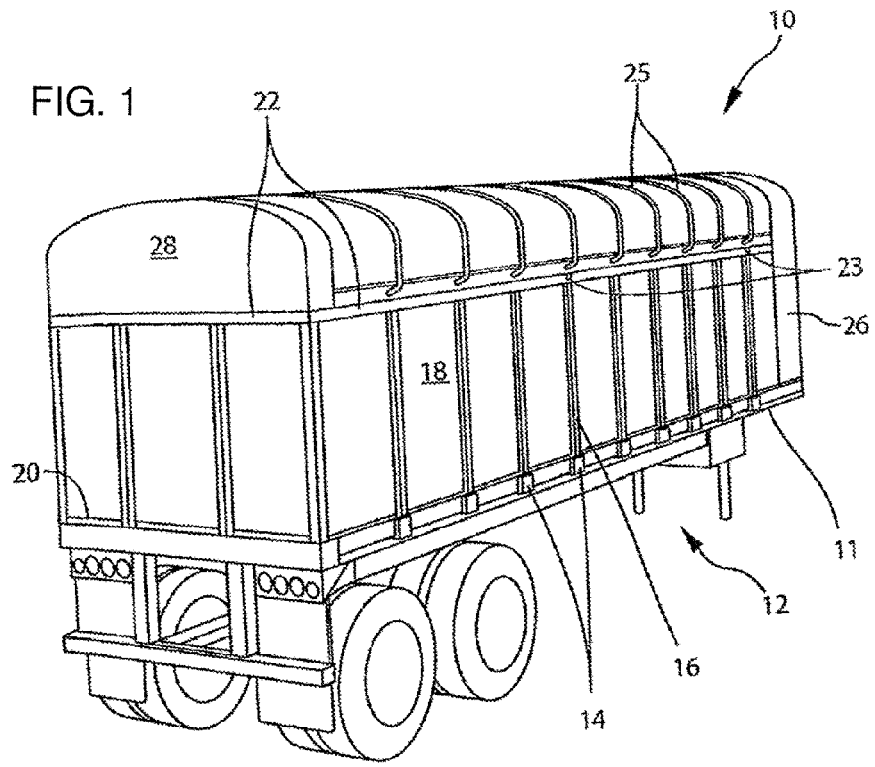
FIG. 1 is a rear side perspective view of a truck trailer incorporating an illustrative embodiment of a cover system according to the present invention.

With reference to FIG. 1, there is shown a flatbed trailer 12 equipped with a cover system 10 according to a selected illustrative embodiment of the invention, where the system has been fully installed and deployed on a flatbed trailer 12 to cover a load carried on the trailer. While the system 10 may generally include many components which are similar to those of the conventional tarp-and-rack systems, there are many significant differences/improvements in the components of the present system, and it also includes many new components not found in the conventional systems. Moreover, unlike in the conventional systems, many of the system components may be readily, manually attached to or removed from the trailer 12 by a user standing at ground level next to the trailer, and others of which may be easily manipulated by such standing user.

Generally, the system 10 may include: a plurality of retainer pockets 14 which are fixed in a spaced manner along opposite lateral sides and a rear end of the trailer or to spacers extending from the sides of the trailer; a plurality of stakes 16 having lower ends detachably fitted in the pockets, respectively; a plurality of sidewall panels 18 which extend vertically and have opposite side edges supported in retaining grooves defined in the stakes, such that the panels and stakes form side (and possibly rear) walls of the cover system 10; a plurality of sealing members 20 extending between lower ends of the panels 18 and the flatbed trailer 12 to prevent water and other foreign matter from entering into a covered space within the cover system, including when the vehicle is traveling; a plurality of rail sections 22 extending along the opposite sides and possibly the rear end of the trailer above upper edges of the stakes and panels, and secured to upper ends of the stakes 16; a tarp cover 24 disposed above, and extending between the rails 22; a plurality of bows 25 which support the cover 24 on the rails and which may be removable or movable relative to the system as discussed further below; a front headboard 26 at a front end of the trailer, and an end cap 28 at a rear end of the trailer above the rear end portions of the rails. The tarp cover 24 is omitted in FIG. 1 to better show the supporting bows and other components disposed underneath the cover, but the cover is shown in other drawings including FIGS. 8 and 24-24B. Also, a conventional bumper bar or rail, such as indicated at 3 in FIG. 21, which may extend fully along each lateral side of the trailer, may be used in conjunction with the seal devices and other components of the system as discussed herein, although the bumper bar is not necessarily part of the cover system.

Each of the various components of the present invention are significantly different than (improvements of) the corresponding components in conventional tarp-and-rack type cover systems, and each of the various components provides advantages over the conventional systems relating to facilitated use by an operator, enhanced seal ability of the system against water and other foreign matter, improved aerodynamics and appearance, enlarged usable space, etc. For example, each of the pockets 14 and the stakes 16 may be formed of multiple components which are separable or movable relative to each other for facilitating assembly and disassembly of the system by an operator standing on the ground adjacent a vehicle having the cover system disposed thereon, as more specifically discussed below. Further, while all of the disclosed components may be combined in a given cover system such as depicted, it is not required that all components be used together. Several of the components have utility by themselves and/or with other ones of the components. Also, modifications and alternative embodiments may be used for the various components as discussed herein.

Retainer Pockets

Figure 2A:
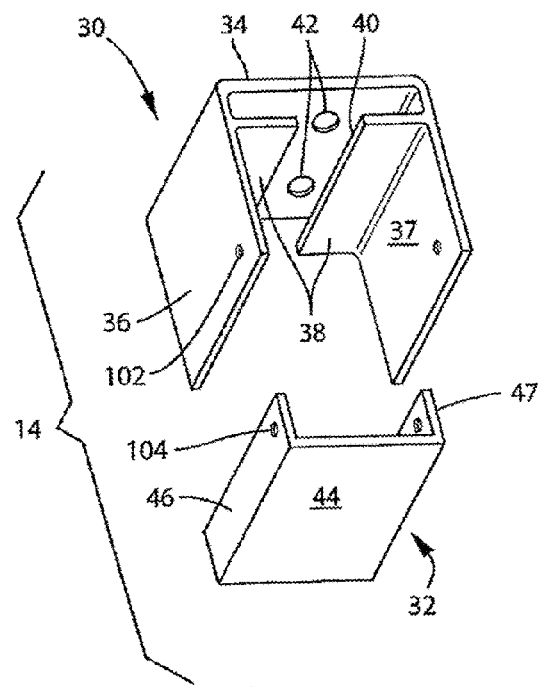
FIG. 2A is an exploded perspective view of a retainer pocket according to an embodiment of the invention.
Figure 2C:
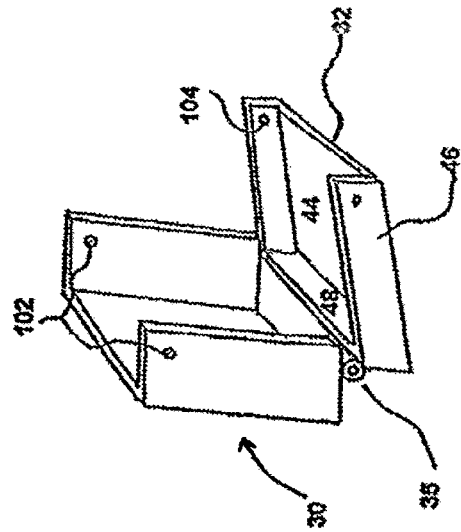
FIG. 2C is a perspective view of a hinged retainer pocket similar to that of FIG. 2A, shown in an open position.
Figure 2B:
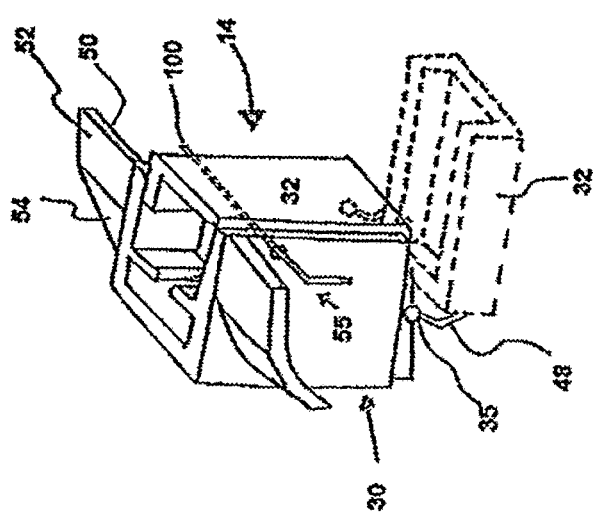
FIG. 2B is a perspective view of a modified embodiment of a retainer pocket according to the invention, including panel-supporting extensions.

With reference to FIGS. 2A-2B, the retainer pockets 14, according to a first embodiment of the invention, include an inner or base section 30 and an outer or movable section 32 which may be selectively disposed in closed (stake-retaining) or open positions relative to the base section. The inner, base section 30 and the movable outer section 32 are collectively described herein as pocket sections 30, 32. The pocket sections 30, 32 may be formed of an appropriate material(s) such as aluminum, steel, composites, strong plastics, or combinations of these materials.

The base section 30 may be an integral, unitary member with a substantially C-shaped profile as viewed from above, as shown in FIG. 2A, although other shapes may be used if desired, e.g., curved, polygonal, etc. The depicted base section of FIG. 2A includes an inner attachment surface 34 which is adapted to be fixed to the trailer bed 11, two spaced apart parallel side walls 36, 37 extending outwardly from opposite ends of the attachment surface, and a pair of spaced apart co-planar spacer walls 38 which extend inwardly from each of the respective side walls parallel to and spaced away from the attachment surface, with a central gap 40 provided between the inner ends of the spacer walls 38, to allow access for mounting bolts.

The attachment surface 34 of the base section 30 may have one or more mounting holes 42 formed therein, to facilitate attachment to side edges of the trailer bed 11 using one or more bolts 43, as shown in FIG. 7A. A space 45 may be defined within the base member 30, between the spacer walls 38 and the attachment surface 34, which is useful for disposition and manipulation of the bolts 43, keeps the bolt heads separated from a stake 16 supported in the retaining pocket 14, etc. The lower potion of the stake may snugly fit in an outer portion of the pocket outward of the walls 38, and thus does not occupy the entire pocket. The spacer walls 38 could be omitted if desired, such as for example where the base section 30 is welded to the side edge of the trailer, or in the embodiment of FIGS. 6A-6B where the base member 30 is integrally formed as part of the trailer bed 11. Further, as an alternative structure, the walls 38 may be formed together with each other as a single continuous wall parallel to the attachment surface 34, such as wall 38' in the embodiment of FIG. 2D. Such a single wall may have openings formed therein which align with the openings 42 but are sufficiently larger in diameter than the openings 42 so that a bolt and a socket for manipulating the bolt may pass through the larger openings when bolt is to be fastened or loosened relative to the opening 42.

The movable section 32 may be a relatively shallow member, with a cross-sectional C-shape as shown in FIG. 2A, including an outer wall 44 which forms the outermost surface of the retaining pocket when in the closed position, and a pair of spaced-apart side walls 46, 47 extending transversely inwardly from opposed ends of the outer wall 44. The movable section 32 may be configured and dimensioned so that the side walls 46, 47 thereof may extend either inside or outside of the base section 30 in the closed position, as noted.

Figure 2D:
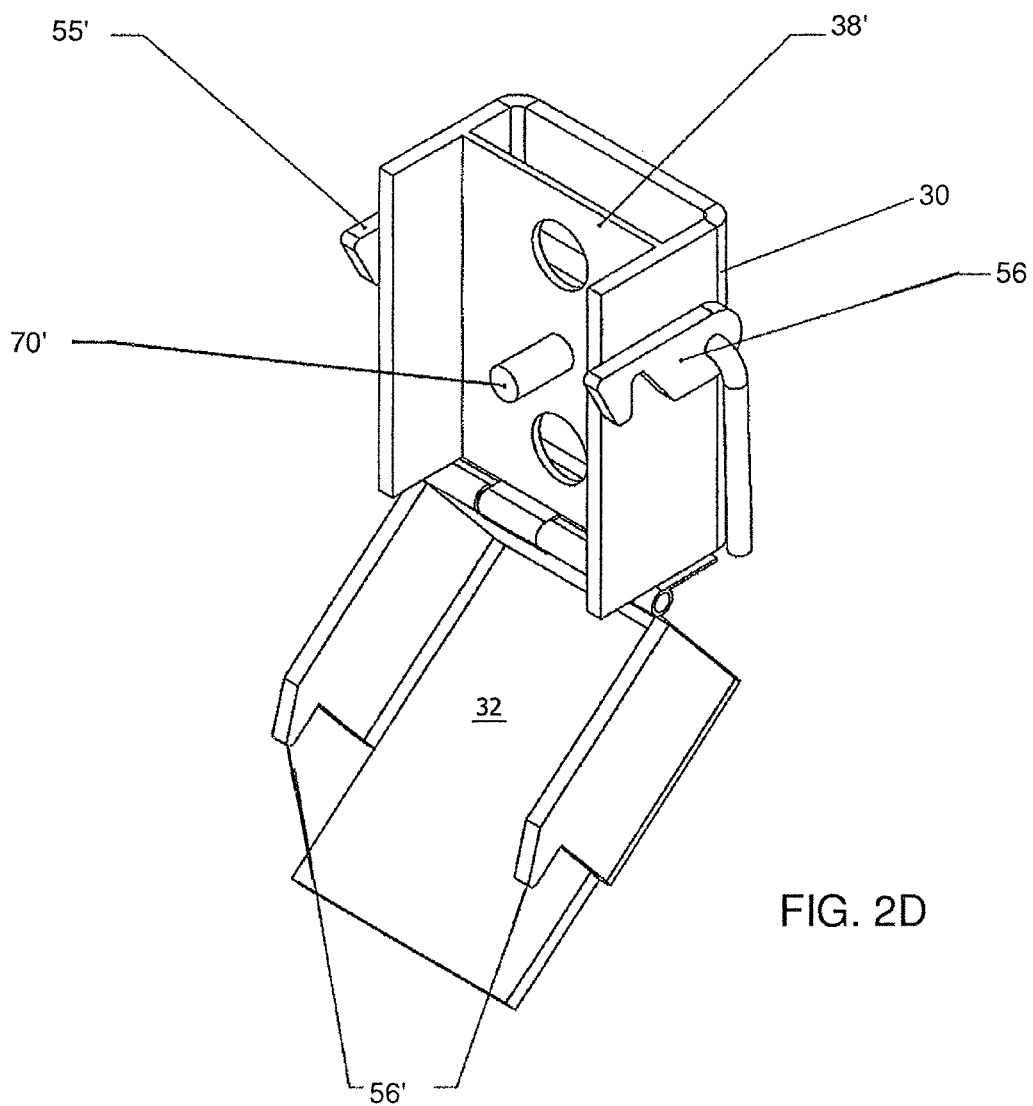
FIG. 2D is a perspective view of another embodiment of a retainer pocket according to the invention.

Referring now to FIGS. 2B-2D, the pocket sections 30, 32 may be connected via a hinge 35 extending horizontally along a bottom, inner edge of the movable section 32 and across a bottom surface of the base section 30, such that the movable section 32 may be pivoted relative to the base section 30 to establish the open and closed positions of the pocket 14.

Figures 3A, 3B, 3C:
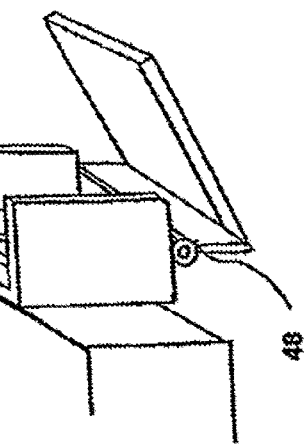
FIGS. 3A-3D are perspective views of other, alternate embodiments of retainer pockets according to the invention.

It is not essential that the pocket sections 30, 32 have the specific shapes and the hinged configuration shown in FIGS. 2B-2D, rather, it is only essential that the retaining pocket is selectively and adjustably disposable in open and closed positions. For example, the hinge 35 may be disposed vertically between the pocket sections 30, 32 as shown in FIG. 3A, the bottom wall of the movable section 32 may be angled as shown in FIG. 3B, the sections may be completely separable without a hinge connection as shown in FIGS. 3C, 3D, or the retainer pocket may have a curved, rounded, polygonal, or other shape, etc.

Figure 21:
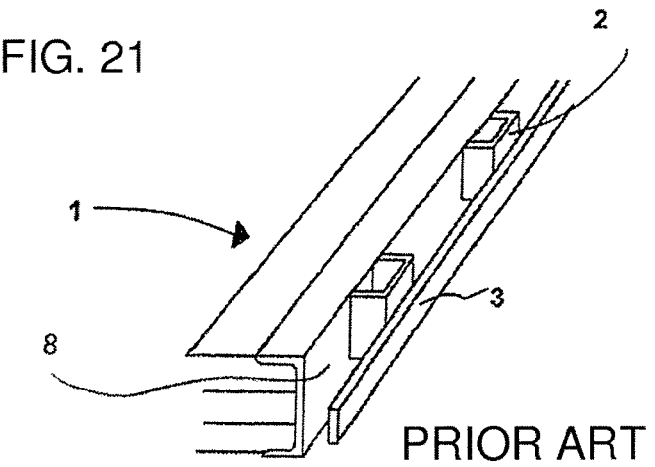
FIG. 21 is a perspective view of a portion of a prior art trailer having conventional stake-receiving pockets affixed to the side of the trailer.
Figure 22:
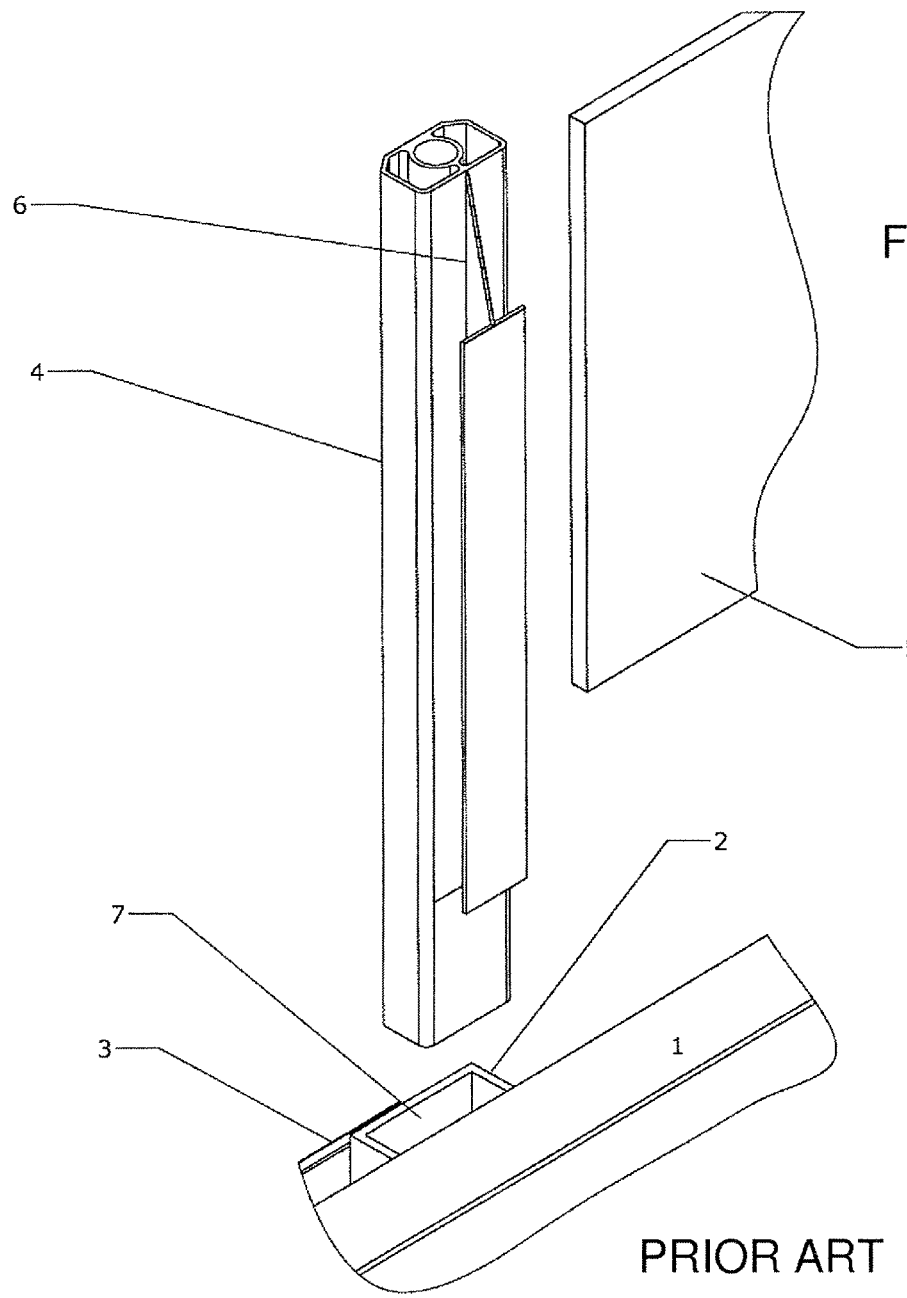
FIG. 22 is an exploded perspective view of a portion of a prior art trailer showing a conventional stake adapted to have a lower end thereof inserted in the conventional pocket, and a conventional panel having a vertical side edge thereof inserted in a receiving recess of the stake.

The multi-part retaining pocket 14 is an important aspect of the present invention, and represents a significant improvement over conventional pockets of known covering systems of this type. The conventional retainer pockets are very typically one-piece, rectangular, tubular members made of metal such as aluminum or steel, and are welded to the longitudinal sides of the flatbed trailer in spaced disposition, as shown in FIGS. 21 and 22 of the drawings. Because of such conventional construction, the stakes supported thereby must be vertically lifted to be removed from the pockets, again, typically by a person standing in the flatbed trailer.

Due to the multiple-section construction of the retaining pocket 14 according to the invention, however, it becomes possible for a person standing on the ground adjacent to the flatbed trailer to conveniently remove the stakes from the retaining pockets, as discussed further below.

The inner or base section 30 is fixed to a side portion of the flatbed trailer 12 in an appropriate manner, such as welding or via threaded bolts or other fasteners. The base section 30 may be an integral, unitary member with a substantially C-shaped cross section, as shown, although other shapes may be used if desired, e.g., curved, polygonal, etc.

Figure 6A:
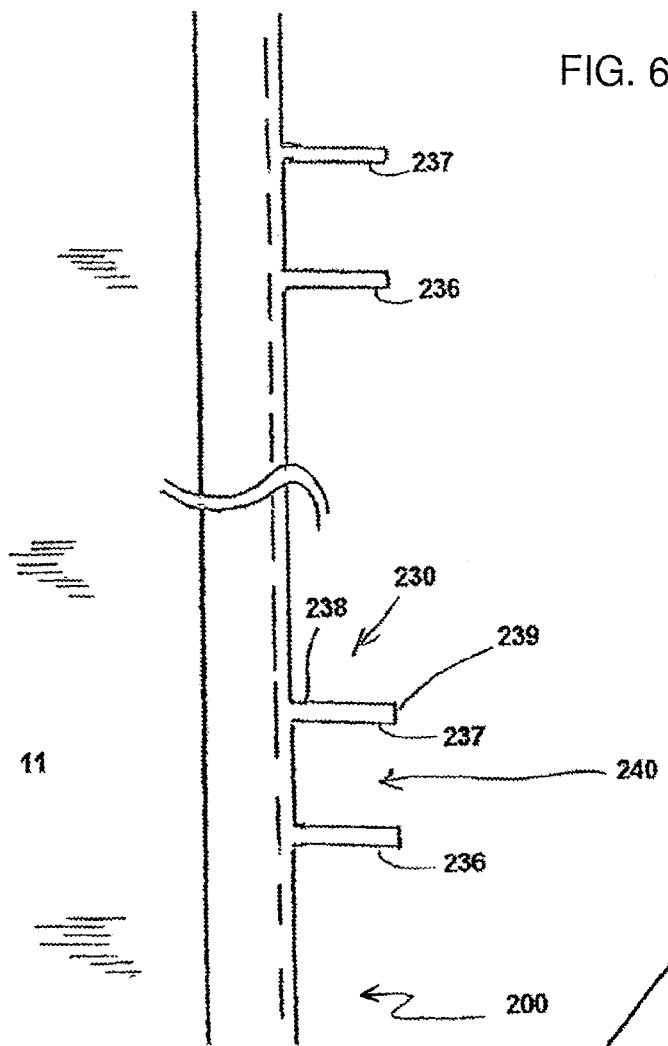
FIG. 6A is a top plan view of a side edge portion of a trailer having integral fixed pocket sections thereon according to another embodiment hereof.
Figure 6B:
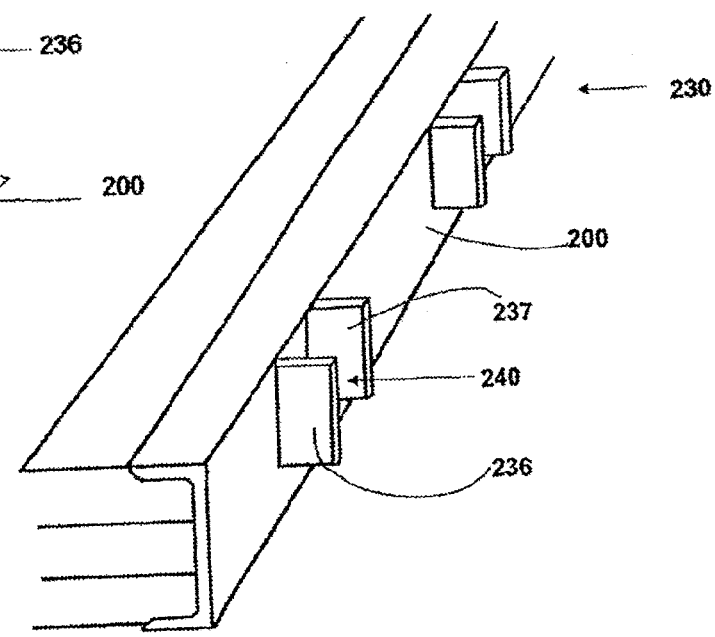
FIG. 6B is a perspective view of the trailer and fixed pocket sections of FIG. 6A.

Referring now to FIGS. 6A-6B, an alternate embodiment of a base section is shown at 230, and in this embodiment, the base section is integrally affixed to, and made part of a side edge reinforcement 200 which is an integral side portion of the trailer flat bed 11.

In the embodiment of FIGS. 6A-6B, the side edges of the trailer bed 11 have a plurality of pairs of substantially vertical spaced-apart plates 236, 237 affixed thereto and extending outwardly therefrom. Each of the plates 236, 237 includes a proximal end 238 which is operatively attached to one of the side edges of the trailer bed 11, and a distal end 239 spaced outwardly from the proximal end. An open space 240 is formed in the fixed pocket section 230 between the distal ends 239 of adjacent plates 236, 237 for receiving a movable pocket section therein, such as the movable pocket section 32 of FIG. 2A. Each pair of adjacent plates 236, 237 is adapted to cooperate with a movable pocket section, such as the section 32, to define a stake-receiving pocket 14.

Figure 5:
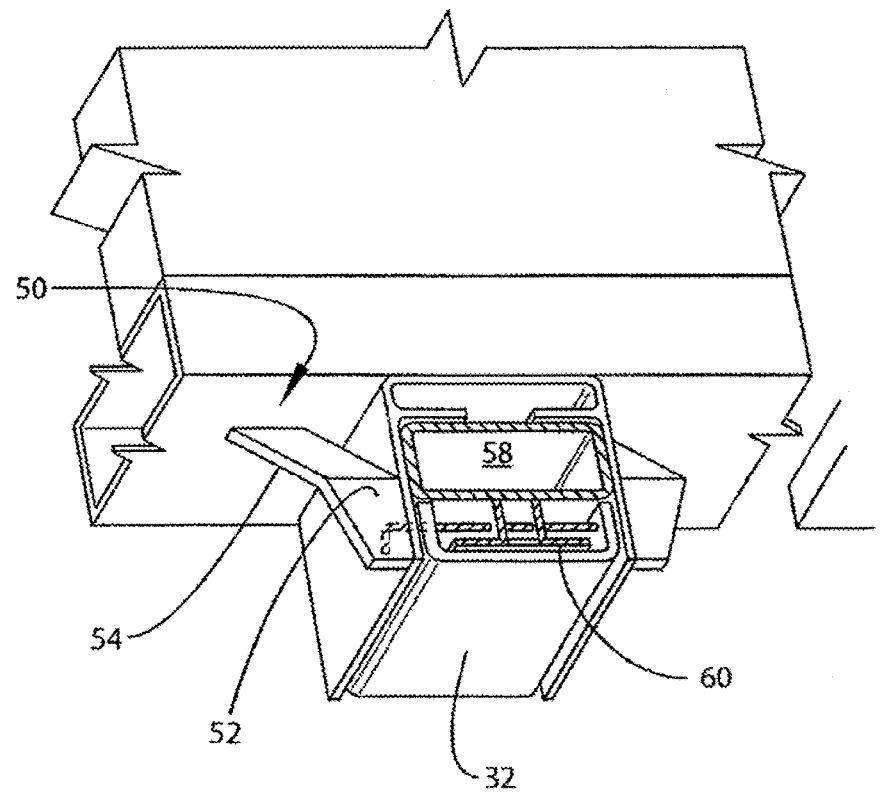
FIG. 5 is a perspective view, partially in cross-section, showing the retainer pocket of FIGS. 2A, 2B mounted to an edge portion of flatbed trailer, wherein a lower portion of the stake of FIG. 4A is disposed in the retainer pocket.

Although omitted from FIGS. 6A-6B for purposes of illustration, it will further be understood that the fixed pocket sections 230 of the embodiment shown in FIGS. 6A-6B may also be provided with panel support brackets of the type shown in FIGS. 2B and 5, and as further discussed herein, if desired.

As seen in FIG. 2C, the movable section 32 may, optionally, include a lower wall 48 extending between end edges of the side walls, and the hinge 35 may be connected to the lower wall and/or to the side walls. Again, however, the shapes of the base and movable sections 30, 32 can be variously modified as desired, the hinge 35 can be omitted or located differently, etc., as long as the base section 30 and the outer section 32 are movable relative to one another, to establish the open and closed positions of the retaining pocket 14.

Pocket Latch

Figure 3E:
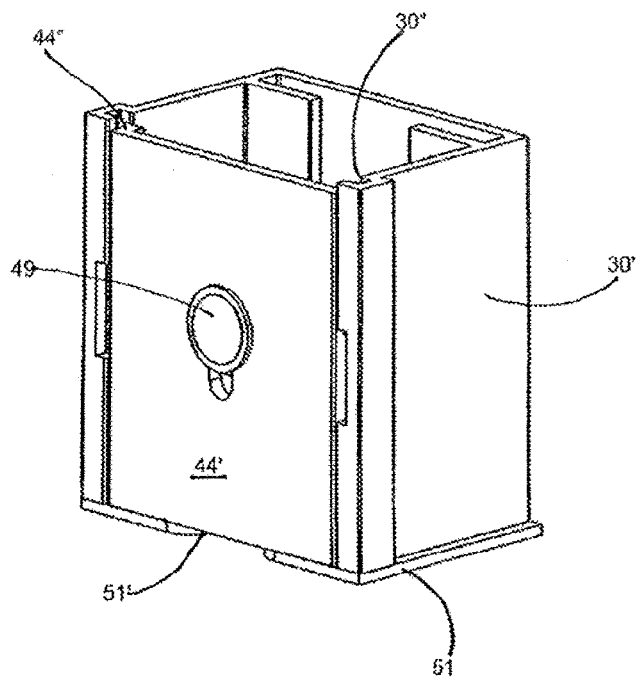
FIG. 3E is a perspective view of another embodiment of a retainer pocket according to the invention similar to that of FIG. 3D, but with some modifications to facilitate removal and to connect it to an outer portion of a stake.
Figure 3D:
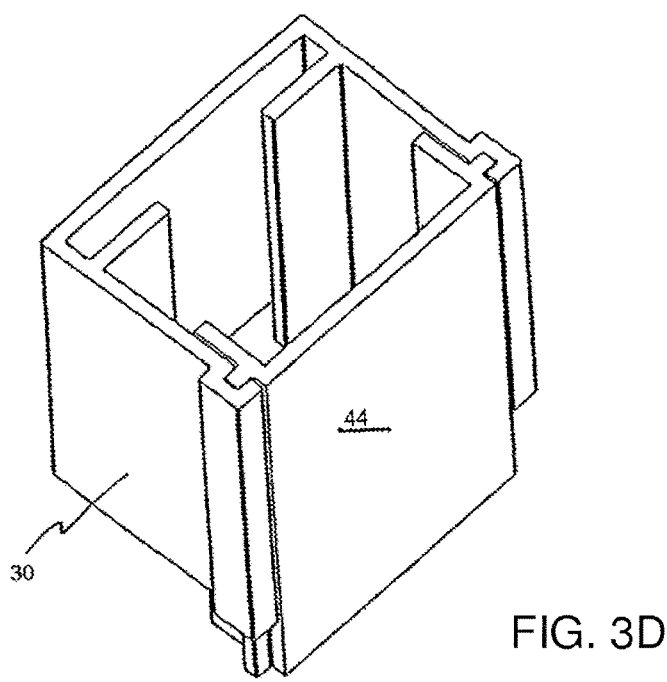

A fastener such as fastener 49 shown in FIG. 3E or another mechanism may be used for securely maintaining the movable section 32 in the closed position. For example, according to embodiments of the present invention, a pocket latch 55, 155 such as shown in FIGS. 7A and 7B, or the latch 55' shown in FIG. 2D may be used. The pocket latch 55 of FIG. 7A includes a pin 100 which may be inserted through respective openings 102, 104 (FIG. 2A) formed in the base and movable sections 30, 32, respectively, of the retaining pocket 14. The pin 100 may be substantially L-shaped, as depicted, such that the longer portion thereof may be extended through the openings 102, 104 to maintain the pocket in the closed position thereof. Optionally, the pin 100 may include a spring-loaded detent ball inside of a distal end thereof, to temporarily retain the pin in place in the retaining pocket 14 when installed therein. The pin 100 may be removed as needed, when the trailer 12 is stationary, to permit the movable section 32 to be moved to establish the open position of the pocket 14. The shorter portion of the pin 100 may extend at a right angle to the longer portion, and can function as a handle for gripping and manipulating the pin.

Figure 4A:
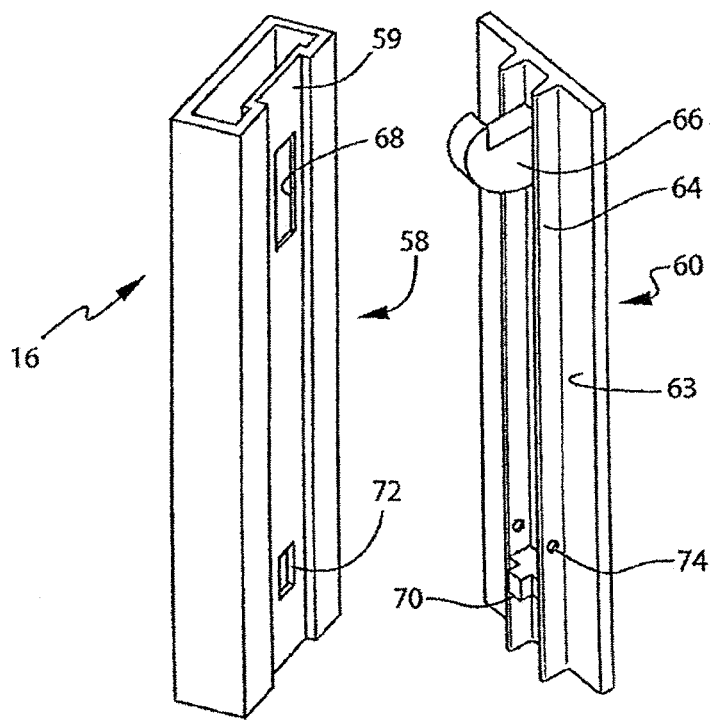
FIG. 4A is an exploded perspective view of a first embodiment of a two-part stake according to the invention.

As shown in FIGS. 4A and 7A, and as discussed further below, an outer section 60 of the stake 16 may also include openings 74 through which the pin 100 may be extended, to secure the stake 16 in place in the closed pocket 14. Further, as depicted a stopper 106 may optionally be provided near the pocket, e.g., extending from an outer protective rail 3 to prevent the pin 100 from being unintentionally displaced from the openings 102, 104, e.g., when the trailer is moving. Particularly, the stopper 106 is disposed at a level below the openings 102, 104 by a distance less than the length of the shorter portion of the pin 100.

For insertion into the openings, the pin 100 is manipulated such that the shorter portion thereof is facing toward the trailer above the stopper 106, and after insertion, the shorter portion is rotated downwardly, such that it will contact the stopper 106 if the pin starts to move out of the openings, and will be prevented from further movement in such direction by the stopper. Also, the force of gravity will normally maintain the shorter portion of the pin 100 pointing downwardly.

With reference to FIGS. 7B, 7C there is shown another alternative embodiment of a pocket latch 155 according to the invention. In this embodiment, the pocket latch 155 includes a spring-biased locking member 108 mounted to the base member 30 at one side of the pocket 14. The locking member 108 includes an engaging member 110 which may be extended through openings 111 formed in the side walls of the base and movable sections of the pocket, respectively, when the pocket is in its closed position, and a handle 112 which can be manipulated to lock the engaging member 110 in the latched position thereof, or to release the engaging member from the movable member 32.

Again, a stopper, such as the stopper 106 in the first embodiment of the locking mechanism, may optionally be provided to operatively engage the handle 112 to prevent unwanted movement thereof as in the first embodiment, or alternatively, an internal spring may be provided to urge the engaging member 110 into the openings 111 of the pocket 14.

With reference to FIG. 2D, the latch 55' may include a rotatable shaft provided with the pocket base portion 30 having one or two latch arms 56 which operatively engage with catches 56' formed with the pocket outer portion 32 to maintain the pocket in a closed position. The rotatable shaft may be spring-biased or the like so that it is normally urged to a latched position thereof, and may include a free end which functions as a handle for manipulation by an operator.

Stakes

Figure 4B:
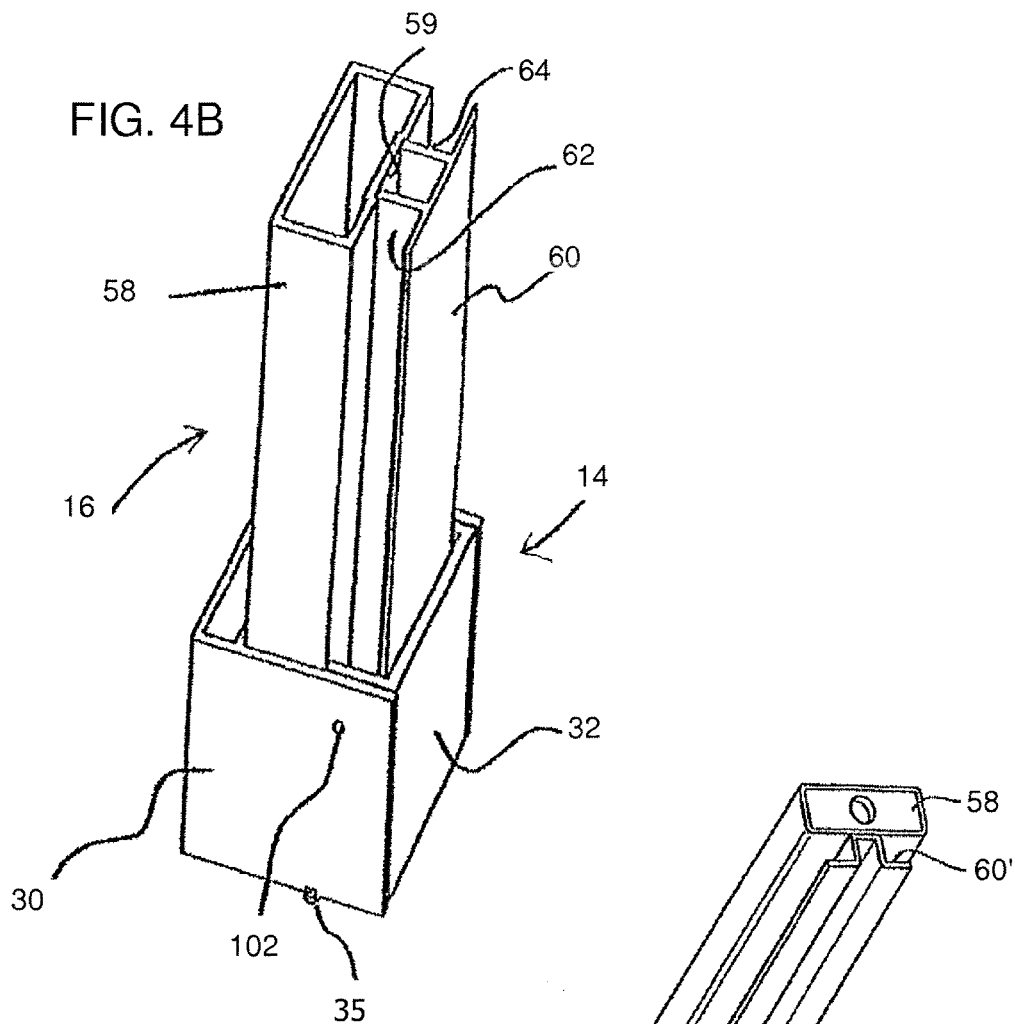
FIG. 4B is a perspective view of the stake of FIG. 4A shown assembled and installed in a pocket according to an embodiment of the invention.

With reference to FIGS. 4A and 4B, there is shown a stake 16 according to an illustrative embodiment of the invention, and this stake includes an inner section 58 and an outer section 60 which are selectively connectable together, and which cooperate when assembled to define a pair of opposed vertical grooves 62 therebetween (FIG. 4B) along opposite sides of the stake 16. The grooves 62 function to receive and retain vertical side edges of two adjacent panels 18 therein, when the stake is disposed in the retaining pocket 14 on the trailer.

The stakes 16 can be made from any appropriate material, however, aluminum or aluminum alloys are well-suited for the application. The stakes 16 may be formed by extrusion. Each stake 16 may be an elongated member with a uniform cross-sectional shape, adapted to have a lower portion thereof removably disposed in one of the retaining pockets 14.

As depicted, the inner section 58 of the stake 16 may be a tubular member having a cross-section that is substantially rectangular with a shallow central recess 59 formed in one surface thereof, however other cross-sectional shapes such as round, curved, polygonal, triangular, etc. could be used if desired.

The outer section 60 of the stake 16 may include a substantially flat elongate plate 63 with a pair of spaced-apart ribs 64 projecting transversely from one face thereof, such that outer edges of the ribs 64 engage the central recess 59 of the inner stake section 58 to define the grooves 62, as depicted in FIG. 4B. The side edges of the recess 59 engage the edges of the ribs 64 to help maintain alignment of the inner and outer stake sections 58, 60.

The outer stake section 60 may be provided with one or more upwardly extending hooks 66 extending outwardly from the plate 63 between the ribs 64, and these hooks may be inserted in an appropriate opening 68 formed in the inner section, to connect the inner and outer sections 58, 60 together. The height of the hook(s) 66 may be greater than that of the opening 68, such that the outer section 60 must be disposed at an angle in relation to the inner section 58 for insertion and removal of the hook(s), and when the inner and outer sections are disposed parallel to one another, the hook(s) extend within the hollow of the inner section above the opening 68, to operatively connect the outer section to the inner section.

Also, a projection 70 may be provided on a lower portion of the outer section 60 for preventing lateral movement of the inner and outer sections 58, 60 relative to each other, and relative to the retaining pocket 14 in which a lower end of the stake 16 is disposed. The projection 70 is snugly received by a corresponding opening 72 provided in a lower portion of the inner section.

Aligned openings 74 may be provided in the ribs 64 of the outer section, which receive a pin 100 of the pocket latch 55 therethrough, so that the stake 16 is engaged by the pocket latch, such as shown in FIGS. 5 and 7A, and as previously discussed. Further, a fixed projection 70' may be provided with the base 30 of the pocket which extends through a corresponding opening (not shown) formed in the inner section 58 of the stake when the inner section is disposed in the pocket, as shown in FIG. 2D, whereby the stake is substantially prevented from moving relative to the pocket during operative use of the cover system, e.g., when a vehicle having the cover system thereon is traveling.

The shape of the outer section 60 of the stake 16 may be modified from that shown in the drawings, if desired, so that the outer section may also be engaged by the engaging member 110 of the pocket latch 155 in the second embodiment thereof.

Figure 13A:
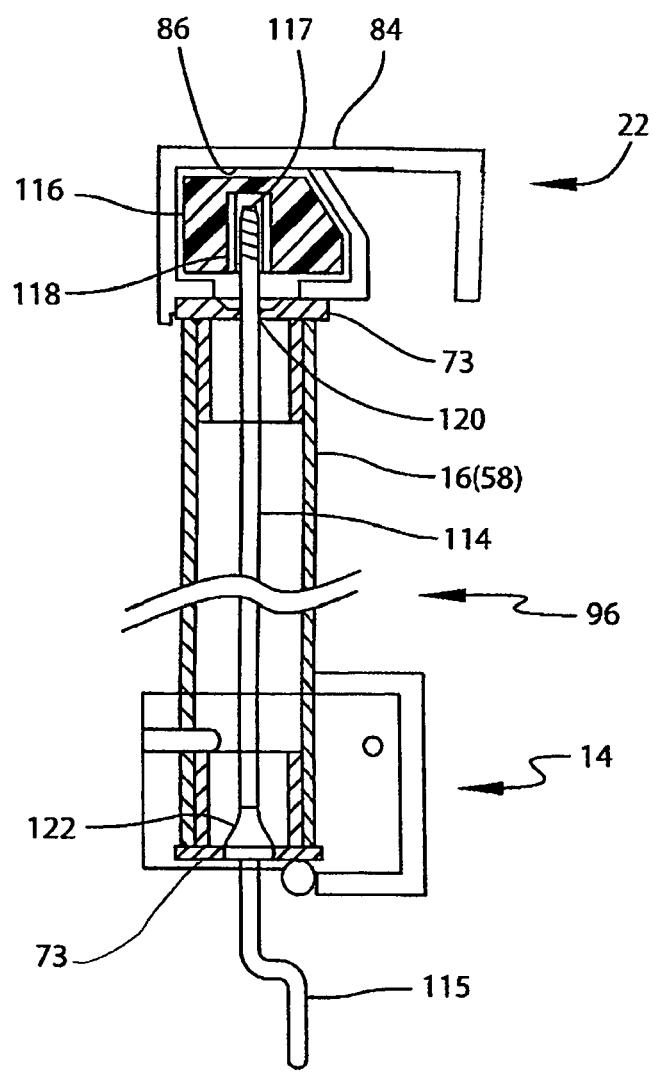
FIG. 13A is a sectional side view of a rail locking mechanism according to an embodiment of the invention, which connects the top rail to the stakes.
Figure 13B:
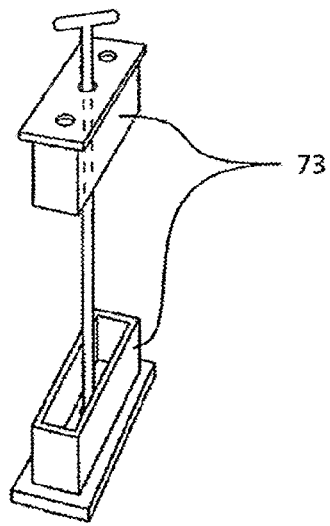
FIG. 13B is a perspective view of a connecting rod extended through a pair of caps, which are provided to be fitted in the ends of a stake.
Figure 13C:
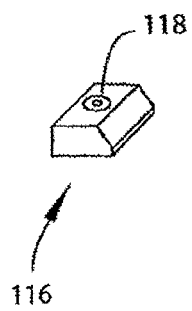
FIG. 13C is a perspective view of a connecting block which is a component of the rail locking mechanism of FIG. 13A.

As shown in FIGS. 13A-13B, the stakes 16 may also include caps 73, formed of plastic or other appropriate material, and fitted in the opposite ends of the inner section 58. The caps 73, where used, provide multiple functions, including: sealing the hollow interior of the inner section; receiving the ends of the hooks 66 against the interior thereof to maintain the inner and outer sections in tightly engaged relationship, while preventing the hooks 66 from directly engaging the inner section 58 (which could cause undesirable wearing of the inner and outer sections); guiding portions of a rail locking mechanism, as discussed further below; preventing metal components of the system from contacting each other; etc. The caps 73 are relatively inexpensive, and may be easily replaced when worn or desired.

The multi-section stake 16 is also an important aspect of the system 10 according to the present invention, representing another significant change from conventional cover systems of this type, in that the multiple-section construction (in combination with the retaining pocket of the invention) permits the stakes 16 and the panels 18 to be conveniently installed and removed by a person standing at ground level adjacent to the trailer.

Figure 4C:
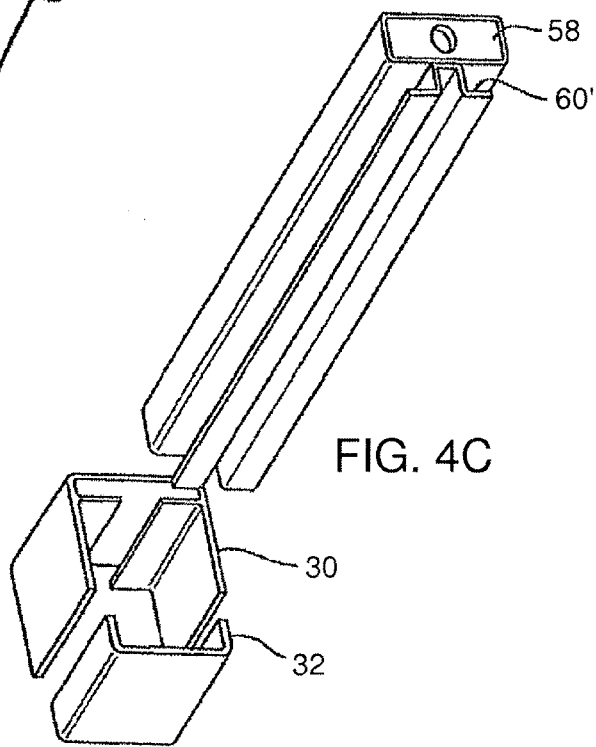
FIG. 4C is an exploded perspective view of another embodiment of a stake and pocket according to the invention.
Figure 4D:
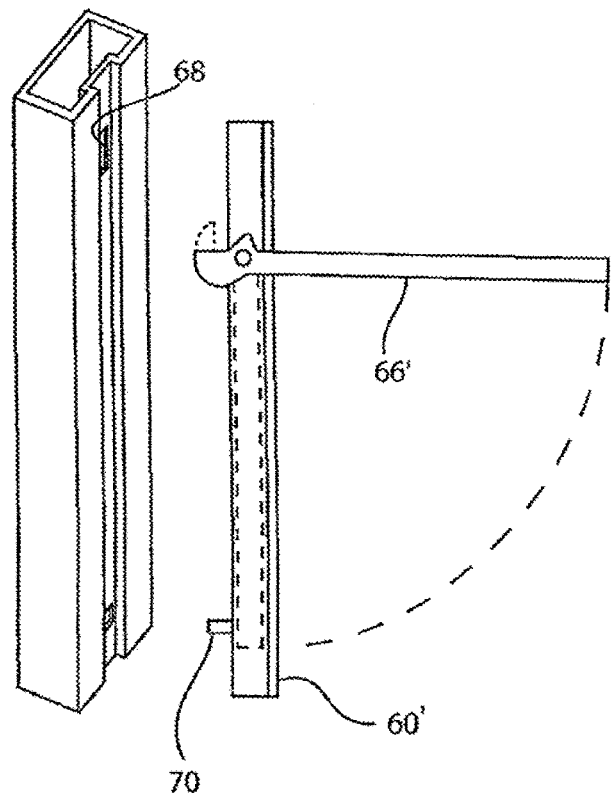
FIG. 4D is a partial perspective and partial side plan view of a two-part stake similar to the stake of FIG. 4A, showing an optional latch mechanism.

While an embodiment of the stake 16 is described above, the invention is not limited to the specifics of such embodiment. For example, the outer section may be configured as a channel-shaped member 60' with a substantially U-shaped cross section as shown in FIG. 4C. Such member may be readily formed by pressing a piece of flat stock, for example, and functions essentially the same as the outer section 60 in FIG. 4A. Further, instead of the hooks 66 in FIG. 4A, the inner and outer sections of the stake may be connected using a movable connecting member 66' as shown in FIG. 4D. The member 66' extends through and is pivotally connected to the outer section 60', with a short hooked end on one side of the pivot and a longer handle on the other side of the pivot. For attaching the outer section to the inner section, the handle is pivoted away from the outer section, the hooked end is inserted in the opening 68, and the handle is rotated back toward the outer section such that the hooked end is rotated upward to engage the stake inner section. The handle conveniently fits in the central channel of the U-shaped outer section when the stake sections are connected together.

With, reference to FIGS. 3E, 3F there is shown a modified embodiment of the present invention wherein a pocket such as that of FIG. 3D is modified in cooperation with a modification of a multi-part stake such as shown in FIG. 4A or 4B, such that the outer wall 44' of the pocket remains connected to the outer portion 60" of the stake via fastener 49 which extends through a circular opening defined in the outer wall and an elongate opening formed in the outer portion, but can be moved/slid relative to the pocket base section 30' and the outer portion 60" of the stake for convenience in attaching and detaching the outer wall 44' and the outer portion 60" relative to the system through appropriate manipulation of the fastener 49 and the outer wall 44". As shown, the outer wall 44' is slidably connected to the base section 30' in guillotine fashion via projections 44" which slide in channels 30" formed in lateral walls of the base. Further, the projections 44" do not extend the full length of the outer wall, but include gaps therealong, while similarly the channels 30" include intermediate openings formed in the outer faces thereof which operatively cooperate with the projections to permit removal of the outer wall 44' from the base without sliding the outer wall fully above the base. Specifically, when the fastener 49 is tightened the outer wall 44" and the stake outer portion 60" are fixed immovably together, such as when the system is in its operative, traveling state. However, when the fastener is loosened somewhat but continues to connect the outer wall 44' and the stake outer portion 60", the outer wall can be slid upward relative to the stake outer portion due to the elongate shape of the opening formed in the outer wall and through which the fastener extends. When the outer wall is slid upwardly to a point where the projections 44" align with the gaps in the channels 30", the outer wall 44' can be moved outwardly apart from the base 30', together with the stake outer portion 60" connected thereto, by a person standing on the ground next to the system. Once the stake outer portion is removed, the stake base remains on the vehicle, but panels 18 can be moved relative thereto for being removed. Particularly, when the stake outer portion 60' is removed, there will be a gap between the edges of the two panels that had been retained by the stake, such that one of the panels may be slid over into the gap (thereby freeing the opposite edge of the panel retained by an adjacent stake) and the panel may then be removed, after which the other panel may similarly be removed. The lower end of the pocket may be closed by a plate 51, which functions as a stop for the lower end of the stake inserted in the pocket, and opening or recess 51' may be formed in the outer portion of the plate 51 for facilitating manipulation of the pocket outer wall 44", e.g., an operator may insert a finger into the opening 51' and raise the finger, thereby also raising the outer wall 44'. This modification is desirable because, for example, the outer wall 44' remains conveniently connected to the stake outer portion 60" at all times via the simple fastener, so that the components do not become misplaced.

Pocketless Stakes

Figure 4E:
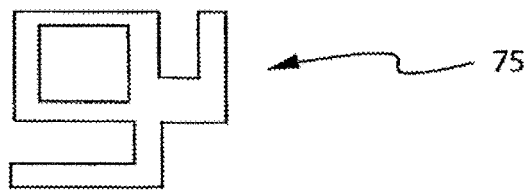
FIG. 4E is a plan sectional view of an embodiment of a corner stake according to an embodiment of the invention.
Figure 4F:
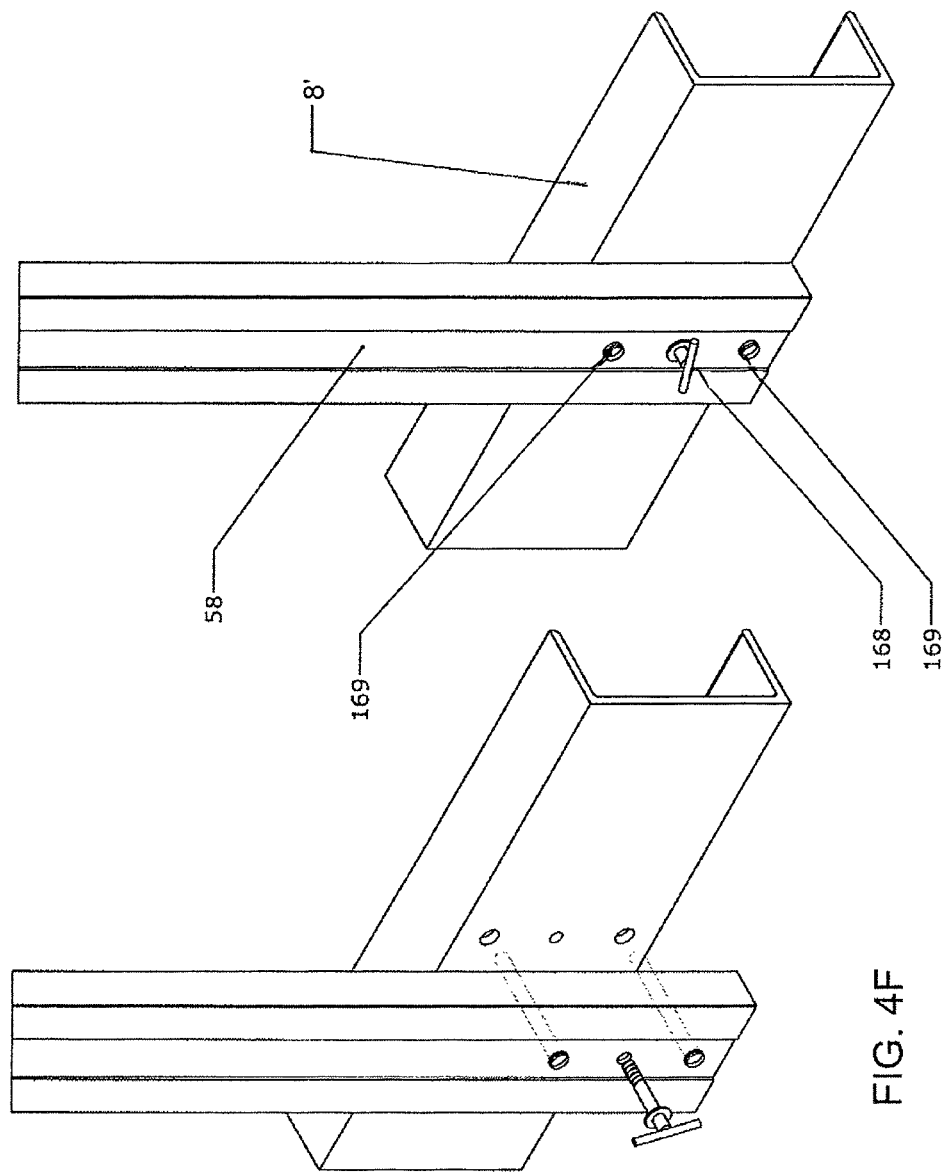
FIG. 4F is a perspective view of an embodiment of a pocketless stake according to the invention.

While the stakes 16 may be advantageously used together with the pockets 14 as discussed above, according to another modification of the present invention the stakes may alternatively be connected directly to the trailer 12 or to spacers connected to the trailer, such as shown in FIGS. 4F, 4G.

Referring to FIG. 4F, there is shown one embodiment of a pocketless stake according to the present invention. In this embodiment, a lower part of the inner portion 58 of the stake may be selectively connected to the side of the trailer bed 11 or, as depicted, to a spacer 8' extending outwardly from the side of the trailer using a fastener 168 which may be inserted through openings formed in the stake inner portion and the spacer and appropriately secured. For example, the fastener may have a threaded end which is screwed into threads formed in the spacer opening or to a threaded nut provided on an inner face of the spacer. As another example, the fastener may be a rotatable member having a T-shaped inner end such that it may be inserted through an elongate opening in the spacer when oriented in one direction, and then when the fastener is rotated 90° the T-shaped end securely engages the inner surface of the spacer. For additional stability and reliability of the connection between the stake and the spacer, a plurality of fasteners 168 may be used, or as depicted one or more projecting members 169 may be provided on the inner portion 58 of the stake which are received in additional opening(s) formed in the spacer 8'. When the projections 169 are disposed in the openings they prevent the stake inner portion 58 from rotating or otherwise moving relative to the spacer 8'. Of course, the projection(s) could alternatively be provided on the spacer 8', while the receiving openings are formed in the stake inner portion. If the outer portion 60 of the stake is formed separate from the inner portion 58, the outer portion 60 would connect to inner portion in a manner such as discussed above relative to FIGS. 4A, 4B, 4D, for example, while if the outer portion of the stake 60 remains connected to the inner portion such as in FIG. 4C above, the outer portion 60 may be provided starting above the lower part of the inner portion that is connected to the spacer.

Referring to FIG. 4G, another embodiment of a pocketless stake according to the present invention is similar to the embodiment of FIG. 4F except that: a fastener 168' is T-shaped at opposite ends thereof; an oblong opening 8" is formed in the member 8' which permits the inner T-shaped end of fastener 168' to pass there through when end is aligned with the opening; and a flanged bracket 170 is provided in conjunction with the fastener 168, rather than the projections 169. The fastener 168' can be selectively secured to member 8' by inserting its inner T-shaped end into the slot 8" and then rotating the fastener so that the end is no longer aligned with the opening. An appropriate device such as a latch (not shown) may be provided to maintain the fastener in its locked position. The flanged bracket 170 may be connected to the stake inner portion 58 at appropriate positions such that one or two flange(s) 170' thereof operatively engage upper and/or lower surfaces of the sides of trailer or a spacer 8' extending from the trailer. Similar to the projection(s) 169, the flange(s) 170' prevent the stake inner portion 58 from rotating or otherwise moving relative to the trailer or spacer. Of course, the threaded fastener 168 could be used in the embodiment of FIG. 4G.

Sidewall Panels

As previously noted, the stakes 16 are provided to support and interconnect a plurality of panels 18. The panels 18 are generally rectangular in shape, and may be made from any flat rigid material including plywood, fiberglass, polymers, foams, sheet metal, composites, or any combination of these.

The panels 18 are made in a suitable thickness to fit snugly into the vertical grooves 62 of the stakes 16. If constructed of lightweight materials, such as open-celled foam with inner and outer aluminum skin bonded thereon, the panels 18 are easier to manipulate and are more fuel-efficient to use. Alternatively, the panels could be formed using a rigid outer frame formed of aluminum, plastic or other suitable material, and a lightweight covering material such as vinyl appropriately secured to the frame to form a substantially smooth/flush outer surface with the frame. Such a construction would desirably reduce the weight of the system, and yet have a suitable appearance similar to the panels formed of rigid materials.

Figure 15A:
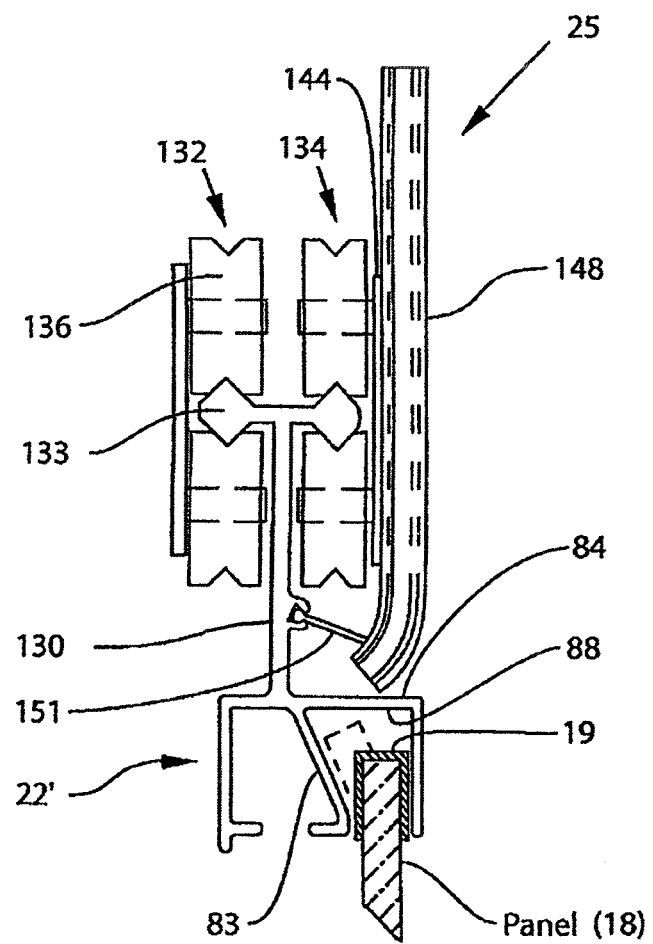
FIG. 15A is a cross-sectional detail view showing a side portion of a trailer bed and cover system according to another embodiment of the invention, including the top rail and guide assemblies including movable bow supports.

The height of the panels 18 may be somewhat greater than the width thereof, although this is not required. Further, the panels 18 may have different lengths or other dimensions if desired, but if the panels have identical sizes, this allows for interchangeability and standardization of manufacture. Optionally, the panels 18 may be provided with handles in appropriate locations for being easily grasped by an operator, and where used, such handles may be provided, for example, as straps or projections attached to the panels, or openings formed in the panels to receive a hand of a user therein. As another optional feature, an upper horizontal edge of each of the panels 18 may be reinforced with a frame or reinforcement member 19 extending over the panel on three or four sides thereof, as shown in FIG. 15A.

Figure 11A:
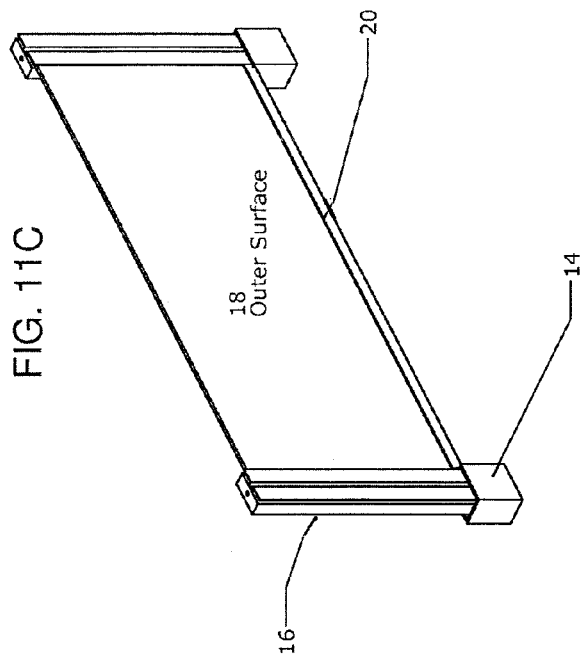
FIG. 11A is a perspective view of selected components of the system hereof, including a seal, a panel, a pocket, and a stake, shown from a vantage point outside of the trailer.
Figure 11B:
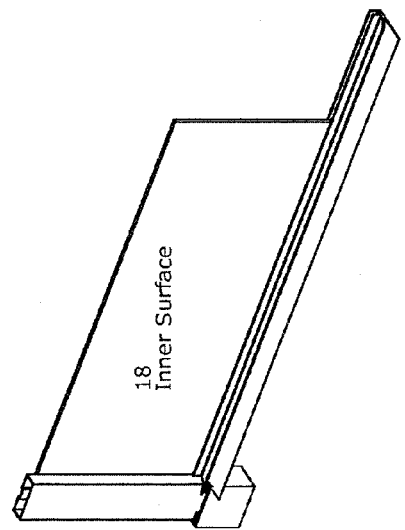
FIG. 11B is a perspective view similar to FIG. 11A, shown from a vantage point inside of the trailer.
Figure 11C:
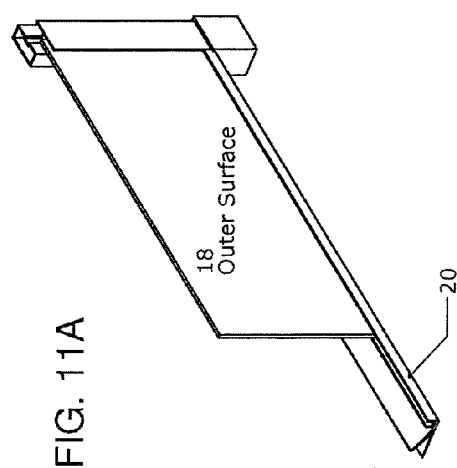
FIG. 11C is a perspective view of a panel supported between a pair of stakes on a portion of the flatbed trailer, together with the sealing member, shown from a vantage point outside of the trailer, and showing an alternate embodiment of the stakes.

According to an important aspect of the inventive cover system 10, when the system hereof is assembled on a truck trailer 12, the panels 18, as supported by the stakes 16 and retaining pockets 14, are disposed away from the trailer 11 at the outside of the retaining pockets 14, such that the outer surfaces of the panels 18 are substantially flush with the outer surfaces of the stakes 16, as shown in FIGS. 11A-11C, and as discussed further below. This presents a substantially smooth and aerodynamic exterior trailer surface, for improved efficiency and fuel economy during over-the-road travel of the trailer 12.

Correspondingly, it is desirable to provide some additional support for the bottom edges of the panels 18 besides the upper edges of the pocket sidewalls 36, 37, which have a relatively small surface area. For such purpose, as shown in FIGS. 2B and 5, a pair of integral support brackets 50 may be provided longitudinally extending from, and attached to the side walls 36, 37 of the retaining pockets 14. As depicted, the brackets 50 may be attached between sides of the trailer 12 and pocket side walls, e.g., via welding. The brackets 50 include flat upper surfaces 52 on outer portions thereof, for supportively contacting lower edges of the panels 18, and inner portions 54 which slope downwardly toward the trailer so as to avoid interference with the seal members 20 (discussed further below).

The brackets 50 may be constructed other than shown. For example, they could be formed integrally with the retaining pockets, they could have a different shape or size from that depicted, etc.

Figure 10:
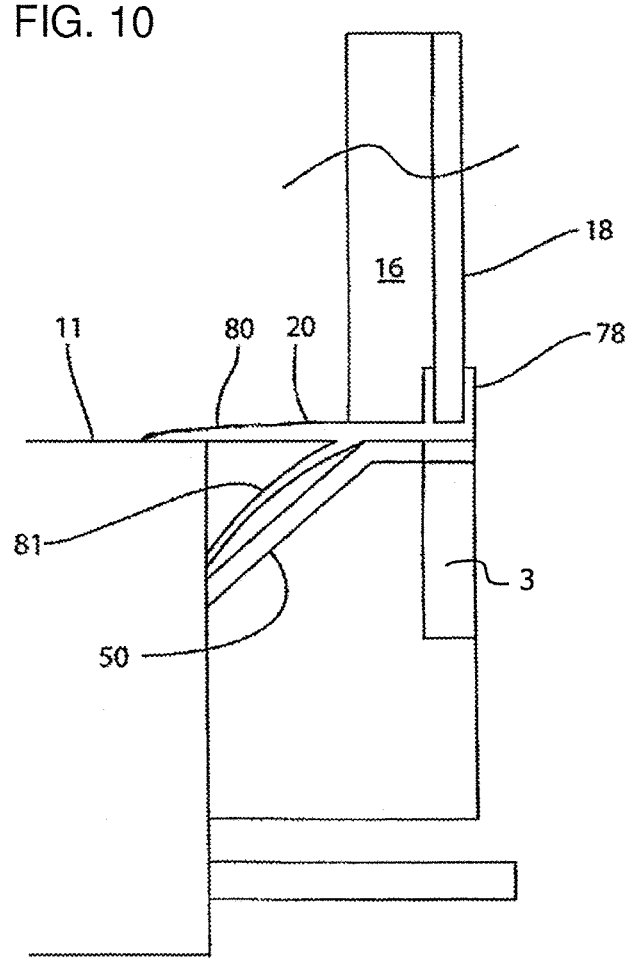
FIG. 10 is a side view of the sealing member of FIG. 9, installed between a panel and trailer bed of the system hereof and disposed to seal a space between the bottom edge of the panel and the flatbed trailer.

As an alternative or additional support for the panels 18, an outer protective bumper rail 3 shown in FIG. 10 corresponding to the conventional bumper rail 3 in FIG. 2 may, optionally, be disposed such that its upper surface is at a level and disposition to support the bottom edges of the panels. As an alternative to disposing the bumper rail 3 at an appropriate level, spacers could be provided between the upper surface of the bumper rail 3 and the lower surfaces of the panels 18 so that the panels are supported at an appropriate level. This may be appropriate for an existing trailer being fitted with components of a cover system according to the present invention. The bumper rail 3 may extend continuously along substantially the full longitudinal length of the trailer 12, or could be provided in sections between the pockets 14.

Method of Disassembling Stakes and Panels

As previously discussed, in prior art cover systems, conventional stakes make it difficult to manually install and remove the stakes and the associated panels relative to a flatbed trailer or the like. In contrast, with the stake 16 and retaining pocket 14 of the present invention, the following convenient procedure may be used for removing the stakes and panels from a trailer.

Initially, the truck is parked in a secure location, such as adjacent a loading dock. Then, the pocket latch 55 or 155 is released, and the movable section 32 of the retaining pocket 14 is manipulated to move it to the open position thereof. The outer section 60 of the stake 16 is then removed or detached from the inner section 58 thereof, which creates a gap between opposing vertical edges of a pair of the panels 18, corresponding to the space between the ribs 64 of the outer section 60.

One of the exposed panels 18 may then be removed by sliding or displacing it longitudinally to close the gap until it approaches or abuttingly contacts an edge of the adjacent panel 18. This longitudinal movement of the panel 18 removes the opposite vertical edge of the displaced panel from a recess 62 of an associated stake, whereupon the displaced panel is no longer secured by any post, and can be manually pulled off or down from the trailer.

The other panel can then be removed in like fashion, and a similar process can be applied for removing other stakes and panels of the system, as desired, to access the contents of the trailer. For mounting the stakes and panels to the trailer, a reverse process is applied.

Although the multi-section stake and the multi-section retaining pocket of the invention function very advantageously in combination, as discussed above, the two part stake could (of course) be used together with a conventional, non-moving pocket. In such case, it may be necessary to lift the lower portion of the stake out of the retaining pocket before the sections of the stake could be separated. In such use, the stake would be disposed in the pocket such that the panel-receiving recesses face outwardly of the trailer, and would permit panels to be installed on and removed from the system by a person standing on the ground next to the trailer. For example, once the outer section of the stake is separated and removed from the inner section, again, a gap would be defined between the two panels that were supported by the stake, one of the panels could be slid over into the gap such that the opposite side edge of the panel is released from the adjacent stake, and then the panel could then be removed from the system. Such procedure could be reversed for installing a panel to the system. Similarly, a one-piece stake could, if desired, be used with the inventive pocket 14 according to the invention.

Again, another important aspect of the invention is the disposition of the panels 18 such that the outer surfaces thereof are disposed away from the trailer at the outside of the retaining pocket, and substantially flush with the outermost surfaces of the stakes, as shown in FIGS. 11A-11C. In this arrangement, the stakes project outwardly of the panels only by the width of the outer wall 60 thereof. This advantageously provides the cover system with a relatively smooth and aerodynamic outer surface, unlike the conventional systems where the stakes project significantly outwardly from the panels. As a result, the system according to the present invention improves aerodynamic characteristics and improves aesthetic appearance of the trailer.

Further, the outward disposition of the panels 18 in the present invention effectively creates additional covered cargo storage space in comparison to conventional systems. For example, in comparison to conventional systems, in which the panels are supported on or directly adjacent to the trailer, the panels of the present invention may be spaced outwardly from the trailer by approximately two-three inches while still meeting the same government regulations on vehicle width as the conventional systems. For a trailer which is forty feet long and a cover system which is six feet high, this effectively creates additional usable storage space within the trailer, e.g., 40-80 cubic feet, as compared to a conventional cover system.

Still further, this reduces the possibility of interference between the panels and cargo support straps and chains, which are typically anchored below the trailer bed, and extend around and over the edge of the trailer bed to secure the cargo.

At the junctions between the two sides of the trailer and the rear end of the trailer, it is possible to use a corner stake 75 which includes a pair of panel-receiving recesses extending at a right angle to each other, i.e., one recess facing parallel to the side of the trailer and the other recess facing parallel to the rear of the trailer. A cross section of such a corner stake 75 is shown in FIG. 4E. The lower portion of the stake 75, that fits in the retainer pocket, may have a different shape from that in FIG. 4E, e.g., the section of the stake defining the recess facing parallel to the side of trailer could be eliminated, so that the lower portion fits in a retaining pocket 14 shaped the same as the other pockets. Generally, it is desirable that a stake at the rear end/corner of the trailer may have enhanced strength and rigidity as compared to other stakes of the system 10 because the end/corner stake will normally be supporting a larger load than the other stakes. In conventional systems which use the same stakes for all positions on the trailer, the stake at the rear end of the trailer tends to be bent and lean forwardly over time due to the larger load it supports.

Seal Member

With reference to FIGS. 1 and 8-11C, the seal members 20 of the system 10 are configured and arranged to seal the spaces or openings defined between the lower edge portions of the panels 18 and the trailer bed 11. Sealing of this area is important, given that the panels 18 may be disposed at the outside of the retainer pockets 14, and significantly spaced away from the trailer, as discussed above. Although only a thin section of a seal 20 is shown in FIG. 9 for simplicity of illustration, the seal members 20 may be approximately as long as the panels 18, and one seal member may be disposed along the entire length of the bottom edge of each panel, or alternatively the seal members may be as long as several panels together or may extend substantially the full length of the trailer as discussed below. Thus, the sealing members 20 may extend substantially completely around the two sides and the rear of the trailer, although there may be a small gap at a central portion of each stake 16, corresponding to the disposition of the panels.

Referring now to FIGS. 8-10, it will be seen that the seal member 20 may include a panel-engaging portion 78 including two spaced-apart vertical flanges 76, 77 interconnected by a bridge portion 79, and first and second trailer-engaging portions 80, 81. As shown, the first trailer-engaging portion 80 may be adapted to engage the upper surface of the trailer bed 11, while the second trailer-engaging portion 81 may be adapted to extend diagonally downward from the first member to abuttingly contact the side surface of the trailer bed. This is advantageous for forming an effective seal against water, dirt and other foreign matter.

Of course, the seal member 20 may include various modifications. For example, while two of the flexible portions 80, 81 are shown, the seal member 20 may include only one of the flexible portions or more than two of the flexible portions. As another example, the panel-engaging portion 78 may be structured to fit over the upper edge of the conventional bumper rail 3 provided at the side of a trailer rather than being fitted to the bottom edge of the panel 18, such that the lower surface of the panel would simply rest on the upper surface of the portion 78 such as shown in FIG. 9A. Depending on the level of the upper surface of the bumper rail, e.g., if it is below the level of the flat support surface of the trailer where the lower edge of the panel should be disposed, spacer(s) 79' may be disposed between the bumper rail and the engaging portion 78 of the seal member 20 so that the seal member will be at the appropriate height for supporting the panel. Indicated at 80' is an optional recess formed in the upper surface of the seal member and which would be engaged by the lower edge of a panel supported on the seal member. As another possibility, the portion 78 may extend both upwardly and downwardly so as to be fitted over both the upper edge of the bumper rail and over the lower edge of the panel as shown in FIG. 9B. Still further, the seal member could be simply formed as continuous flat or substantially flat member wide enough to extend between the edge of the trailer and the lower portion of the panel(s), and which may have one edge or portion attached to the lower portion of the panel(s) or to the edge of the trailer using appropriate fastening means such as screw, adhesive, etc., and another portion sealingly engaging the trailer or the lower portion of the panel.

Such a modification is shown in FIG. 9C wherein a seal 20' is provided as a single length of rubber or other appropriate elastomeric/flexible material with an enlarged edge, and a frame 19' for a panel is formed with a slot shaped to slidably and securely receive the enlarged edge of the seal 20' therein. In use, the free end of the seal 20' would engage the side or flat upper surface of the trailer. If the seal member 20' becomes damaged, it can easily be removed and replaced with a new seal member. Also as shown, the panel frame 19' may include identical slots on the opposite sides thereof and a central circular shaped slot. Forming the seal-receiving slot on both sides provides some flexibility for reversing the panel frame if one of the slot becomes damaged, and if the panel frame 19' is also provided along the top edge of the panel and if an upper rail 22 according to the invention is not used, another seal member 20' may be secured to the upper panel frame 19' such that it projects outwardly to engage the tarp and provide a seal which restricts passage of water and other foreign matter between the panel and the tarp. The central circular shaped slot may be used to facilitate screw assembly of the panel frame 19' to a panel 18, as an alternative to riveting, adhesive bonding, etc.

The seal 20 is also an important aspect of the system 10 according to the present invention, including the illustrative embodiments. It advantageously eliminates or at least minimizes gaps though which water and other foreign matter may enter into the storage space within the cover system. The seal member 20 is especially important when considered together with the outwardly spaced disposition of the panels 18 relative to the trailer 12 in the depicted embodiments, because a substantial gap is formed laterally between the lower end of the panels and the trailer. The seal member 20, including the flexible portions 80, 81, also helps to maintain its sealing function during movement of the trailer, while accommodating flexing movement of the trailer bed 11.

The seal member 20 can be permanently bonded or attached to the panel 18 or to the bumper rail 3, e.g., using adhesive or fasteners, to reduce the possibility of the seal detaching therefrom during handling or transit, or otherwise becoming lost. However, the seal member 20 could alternatively be detachably connected to the panels or the bumper rail, if desired, e.g., via friction or snap fit of the panel-engaging portion 78 around the bottom edge of the panel or the upper edge of the bumper rail.

The panel-engaging portion 78 may include a plastic or metal insert (not shown) made of a harder material than the flexible portions 80, 81 and the rest of the seal 20. The sealing member, particularly the flexible portions 80, 81 can be made from a rubber material, a strong reinforced silicone elastomer, or other water-resistant elastomeric or flexible material. While other materials could be used if desired, flexible materials such as rubber and elastomers provide excellent sealing characteristics, and the seal member 20 cooperates well with any load securing straps or chains that may be needed to pass between the flatbed and the seal member.

While embodiments of the seal member 20 are discussed above, it will be understood that variations may be made thereto. For example, the particular shape of the seal member 20 may be modified as desired, as long as the sealing function is maintained, e.g., the panel-engaging portion 78 may be other than U-shaped in section, the trailer-engaging portion 81 could be made in a different size and/or shape than the portion 80, one or any other number of trailer-engaging portions could be used instead of two, etc.

As another possible modification, a conventional bumper rail 3 could be modified to include a slit or recess which is shaped to receive and retain an edge of an elongate flexible seal member such that the seal member extends away from the bumper rail and engages the upper and/or side surfaces of the trailer to seal the space between the spaces defined between the trailer and the lower portions of the panels. Similarly, an elongate extrusion of metal such as aluminum or an appropriate plastic could be formed including a slit or recess, the extrusion could be secured to the trailer, e.g., along the edge of the trailer bed, and an edge of an elongate flexible seal member could be received/retained in the slit such that the seal member extends away from the trailer and engages the lower portions of the panels and/or the bumper rail to seal the space between the spaces defined between the trailer and the lower portions of the panels. Still further, such a modified bumper rail, such extrusions, and such seal members could be used in combination as multiple seals for sealing the spaces between the trailer and the lower ends of the panels. In such a combination the seal members may each fully cover the spaces between the trailer and the lower portions of the panels, or each of the seal members may only partially cover the spaces and engage each other intermediately of the spaces such that the combination of seal members fully covers the spaces between the trailer and the lower portions of the panels.

While the seal member 20 is advantageously used as part of the covering system 10 according to the depicted embodiment of the present invention, the seal member also has substantial utility by itself, e.g., it may be retrofitted as a seal member for conventional tarp-and-rack cover systems. As in the depicted system 10, the seal member could be operatively engaged to the lower portions of the panels in the conventional systems, and/or to the upper portions of the bumper bars at the sides of the conventional trailers, for providing a sealing function between the panels and the trailer on which the conventional cover system is disposed. Again, one major drawback of conventional systems is that gaps are formed between the panels and the trailer by the curvature of the trailer bed and other factors, and the seal member according to the present invention is very effective to cover/seal such gaps.

Moreover, if the seal member is to be supported on the bumper bars of the conventional trailers, it is possible to very simply increase the effective storage space within the conventional cover systems. Particularly, the conventional cover systems have oriented the conventional support stakes 4 such that the panel receiving recesses 6 face inwardly toward the trailer 1 such that the panels are supported on the edge of the trailer as discussed above with reference to FIG. 22. However, if the conventional system is retrofitted with the sealing member 20 of the present invention and the sealing member is supported on the upper portion of the bumper bar 3, for example, the conventional stake 4 may be rotated 180° from the normal disposition such that the recesses 6 are disposed outwardly away from the trailer 1. In this case, the lateral width of the storage space within the cover system is effectively increased by the width of the stake 4 on both sides of the trailer, which is substantial as discussed above. Also, in such case the conventional system will have improved aerodynamic outer shape and will be sealed against water and other foreign matter.

Figure 4H:
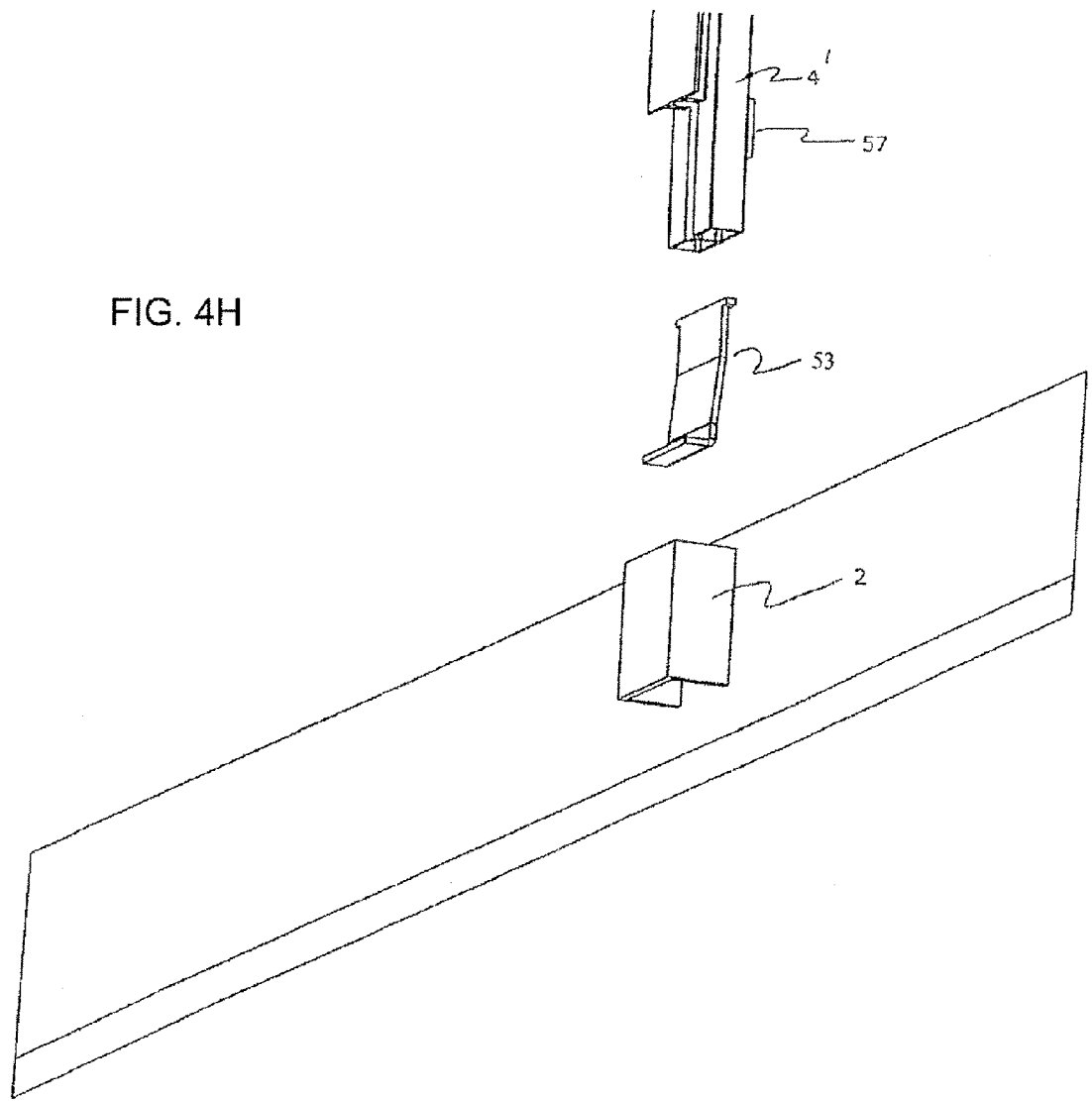
FIG. 4H is an exploded view of a modified pocket and stake according to the invention.
Figure 41:
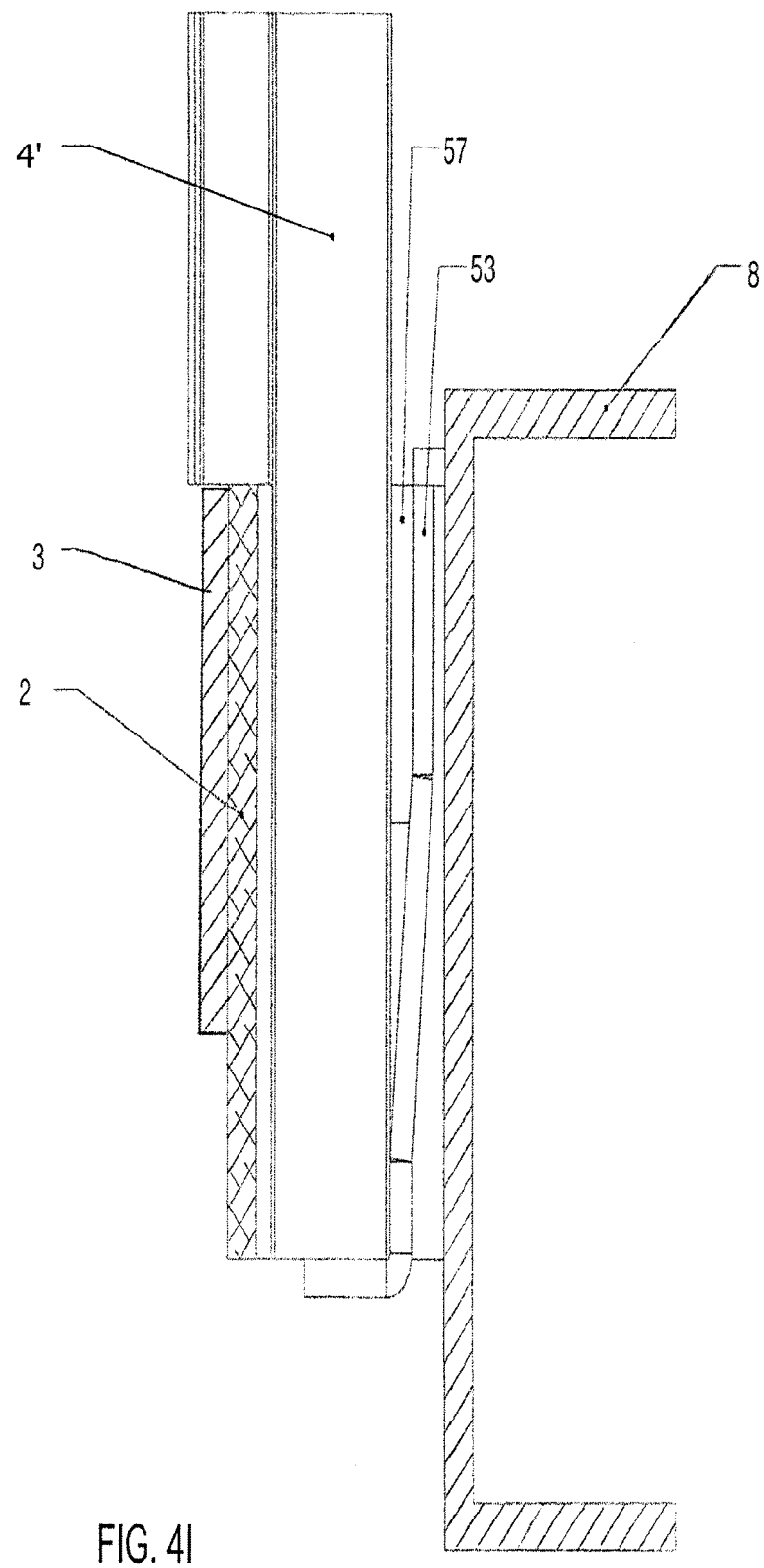

With reference to FIGS. 4H, 4I, there is shown some possible modifications to a conventional stake 4' and a conventional pocket 2 which facilitate and improves the use of same with a sealing member (not shown in FIGS. 4H, 4I) according to the present invention. According to such modifications, a retainer 53 may be connected within the pocket 2 to effectively reduce the width of the pocket opening and to provide a bottom stop for engaging a lower surface of the stake 4', and an optional wedge 57 may be secured to a lower surface of the stake 4' on a side opposite to panel-receiving channels which operatively, securely engages the retainer 53 when the lower end of the stake is inserted in the pocket 2. An upper end of the retainer 53 may be connected to an inner surface of the pocket via welding, bolts, or other appropriate means, a middle portion of the retainer may angle outwardly of the trailer bed 11, and the lower end of the retainer may be bent at an angle of approximately 90° to close off part of the lower opening of the pocket. The wedge 57 may simply be a plate of metal, rigid plastic or other material that is connected via welding, adhesive bonding, bolting, or other appropriate means. With use of the retainer 53, with or without the optional wedge 57, the lower portion of the stake is tightly and stably supported in an outer portion of the conventional pocket 2, again, such that the panel—receiving recesses 6 of the stake are disposed away from the trailer bed 11, and such that the stake does not move/rattle within the pocket when the trailer is moving. In this modification, the outer surface of the stake 4' may extend outwardly beyond the outer surface of the pocket 2, such that the outer surface of stake is not flush with the outer surface of the pocket, but most of the advantages of the present invention as discussed above are still achieved. In this modification of the invention, again, a conventional bumper bar 3 may be fixed to the outer surface of the pocket 2, such as shown in FIG. 4I, and a seal member according to the invention may be supported on the upper edge of the bumper bar. Alternatively, the bumper bar 3 may be provided in sections and fixed between adjacent ones of the pockets 2 such that the bumper bar is flush with the outer surfaces of the pockets, and the seal member may be correspondingly provided in sections supported on the sections of the bumper bar, respectively.

As other possible modifications to the conventional stake and pocket, according to the present invention the stake and/or pocket may be formed with a reduced width such that the stake has a uniform shape along its full length and a lower portion of the stake may be inserted in the in the pocket without having to be cut/machined. This is very desirable because the stakes can be simply formed through extrusion (as is normal with an aluminum stake), and without labor-intensive operations of cutting/machining the lower portion of the stake to fit into the pocket. A cover plate may be provided at the lower end of the pocket as a stop for the lower end of the stake. Panels retained by the stake may have their lower surfaces supported on the upper surfaces of the pockets, by extensions such as those shown at 52 in FIG. 2B, and/or by a bumper bar 3 and (again) seal members according to the present invention may be used in association with the panels. In this modification, the lower portion of the stake need not occupy the entire space within the conventional pocket, e.g., a retainer such as 53 may be provided with the pocket to snugly retain the lower end of the post therein.

Figure 4J:
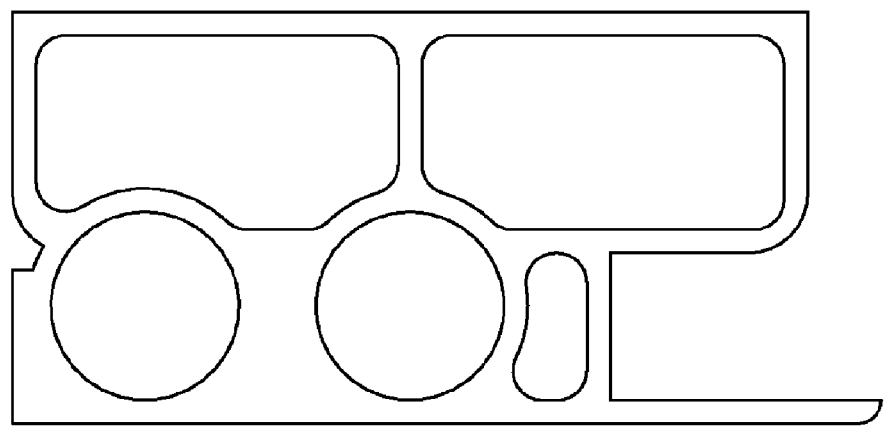
FIG. 4J is a sectional view of a corner stake according to an embodiment of the present invention with a reduced width and with openings to receive the ends of a pair of conventional bows.

As discussed above, a corner stake disposed at a rear end of the trailer should have enhanced strength/rigidity because it supports a larger load than the other stakes, but this may be accomplished while still reducing a width of the stake. For example, the rear corner stake could be provided with two openings to receive/support the ends of two bows, rather than with a single opening to receive/support a single bow end, such as shown in FIG. 4J. The stakes in FIGS. 4H, 4J may have the same reduced width, and be supported in similar modified pockets.

Figure 4K:
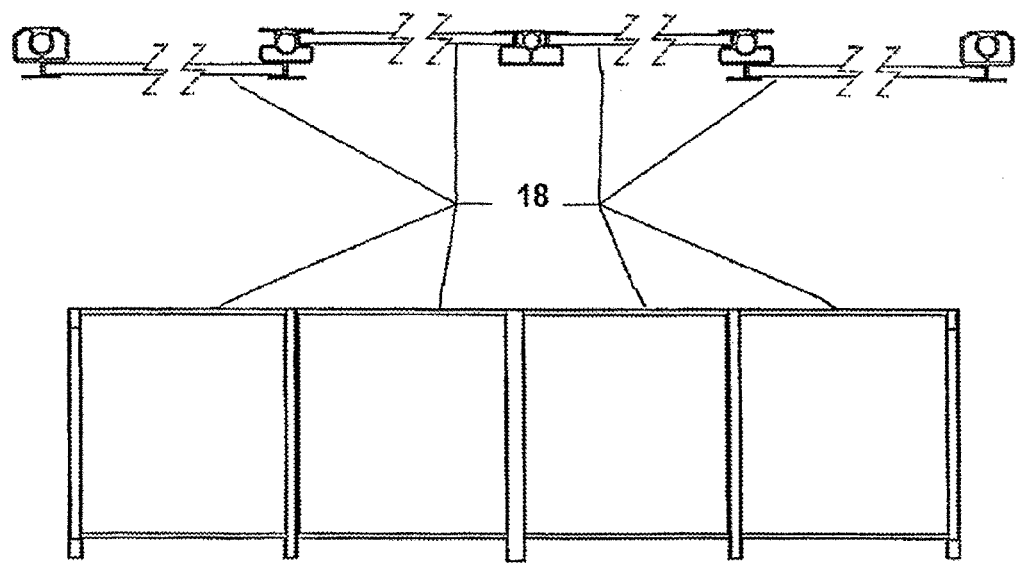
FIG. 4K is a top plan view of several panels secured by different types of posts, including a conventional post, and the posts of FIGS. 4H, 4L.
Figure 4L:
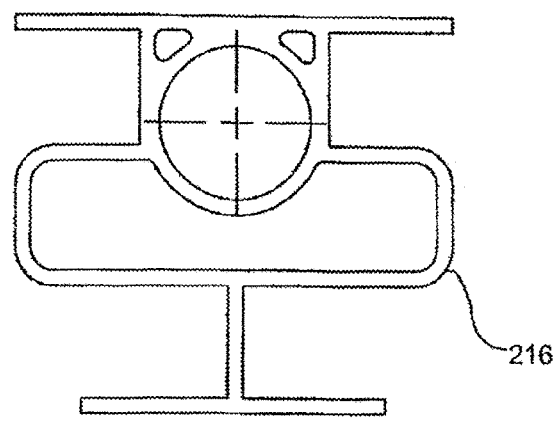
FIG. 4L is a cross sectional view of another embodiment of a post, a conversion post, according to the present invention.

According to still another possibility according to the present invention, multiple different types of stakes may be used together for supporting panels at the side of a trailer, such as shown in FIG. 4K. In the depicted arrangement several of the same types of panels 18 are supported by three different types of posts, i.e., a pair of conventional wide posts 4 retain panel edges inwardly along the lateral edge of the trailer, a pair of conversion posts 216 according to an embodiment of the present invention cooperate with the conventional posts in supporting the opposite edges of the panels inwardly along the lateral edge of the trailer, and a reduced width post 4 according to the present invention cooperates with the two conversion posts 216 to retain two of the panels 18 spaced outwardly of the lateral edge of the trailer, a couple of inches outwardly of the other panels. The lower edges of the panels 18 may be supported as discussed above, including through use of the trailer edge, the pocket, a bumper bar 3 and/or a seal member 20. The conversion post 216, shown in a larger scale in FIG. 4L, has the same width as the conventional post 4, but includes a first pair of panel-retaining grooves 6 on the inner side of the post, and a second pair of grooves 6 on the outer side of the post. With such construction, the same post 216 can retain edges of some panels inwardly toward the trailer and other panel edges outwardly away from the trailer. This may be desirable, for example, if a particularly wide load is supported at certain part(s) of the trailer, if it is necessary to extend load-securing chains or ropes over the sides of the trailer, etc. Of course, any combination of the various posts may be used as desired.

Rails and Rail Locking Mechanism

With reference to FIGS. 1 and 12A-12D there is shown support rails 22 disposed above the stakes 16 at the sides and rear end of the trailer, and in FIGS. 8 and 13A-14C, there are shown two embodiments of a rail locking mechanism 96 according to the invention, and either one of these rail locking mechanisms may be used to connect the rails 22 to the stakes 16 and to the pockets 14.

As shown best in FIG. 1, the rails 22 extend longitudinally along the sides of the trailer, and may be formed in multiple sections, e.g., two longer sections extending most of the trailer's length, and a short section at the front of the trailer adjacent the headboard 26. Alternatively, the rails 22 could be formed in shorter lengths corresponding to the length of the panels 18, or any other or various lengths if desired. The rail section 22 extending along the rear of the trailer may be formed in a single section as shown.

The rail sections 22 can be disconnected from the stakes 16 and removed, as needed, when the trailer is parked in a secure location. Because trailers flex and move during use, so as to be temporarily shaped concave or convex in the longitudinal direction, gaps 23 (FIG. 1) may be provided between opposing faces of the rail sections 22, to accommodate such movement.

The rail sections 22 may be formed of any appropriate material(s), including metals such as extruded aluminum, plastic, etc. and may have a cross sectional shape as shown in FIG. 12C, including a horizontal plate section 84, three downwardly depending walls 82, 83, 85 which define inner and outer channels 86, 88 inside of the rail. Two of the adjacent depending walls 83, 85 may include parallel horizontal flanges 89, 91 extending toward one another at lower edge portions of the depending walls 83, 85, as shown, such that the parallel flanges define a slot 87 therebetween. Optionally, in the embodiment shown in FIG. 12C, the rail sections 22 may also include an upwardly extending top wall 90.

Also, as shown in FIG. 12B, a plurality of bow end supporting members 92, formed of plastic resin, metal, composites, or other appropriate material, may be provided in spaced relation along the rail 22. In one embodiment of the system 10, these bow end supporting members 92 may be fixed to the top wall 90 and/or the horizontal plate section 84 using an appropriate bonding agent, fastener, etc.

The bow end supporting members 92 may each have an opening or recess 94 formed in the upper surface thereof that is adapted to securely receive therein a terminal end portion of a cover-supporting bow 25 therein, such that the bows may be operatively connected to the rails 22 through the bow end supporting members 92. The bow end supporting members 92 may be provided in any desired spacing along the rails, and need not specifically align with the stakes 16, unlike in conventional systems where the bows are supported by the stakes and must be aligned therewith.

The inner channel 86 of the rail 22 may have a substantially trapezoidal cross sectional shape with the slot 87 defined centrally along a bottom horizontal wall thereof, while the outer channel 88 may have a substantially trapezoidal cross sectional shape with a completely open lower end, as depicted. The bottom wall of the inner channel 86 is disposed adjacent to the upper end of the inner section 58 of the stake 16, although the end of the cap 73 may be disposed therebetween, and the stake may be connected to the rail 22 at the inner channel 86 via the rail locking mechanism 96 according to the invention, as discussed further below.

As shown in FIG. 15A, an upper horizontal edge of the panel 18 may extend within a lower portion of the outer channel 88 during normal use of the cover system 10, while an inner wall 83 of the outer channel 88 may be tapered inwardly, such that the upper portion of the channel 88 has a greater width than the lower portion thereof. Optionally, as noted above, the upper horizontal edge of the panel 18 may be reinforced with a reinforcement member 19 extending over the panel on three sides thereof, as shown. With such construction, after the stakes 16 have been removed, the upper edge of the panel 18 may be raised further within the channel 88 toward the bottom of the upper plate section 84, and then the lower portion of the panel may be conveniently swung outwardly away from the trailer, to orient the panel 18 in the angled configuration shown in phantom in FIG. 15A, which greatly facilitates installation and removal of the panel by persons standing on the ground adjacent to the trailer.

With reference to FIGS. 12B and 13A, a first embodiment of the rail locking mechanism 96 for connecting the rail 22 to the stake 16 and the pocket 14 according to the invention will now be described. As depicted, the rail locking mechanism 96 may include an elongate connecting rod 114, which extends from a handle portion 115 at the bottom of the pocket 14 through the stake 16 and ends with a threaded tip 117 disposed in the rail 22. A lower portion of the rod 114 may extend through an opening defined in a bottom wall of the pocket 14, and an enlarged lower end of the rod may be sized so that it cannot pass through the opening in the pocket bottom wall. At the top of the rod 114, a connecting member or block 116 is disposed within the inner channel 86 of the rail 22, and this block may include a threaded female nut member 118 therein for receiving and being connected to the threaded tip 117 of the rod 114.

The connecting rod 114 may be formed of steel, a metal alloy, or other appropriate material(s), while the connecting member 116 may be formed of plastic or other appropriate material(s). A segment of the connecting member 116 is shown in perspective view in FIG. 13C. The connecting member or block 116 may extend the full length of the rail 22 within the inner channel 86, having an appropriate number of openings formed therein for being connected to a plurality of the stakes 16. Most of the connecting rod 114 may extend through the stake inner section 58, such that it is normally concealed from view. The lower end of the connecting rod 114 may have an appropriate tool engagement fitting formed therewith or provided thereon, e.g., a slot or recess to receive a screwdriver head, a hexhead tool or the like, for being rotated by such a tool, may be threaded such that a wing nut or the like may screwed thereon, etc. The upper end of the rod having the threaded tip 117 may be securely received in a threaded opening formed in the connecting member 116 or in a nut 118 secured in the member 116, and then spun to tighten the connecting member 116 and the rail 22 downwardly against the top of the stake 16. The nut 118 may replace the connecting member 116.

With such construction, the rail locking mechanism 96 of the invention may be used to readily connect the rails 22 very securely and tightly to the stakes 16 and pockets 14, and to similarly disconnect these components as may be desired, by a person standing on the ground adjacent to the trailer. Particularly, the connecting rod 114 may be extended upwardly through the opening in the bottom wall of the pocket until the threaded upper end thereof engages the threaded opening in the connecting member 116. Then, the rod 114 may be rotated with an appropriate driving tool engaged with the rod's lower end, until the threaded upper end of the rod is securely threaded into the member 116. As the rod is rotated more and more, the connecting member 116 engages the bottom wall of the rail inner channel 86, thereby drawing the rail 22 into very close and tight contact with the upper end of the stake 16 which is in turn tightly secured to the pocket 14. Similarly, the lower end of the rod may be threaded with a wing nut or the like secured thereto, the wing nut can be rotated to a degree necessary to draw the rail 22 into very close and tight contact with the upper end of the stake 16.

This discussed connection between the rails 22, stakes 16 and pockets 14 via the rail locking mechanism 96 is another important aspect of the system 10 in comparison to conventional cover systems including stake-supported panels, which (again) do not include any component corresponding to the rails 22 of the present invention. For example, the connection provides significantly enhanced strength and stability to the system, and assures that there is little or no play between the stakes, pockets and rails, which desirably reduces movements and vibrations of the components during travel, which reduces associated wear and noise, and again, the connection may be effected by a person standing on the ground adjacent to the trailer.

If the connecting member 116 is formed of plastic or plastic foam, it is not only inexpensive to manufacture and lightweight, it also prevents direct contact between the connecting rod 114 and the rail 22, which is desirable to prevent rapid wear of the rail, especially if the rail is formed of aluminum and the rod is formed of steel. The connecting member 116 may have the threaded opening(s) formed directly therein, but could alternatively have threaded insert(s) 118 formed of steel or other appropriate material glued or otherwise fixed within a non-threaded opening formed in the connecting member 116. Also, a lower portion of the insert 118 or of the opening, where an insert is not used, may, optionally, have a tapered shape, to facilitate insertion of the upper threaded end of the rod 114.

The caps 73 provided in the ends of the stakes 16 may have openings 120 defined therein through which the rod 114 may pass, while a seal 122 may be provided in conjunction with a lower end of the rod 114 and/or with the lower cap 73 to prevent water and other foreign matter from entering the lower end of the stake.

Figure 14C:
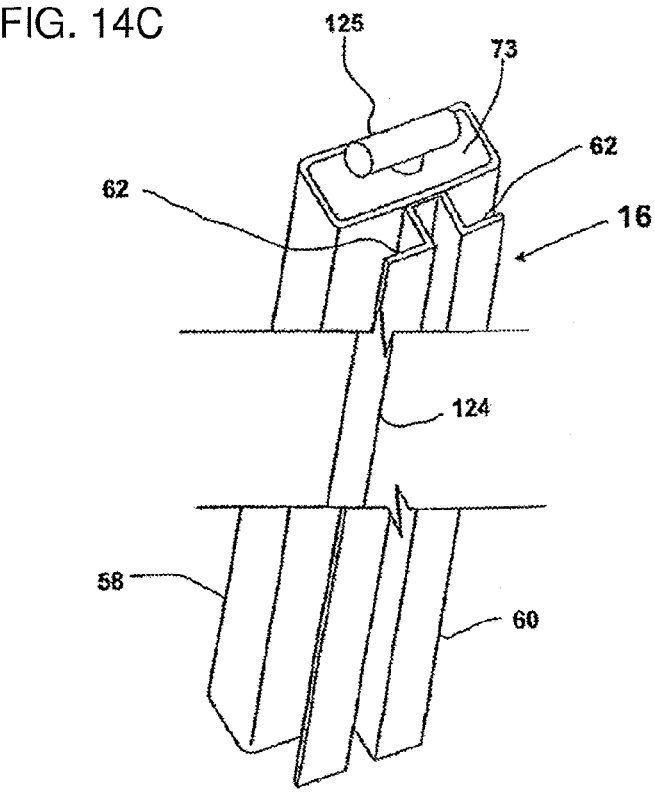
FIG. 14C is a perspective view, partially cut away, of an upper portion of the stake and the T-shaped upper end of the rail locking mechanism of FIG. 14A.
Figure 14B:
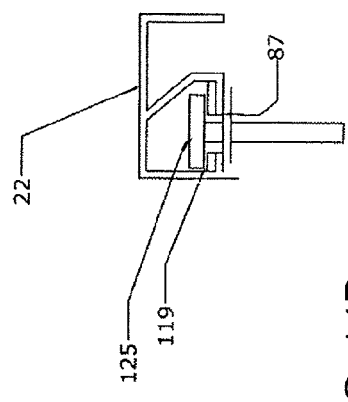
FIG. 14B is a detail side view of an upper portion of the rail locking mechanism of FIG. 14A, showing the T-shaped upper end in a second position thereof.
Figure 14D:
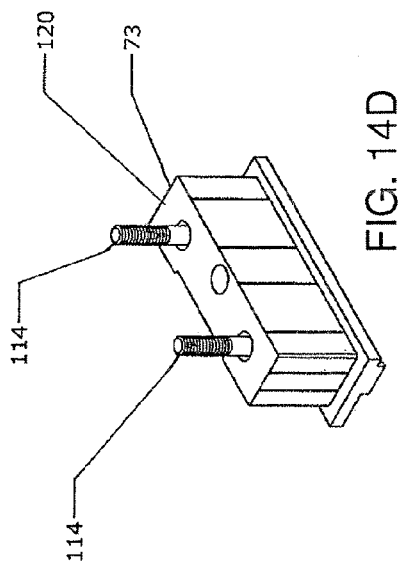
FIG. 14D is a detail perspective view of an end cap with two threaded rods of a rail locking mechanism extending outwardly therefrom.

As depicted in FIGS. 1 and 14D, adjacent ends of two abutting sections of the rails 22 may be connected to a single stake 16 and a single pocket 14. In this case, two of the connecting rods 114 are used, one for each rail. The connecting member 116 may have a pair of the openings provided therein for receiving the end of the rods, where such adjacent rail sections are found, and the caps 73 may have multiple openings 120 defined therein at appropriate locations to permit the rods 114 to pass therethrough. In this manner, the rail sections are all connected together in the system for enhanced strength and rigidity.

Figure 14A:
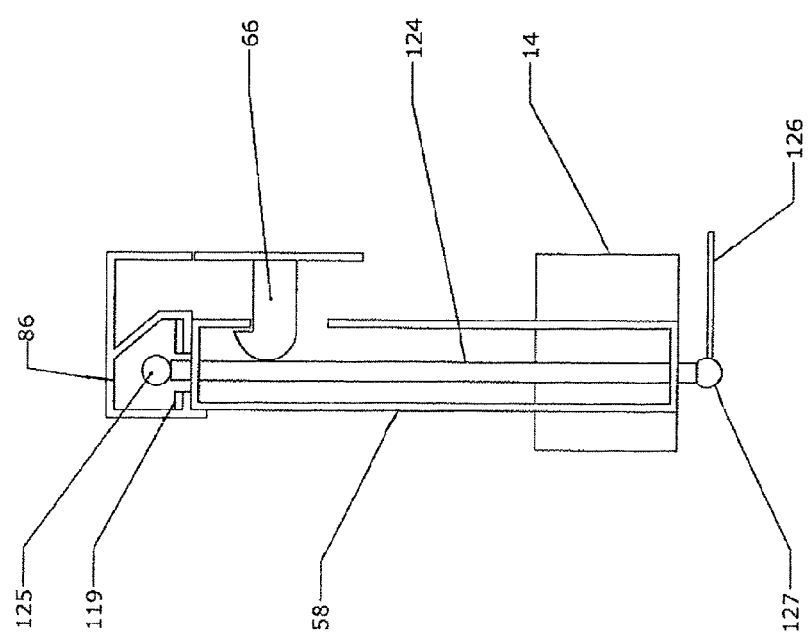
FIG. 14A is a sectional side view of an upper portion of the stake and a rail locking mechanism according to another embodiment of the invention, with a T-shaped upper end shown in a first position thereof.

With reference to FIG. 14A, a second embodiment of the rail locking mechanism 96 according to the invention will now be described. This embodiment includes components similar to those in the first embodiment, but differs primarily in the structures associated with the ends of a connecting rod 124, and in the associated structure of the pocket 14. Particularly, the upper end 125 of the connecting rod 124 may be enlarged in a substantially T-shape, and the lower end of the rod may have a pivot handle 126 pivotally connected thereto via an eccentric connection 127. With such structure, the handle 126 may be rotated about a vertical axis, corresponding to the rod 124, for selectively engaging and disengaging the T-shaped upper end 125 with the slot 87 formed in the bottom wall of the rail inner channel 86, for thereby connecting and disconnecting the rail 22 to the stake 16 and pocket 14; and the handle 126 may also be rotated about a horizontal axis, which causes the eccentric connection 127, which is in engagement with a bottom wall of the pocket 14, to move the connecting rod 124 upwardly or downwardly in the stake inner section 58. When the rod's upper end 125 is engaged with the bottom wall of the rail 22 in the inner channel 86, and the rod is drawn downwardly by rotation of the handle 126, this correspondingly draws the rail 22 onto tight engagement with the stake 16, and draws the stake into tight engagement with the pocket 14.

In this embodiment, the movable section 32 of the pocket 14 does not interfere with movements of the handle 126 when the section 32 is in the open position thereof, but will prevent the handle from being moved when the section 32 is in the closed position thereof. This is, of course, desirable to maintain the rail, stake and pocket tightly connected together when the trailer is traveling. Further, the base and/or movable sections of the pocket 14 will be modified, in this embodiment, to accommodate the handle 126 and/or the eccentric pivot connection 127.

The connecting member 116 may optionally be used in this embodiment, although it does not require a threaded opening therein to be connected to the enlarged T-shaped upper end 125 of the rod, or instead, the connecting member 116 may be replaced by a thin flat plastic reinforcing member 119 with a suitably-shaped opening to receive the tip end 125 of the connecting rod 124 therethrough. If the connecting member 116 is formed of plastic, it will desirably prevent direct contact between the rod upper end 114 and the rail. Alternatively, the connecting member 116 may be omitted, and the rod upper end 125 may have a plastic cover or coating provided thereon, to prevent contact between the steel rod and the aluminum rail.

Panels Supported Without Stakes

Figure 11D:
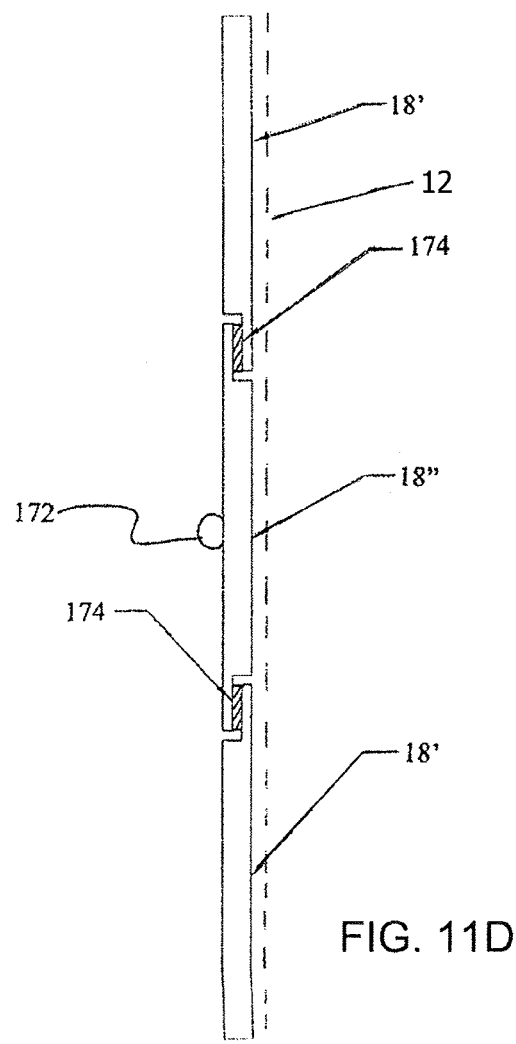
FIG. 11D is a perspective view of another embodiment of a panel according to the invention.
Figure 12A:
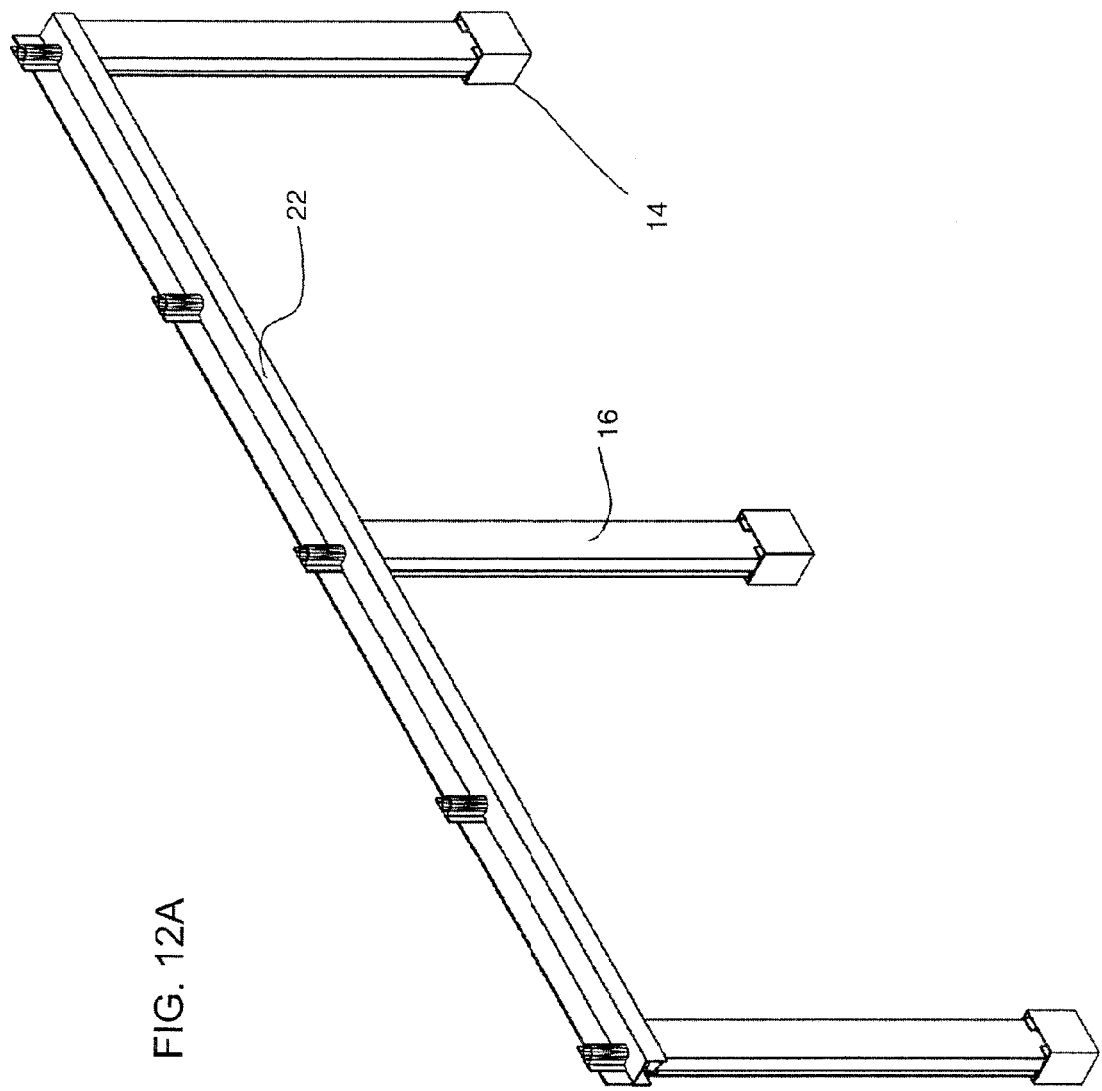
FIG. 12A is a perspective view of a plurality of stakes supported in retainer pockets according to an embodiment of the invention, shown from a vantage point inside of the trailer, and with a section of a top rail shown extending above the stakes.
Figure 12D:
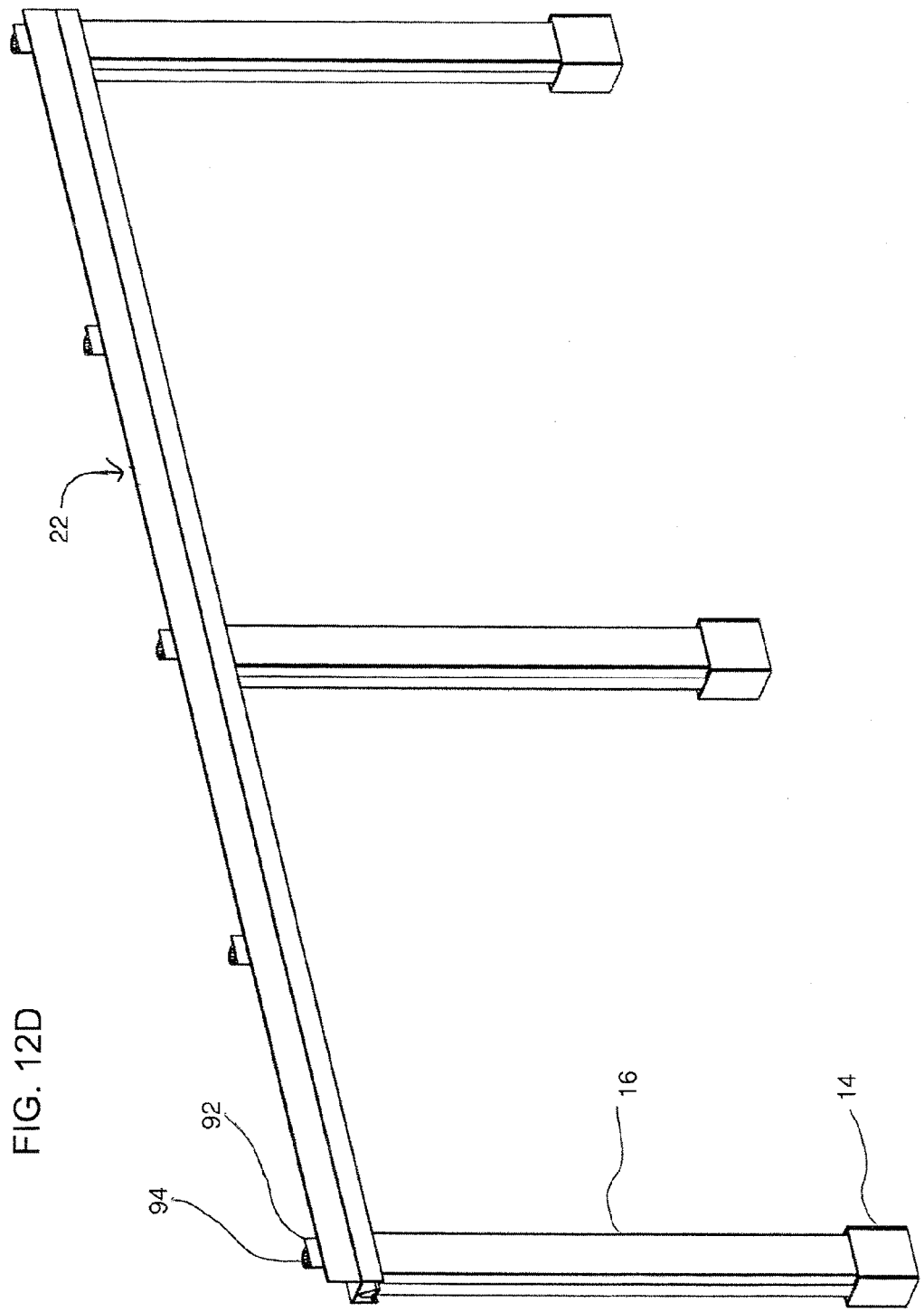
FIG. 12D is a view of a number of assembled stakes and a top rail similar to FIG. 12A, shown from a vantage point outside of the trailer.

Due to the added strength and stability provided to the cover system by the rail sections 22 and rail locking mechanisms 96, which secure the upper edges of the panels to the system, according to another modification of the present invention at least some of the panels may be modified such that they are supported with no stakes or with only one stake, such as shown in FIGS. 11D, 11E. As in the depicted embodiment, the side edges of the panels may be modified such that they overlap with and sealingly engage with the edges of adjacent panels, while the upper edges of the panels are retained in the channels of the rail sections 22, and the lower edges of the panels are supported by the seal members 20 provided on the bumper rail 3 as discussed above. Also, fastening clips 172 may be provided for further securing the lower portion of one or more of the panels to bumper rail 3 or to some other part of the trailer. As depicted, one of the side edges of each of a pair panels 18', or the panel edge reinforcing member 19 (not shown) thereon, may be formed with a stepped shape facing outwardly away from the trailer 12, while the opposite edges of the panels 18' have a conventional shape for being supported in channels 62 of respective posts, while a third panel 18" may be formed with a stepped shape on both side edges thereof facing inwardly toward the trailer, such that when the panel 18" is engaged with the panels 18' the stepped edges of the panel 18" overlap the stepped edges of the panels 18'. As thus disposed, the outer surfaces of the panels 18', 18" extend flushly to each other, giving the panels a favorable appearance and excellent aerodynamics. Also, a seal 174 formed of elastomeric material or other appropriate material may be provided between the overlapped panel edges for assuring a desirable sealing function between the panels during operative use of the system, including when the vehicle is traveling. The seal 174 may be secured to one or both of the overlapping panel edges.

The fastening clip 172 may be connected to a lower portion of a panel 18" so as to be pivotable thereto, and may be formed of spring steel or other appropriate material such that a free end of the clip may be securely engaged to the bumper rail 3 through a snap fit or the like without additional fastening means. By securing the panel 18" with the clip 172, this effectively also secures the adjacent overlapped panels 18' having the stepped edges which are engaged and secured to the system by the inwardly facing, stepped edges of panel 18", such that it is not necessary to provide the panels 18' with the clips 172, although it is certainly possible to do so if desired. Also, the free end of the clip may have a projection 173 provided therewith which an operator may grasp for easily manipulating the clip fastener onto or off of the bumper rail. Again, the panels may also be provided with a handle for facilitating manipulation of same as discussed above, or the fastening clip 172 may also function as a handle.

In use, when it is desired to expose a portion of a flat support surface covered by the cover system, an operator standing on the ground adjacent to the vehicle may readily remove the panel 18" by unfastening the clip 172, lifting the panel 18" off of the supporting seal 20, swinging the lower end of the panel outwardly, whereby the upper edge of the panel is rotated in the angled channel of the rail 22, and then removing the panel 18". Then one of the adjacent panels 18' may be removed by sliding it over somewhat into the space previously occupied by panel 18", lifting it off of the seal 20, then swinging the bottom portion of the panel outwardly and downwardly, and this procedure may be repeated for removing the other adjacent panel 18'. Thus, through this arrangement of the invention a relatively large space may be opened in a side of the cover system equal to the collective area of three of the panels 18', 18", e.g., approximately 24 feet wide and four feet tall. To replace the panels 18', 18", the above procedure may be performed in reverse sequence.

This modification of the system is very desirable because (among other reasons): it reduces the number of stakes and pockets required to support the panels on the system, and hence cost and weight of the system; it similarly facilitates assembly and disassembly of the system by an operator; it provides enhanced design freedom for the system in that the panels can be formed of various sizes; outer surfaces of the overlapping panels can be very flush with each other for improved aerodynamics and appearance, etc.

Tarp Cover and Bows

The tarp cover 24 extends over the flatbed trailer from the headboard 26 to the end cap 28. The tarp cover 24 also extends downwardly above the longitudinal sides of the trailer 12 to approximately the level of the rails 22, or the upper portions of the panels 18, so as to enclose the upper portion of the cargo space defined by the panels 18, stakes 16, headboard 26 and end cap 28.

The bows 25 extend beneath the tarp cover 24 to support same. The bows 25 may be arch-shaped as shown, oriented with the height of the arch at the top, or may be flat or any other desired shape. Opposite ends of each bow 25 may be operatively connected to and supported in recesses 94 of the bow end supporting members 92 provided on the rails 22, as discussed above and shown in FIG. 12B. If no end cap 28 and/or headboard 26 is used with the system, a bow would be disposed at a corresponding endmost position and the tarp cover may extend over the end(s) of the cover system similarly to the sides of the cover system. Further, if rails 22 are not used with the cover system, then the bow ends may be supported by the stakes 16, e.g., by insertion of same into openings 94' formed in upper ends of the stakes as shown in FIG. 23, and latch mechanisms 221 may be used to secure lateral edges of the tarp cover closely to the stakes as discussed further below.

The bows 25 can be made of any appropriate material(s), though extruded aluminum is suited well for the application, while the tarp 24 may be formed of vinyl, cloth-reinforced vinyl, or any other material as desired, including mesh or porous materials. Each of the bows 25 may be formed as one continuous member, or in multiple sections joined together. Conventional bows and tarp covers may be used in the cover system of the present invention.

Although not shown, ropes, elastic cords and the like may be used to secure the lower edges of the tarp cover to the trailer in a conventional manner, e.g., extending between openings/eyelets near the edges of the tarp cover and the sides of the trailer.

Figure 23:
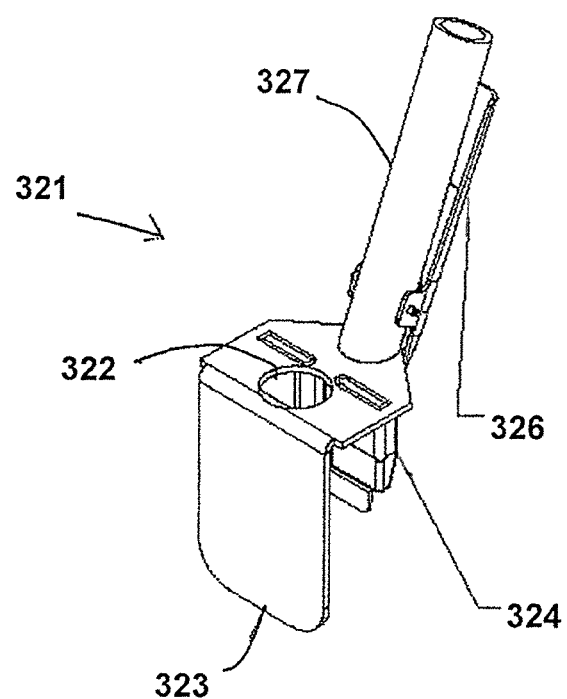
FIG. 23 is a view showing a latch mechanism for a tarp cover and its operation according to an embodiment of the invention.
Figure 24:
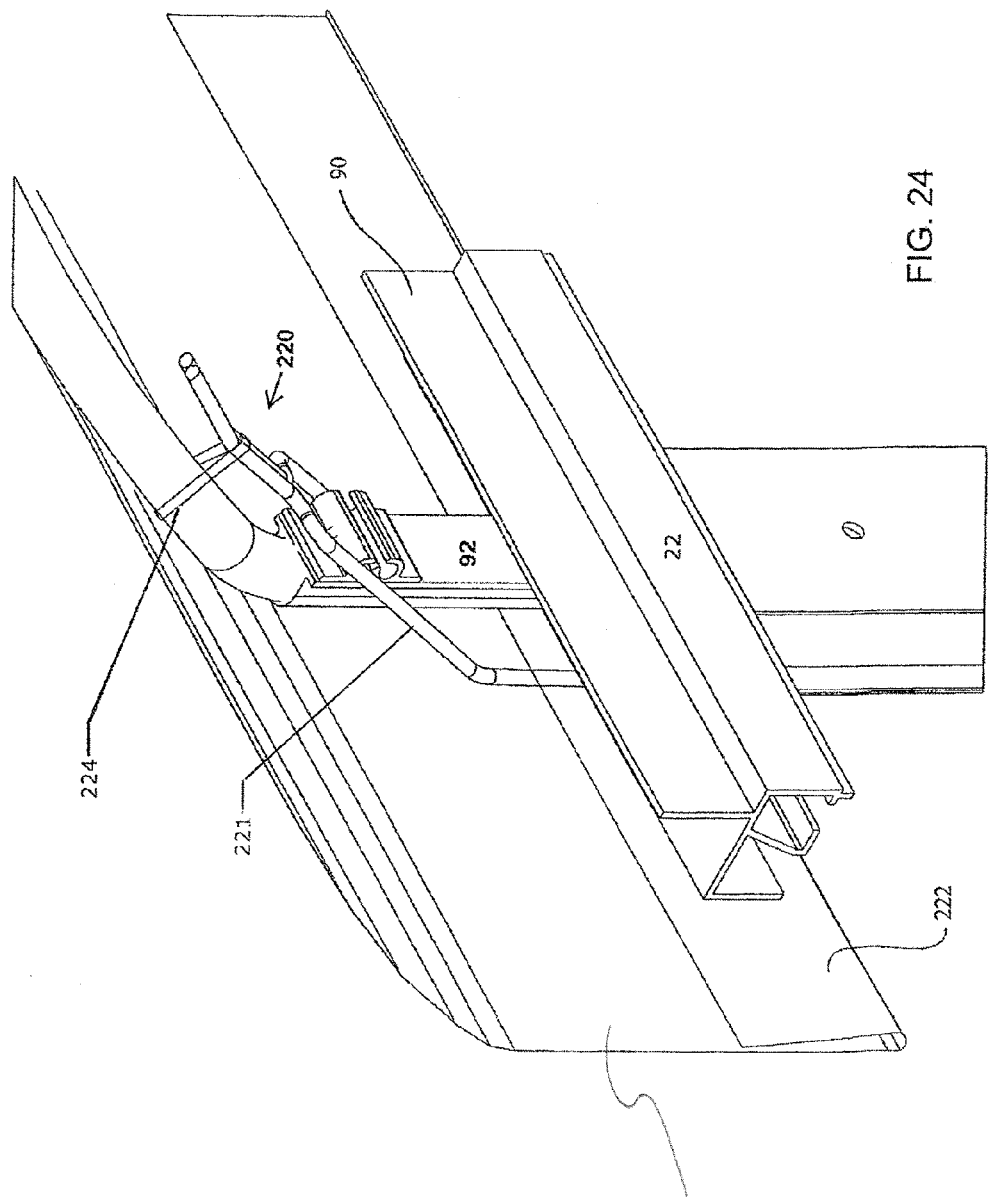
FIG. 24 is a perspective view of a latch mechanism for a tarp cover according to another embodiment of the invention.

With reference to FIGS. 23-25, however, according to another novel aspect of the present invention, there is provided novel retaining mechanisms for the tarp cover which replaces, or may be used in combination with, the conventional elastic straps, ropes, etc. As disclosed herein, different mechanisms may be used to secure different portions of the tarp, e.g., front, intermediate, and rear portions, and the mechanisms may be used whether the bows are supported directly by the stakes, or supported on the upper rail 22 which is supported on the stakes. FIGS. 23-23D and 29D show embodiments of retaining mechanisms which support the tarp cover when the bows are directly supported on the stakes, and are discussed further below. As shown the different embodiments of the securing mechanism each include a type of manually-actuatable locking mechanism through which an operator can selectively lock the latch member in an operative position securing the edge of the tarp cover closely adjacent to the bow end and unlock the latch member for being moved from the operative position thereof without the use of a tool.

Figure 24A:
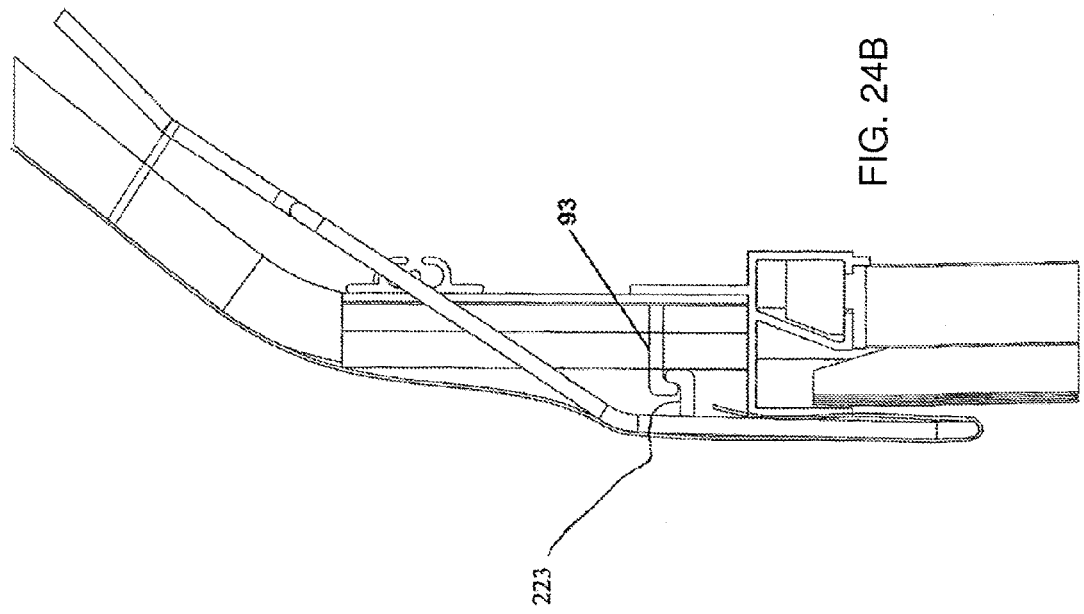
FIG. 24A is a side sectional view thereof.
Figure 24B:
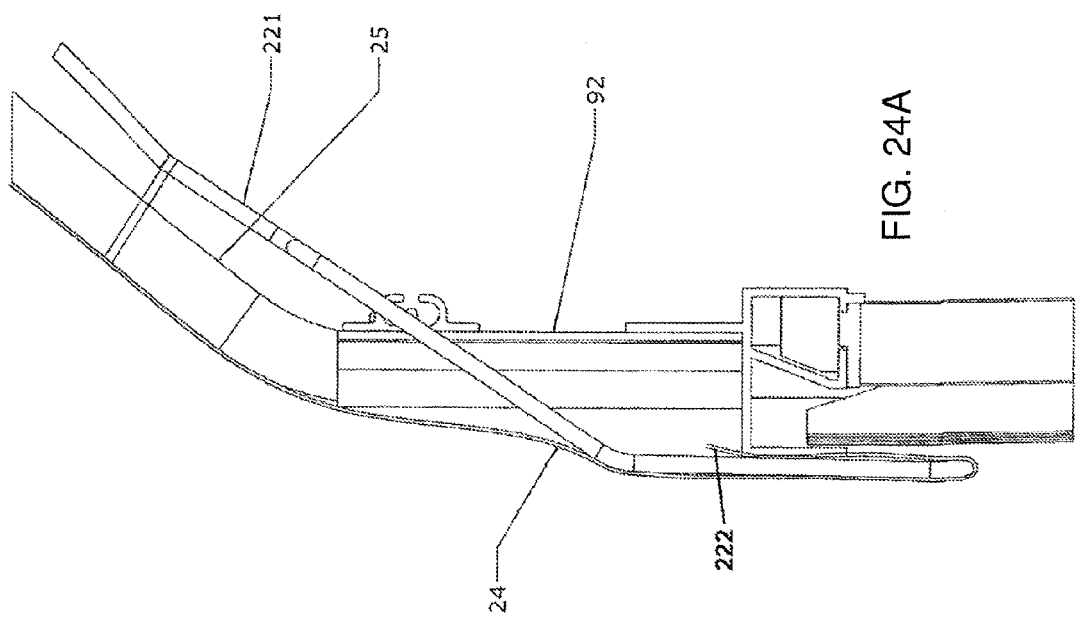
FIG. 24B is a side sectional view showing a modification to the embodiment of FIG. 24.

FIGS. 24-25 show embodiments of retaining mechanisms 220, 220' which support the tarp cover when the bows are supported on the upper rails 22. The retaining mechanisms 220 shown in FIGS. 24-24B are connected to the bow end retaining members 92 and generally includes latches 221 which may be pivotally connected to end portions of the bows, and pockets 222 formed on the inner surfaces of the tarp cover 24 near lower edges thereof. Alternatively, the retaining mechanism 220 could be connected to another portion of the upper rail 22 such as the vertical wall 90. With an intermediate portion of the latch 221 pivotally supported on the supporting member 92 of the rail 22, one end of the latch functions as a handle which may be manipulated by an operator, and the other end of the latch is formed as a securing member that can be inserted into and removed from the retaining pocket 222 via pivoting movements of the latch. Also, a securing or locking member 224 may be used to selectively secure the handle adjacent the bow end portion, and thereby lock the latch in its operative position. For example, the securing member 224 may comprise a ring slidably disposed on the bow end portion which functions by simply being slid onto and off of the handle, or a hook-and-loop fastening strap could be disposed at an appropriate location for securing the handle to the bow end portion. The latches may be formed of metal such as steel or aluminum, rigid plastic, or other appropriate material.

In the operative securing position the latches 221 may hold the lower portions of the tarp cover 24 closely adjacent to the outside surface of the rail 22, e.g., adjacent to the outer surface of the upper vertically extending wall 90 of the rail. For all of the latches 221 the axis about which the latch pivots may extend substantially horizontally relative to the trailer as shown in FIG. 24, so that the latch pivots vertically up and down. However, the latches 221 at the rearmost and/or front most positions at the two sides of the trailer may alternatively be constructed with an off-axis pivot axis such that tension will be applied to the tarp cover when these mechanisms are fully closed (i.e. tarp held down) and tarp tension is released when these mechanisms are raised (i.e. letting the tarp loose). In other words, the intermediate tarp hold-down mechanisms may have the horizontal pivot axes and can only move the tarp up and down along a vertical direction. However the latch mechanisms on the four corners of the vehicle can have their pivot axes tilted off the horizontal such that they mostly move the tarp up and down along the vertical (like the intermediate mechanisms), but they also move the tarp slightly frontwards or backwards to provide tensioning to the tarp. Applying such tension to the tarp cover is desirable for increasing watertightness of the tarp relative to the trailer, for improving the aerodynamic characteristic and aesthetic appearance of the tarp cover, increasing durability of the tarp cover, etc.

The rail may also be provided with a seal member which extends outwardly from the wall 90 or another portion of the rail such that the seal member will engage the inner surface of the tarp cover when disposed in its operative covering position, to prevent water and other foreign matter from passing between the cover and the rail. Such a seal is shown at 225 in FIGS. 15F, 15G. For example the wall 90 or other portion of the rail 22 may have a retaining groove formed therein and extending the full longitudinal length of the rail, and the seal member 225 may be a continuous length of elastomeric material having one edge slidably and securely retained in the groove.

In use of the retaining mechanism, an operator (who may be standing on the trailer bed) would release the handle latch from the fastener and pivot the latch such that the securing member is withdrawn from the retaining pocket of the tarp cover, and would repeat this maneuver for as many of the latches as desired. To secure the cover, such procedure may be reversed. The retaining mechanism 220, being disposed entirely within the tarp cover 24, provides improved aerodynamics and appearance compared to the conventional elastic straps and ropes, which have been used. Also because the latches 221 are connected to the upper rails 22, they will not become lost or displaced similar to the elastic straps and ropes.

A modification to the retaining mechanism 220 is shown in FIG. 24B. In the modification an engaging member 93 is provided which projects outwardly at an intermediate part of the wall 90, and the securing member at the outside end of the latch 221 is provided with a inwardly extending projection 223 which securely engages the engaging member 93 in the operative position of the latch. In this modification the endmost portion of the securing member at the outside end of the latch, together with the lower edge of the tarp cover, extends inwardly within a channel defined by the wall 90, the engaging member 93 and the horizontal surface 84 of the rail. This helps to prevent water and other foreign matter from passing between the tarp cover and the rail. Also, the seal member 225 may be provided to project outwardly/downwardly from the wall 90 or the engaging member 93 for engaging the inner surface of the tarp cover.

Referring to FIG. 25, a latch 221' of the retaining mechanism may be pivotally provided with the end of the bow 25, rather than to the rail 22. Here the intermediate portion of the latch 221' is pivotally supported on the bow, but the latch otherwise functions similar to the latch 221 in FIG. 24, and again may include latches 221' at the rearmost and/or front most positions at the two sides of the trailer constructed with an off-axis pivot axis such that tension will be applied to the tarp when the latches are closed.

Although the bows 25 and tarp cover 24 may be supported on the rails 22 as discussed above, again, the rails 22 could be omitted, and the bow ends supported directly by the stakes 16 such as shown in FIG. 23-23E, wherein the upper ends of the stakes could have the openings formed therein which are adapted to securely receive the bow ends therein. Alternatively, an upward projection could be provided at the upper end of each of the respective stakes, which is shaped to have a hollow opening of the bow end slidably fitted thereover. Also, if a cap 73 is provided with the end of the stake 16, the cap would have an opening defined therein which corresponds to the opening.

As shown in FIG. 23, a latch 221" of the retaining mechanism 220 may be connected to upper ends of the stakes 16. Besides its connection to the stake, the latch 221" is different than the latches 221 and 221' in that it includes two pivot connections and an intermediate link which permits the latch handle to be operatively moved between a locked operative position and an unlocked open position. Again, however, the latches 221" at the rearmost and/or front most positions at the two sides of the trailer may alternatively be constructed with an off-axis pivot axis such that tension will be applied to the tarp cover when the latches are closed.

Shown in FIGS. 23A-23C is latch mechanism 321 which is slidably fitted over the bow end through opening 322. The latch mechanism 321 includes a securing member 323 which fits into a pocket of the tarp cover (not shown), lower projection(s) 324 which closely fits into an opening defined in an upper end of the stake 16, handle 327 which may be gripped by an operator for manipulating the mechanism, and a spring-biased lever 326 which is pivotally connected to the handle and includes a securing pin 326' on a lower end thereof that fits into an opening formed near an upper end of the stake 16. For securing the tarp cover with the latch mechanism, the lever 326 is pivoted close to the handle 327, the mechanism is manipulated so that the securing member 323 is inserted into a pocket of the tarp cover and the lower projection(s) are inserted into opening(s) formed in the upper end of the stake, and the lever 326 is released so that the pin 326' is inserted into the associated opening formed in the stake. To release the tarp cover such process is reversed.

Latch mechanisms 331, 341 shown in FIGS. 23D, 23E are similar to the latch mechanism 321 in FIGS. 23A-23C except that they include cam-actuated compression mechanisms for being secured to the stake 16, rather than a pivot lever with a securing pin on a lower end thereof. The latch mechanism 331 includes a compression member 335 and a rubber member 336 provided on a lower end of a rod 337 which extends through a lower projection 334 of the latch mechanism which can be fitted into an opening in the upper end of the stake 16, and a cam lever 338 pivotally connected to the upper end of the rod 337. For securing the latch mechanism to the stake the cam lever is manipulated to raise the rod 337, which thereby raises the compression member to compress the rubber member 336 such that the rubber member expands to securely engage the inner walls of the stake which define the opening in the upper end thereof. The latch mechanism 341 is similar to the mechanism 331, but includes a handle 342 for facilitating manipulation of the mechanism, and a slightly different cam member which pivots forwardly rather than inwardly of the stake.

Movable Retraction System For Tarp Cover

While the bows 25 and tarp cover 24 may be non-movably supported on the rails 22 or the stakes 16 as discussed above, in another embodiment according to the present invention, a movable retraction system may be provided for the tarp cover, and an embodiment of such a rolling-type movable retraction system is shown in FIGS. 8 and 15A-18. With the movable retraction system, the tarp cover may be selectively movable from either or both ends toward the opposite end, to selectively expose portions of flatbed trailer normally covered by the tarp cover. Of course, it is also possible that one end of the tarp cover, e.g., the front end, may be fixed in position at one end of the rail, while the opposite end of the tarp cover may selectively be moved back-and-forth toward the fixed end.

As shown in FIG. 15A, this embodiment may include a modification to the rails 22' in the form of an integral, substantially T-shaped upward extension 130 that functions as a support track/guide for supporting rolling movement of inner and outer rolling guide assemblies 132, 134 thereon. The guide assemblies 132, 134 are operatively connected to the lower ends of the bows 25 such that the bows and tarp cover supported thereon may be easily moved along the track for selectively exposing and covering the storage space within the cover system. Also, locking and/or tensioning mechanisms may be provided for securing endmost ones of the guide assemblies 132, 134 of the cover system in their endmost positions corresponding to the fully covering position of the cover system shown in FIG. 1, as discussed further below.

In embodiment of FIG. 15A, the T-shaped upward extension 130 replaces the vertical wall 90 of the rails 22 in the first embodiment, as the tarp cover 24 and bows 25 are supported by the extension 130 and guide assemblies as discussed further below. With the rolling retraction system, the tarp cover may be readily and conveniently moved to various positions by a person standing adjacent to the trailer, for selectively uncovering portions of the flatbed trailer for cargo loading and unloading, or for any other reason. Because the rolling cover is disposed at a height where it could not be directly grasped by the average person standing on the ground next to the trailer, an elongate handle, strap, pole or the like (not shown) may be provided with or selectively engaged to the cover system for permitting a person to conveniently move the cover system while standing on the ground.

Figure 19:
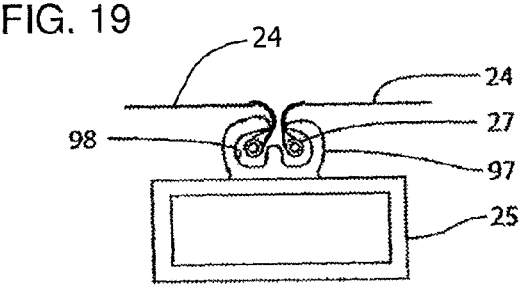
FIG. 19 is a cross sectional view of a bow according to an embodiment of the invention.
Figure 17A:
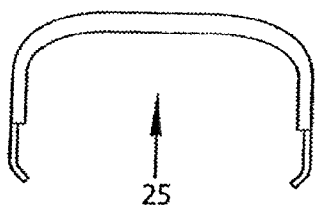
FIG. 17A is a side plan view of an individual bow according to an embodiment of the invention.
Figure 17B:
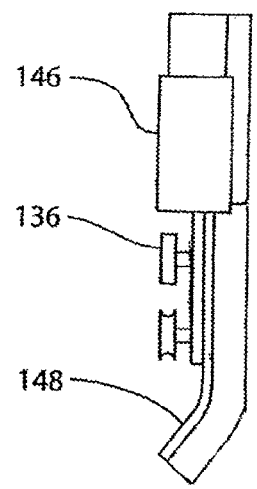
FIG. 17B is a side view of an end portion of the bow of FIG. 17A, showing part of a guide assembly thereon.
Figure 17C:
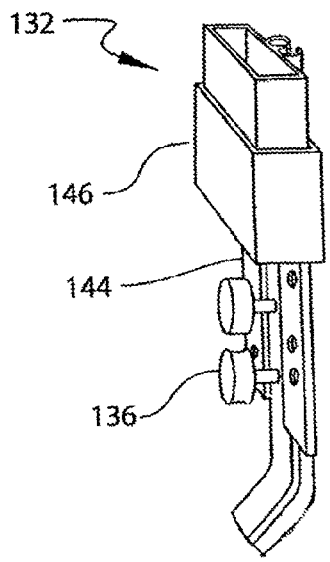
FIG. 17C is a detailed perspective view of the guide assembly of FIG. 17B.

Also, the tarp cover 24 may be formed in segments, rather than as one large piece, as is conventionally known. In such case, the bow 25 may be modified to include a retainer 97 as shown in FIG. 19 so that the bow may also function as a connector for joining the edges of two adjacent segments, as is conventionally known. Particularly, edges of the segments will be enlarged, e.g., by having a tube or cord 27 sewn or otherwise bonded into opposite edge flaps of each segment, and then the enlarged edges of a pair of the cover segments may be slidably inserted into the lobes of a groove 98 defined in the retainer 97. The diameter of the enlarged edge of a cover segment is larger than the width of the opening of the groove 98, so that after the edge has been inserted into the lobe of the groove 98 the edge is securely retained and cannot be removed by passing through the groove opening. From the outside of the cover 24, the segmented cover completely covers the bows 25 and appears to be formed as a one-piece cover. Other known connector structures for securing enlarged edges of tarp segments may include a pair of separate grooves formed on opposite sides of the bow, with each groove adapted to receive only one segment edge. With these types of connectors the bow would not be completely covered by the tarp cover and could be seen from the outside of the cover system. The bow structure in FIG. 19 cold also be used to secure portions of a single continuous tarp cover, e.g., folds of the tarp cover may be inserted into the lobes of the groove 98 and lengths of the cord or tube 27 could be slid into the folds to prevent the folds from being withdrawn from the lobes, and the lengths of cord or tube 27 could be withdrawn if it is desired to withdraw the folds from the groove 98.

Also, according to this modified embodiment of the invention, when the tarp cover 24 is retracted to a fully open position thereof, the collapsed cover and bows may be conveniently locked in position at the front of the trailer adjacent the headboard 26, and supported on the short, forward-most sections of the rails 22' on opposite sides of the trailer, which may correspond with the headboard extension 228' shown in FIG. 31. In this condition, with the tarp cover 24 and bows 25 locked in a compact, collapsed condition adjacent to the headboard 26, the larger sections of the rails 22', as well as the panels 18 and stakes 16, may be temporarily removed and stored with the headboard and/or underneath the trailer 12, if desired.

As shown best in FIG. 15A, the T-shaped upward extension 130 of the rail 22' may be formed integrally therewith, e.g., the rail 22' including the extension may be integrally formed of appropriate material(s) such as extruded aluminum, which is durable and lightweight. The lower and/or upper surfaces of the upper portion of the extension 130 may have projections 133 formed thereon and the wheels 136 may have peripheral grooves formed therein which are shaped similar to the projections, and engage the projections for rolling movement therealong. For example, the projections 133 could be tapered with a V-shaped cross section and the peripheral groove may similarly have a corresponding V-shaped cross section, such as shown in FIG. 15A, or the projections could have a flat or a more rounded/spherical shape. Replaceable plastic covers (not shown) may be provided on the projections for engagement with the wheels 136. The plastic covers have a natural lubricating effect for facilitating movement of the wheels, and may be replaced after they become worn.

Alternatively, as shown in FIG. 8, the extension 130 may be formed separately from the rail 22' and connected thereto. An upper portion of the extension 130 may have a flat upper surface 135 which supports wheels 136 of the guide assemblies 132, 134 for rolling movement thereon, and the upper surface 135 may also have an insert 138 provided therewith, e.g., fitted in a shallow recess formed in the upper surface of the extension 130, as shown. The insert 138, where used, may be formed of an appropriate material such as plastic, steel, or other appropriate material, and may be removable so as to be readily replaced if desired or necessary. The lower surface of the extension 130 may be formed with an insert 138 similar to the upper surface. Additionally, the upper portion of the extension 130 may include wheel guide recesses 140 formed in the lower surface thereof, which receive other wheels 136 of the guide assemblies 132, 134 for rolling movement therealong. The recesses 140 may be concavely curved, as shown, but could be other shapes if desired, including U-shaped, V-shaped and flat, and the wheels may be formed with a corresponding shape.

Figure 15B:
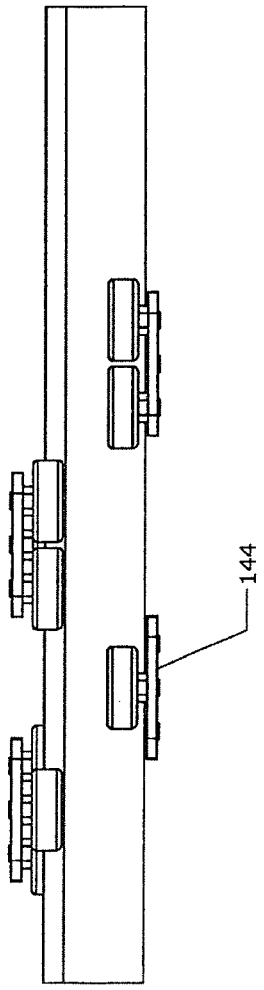
FIG. 15B is a top plan view of the top rail and guide assemblies of FIG. 15A.
Figure 15C:
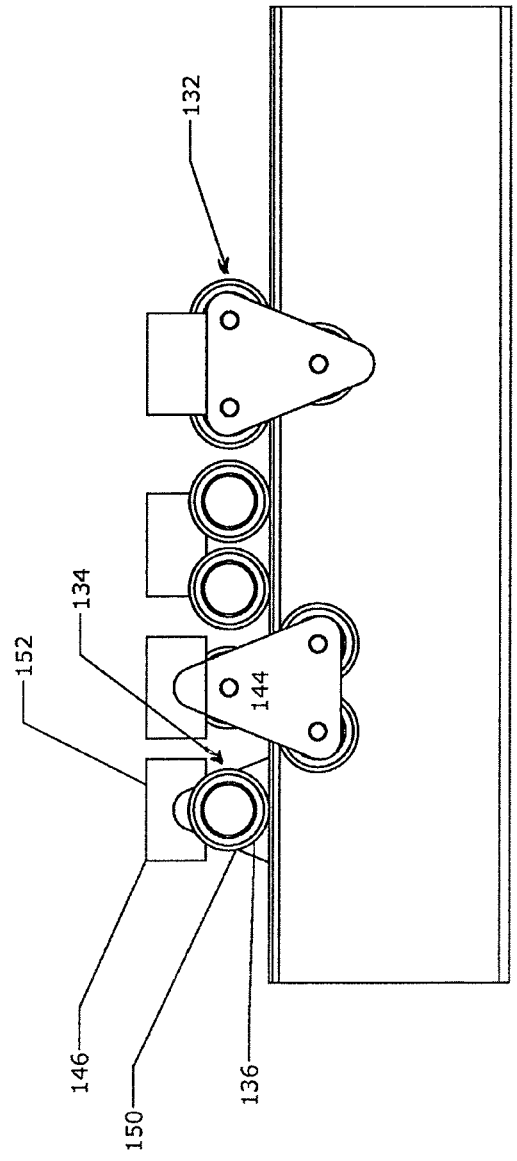
FIG. 15C is a side plan view of the top rail and guide assemblies of FIG. 15A.

Referring to FIGS. 8, 15A-15C and 17A-17C, the outer guide assembly 134 of this embodiment may include a vertically extending support plate 144 which may be substantially triangular in shape, a plurality of the wheels 136 (e.g., three in the depicted embodiment) rotatably supported on the plate via shafts projecting horizontally from the plate at two vertically spaced levels such that the wheels engage the upper and lower surfaces of the upper portion of the extension 130 as shown in FIG. 15A, a receiver or bracket 146 fixed to the upper portion of the plate 144 for slidably receiving and supporting an end of one of the bows 25, and a tarp clip 148 connected to an outer surface of the plate 144 below the bracket 146. The tarp clip 148 may have a projection on its outer surface with a lobed groove formed therein which is shaped the same as and aligned with the lobed groove 98 on the bows 25 as shown in FIG. 19, and may also have a lower portion which curves inwardly below the plate 144 and the wheels 136 and terminating in close, but spaced relation to the rail 22' where it may be engaged by a seal 151 extending from the extension 130 of the rail 22'. The tarp cover extends below the ends of the bows 25 on opposite sides of the trailer, and downwardly extending portions of the cover may be secured to the tarp clips 148 by being inserted in the lobed grooves of the tarp clips in the same manner as discussed in relation to the lobed grooves of the bows 25. The lowermost edges of the tarp cover may be enlarged or weighted, e.g., by having a tube or cord sewn into an overlap of material forming the edge, and portions of the cover's lower edges may be secured to lower, inner ends of the tarp clips using appropriate fasteners. With such construction, the tarp cover 24 encloses the guide assemblies 132, 134 such that the assemblies 132, 134 are protected from exposure to water and other foreign matter, and do not detract from the aesthetic appearance of the cover system. Also, due to the disposition of the side edges of the tarp cover which extend inwardly with the tarp clips 148 close to extension 130, together with the seal 151 extending from the extension to engage the inner surface of the tarp clip as shown, the tarp cover provides an excellent, reliable seal against water and other foreign matter entering within the enclosed space of the cover system Referring to FIGS. 8, 15A-15C and 18, the outer guide assembly 134 of this embodiment may have a similar structure to that of the inner guide assembly 132, e.g., a vertically extending support plate 150 which may be substantially triangular in shape, a plurality of the wheels 136 (e.g., again, three in the depicted embodiment) rotatably supported on the plate via shafts projecting horizontally from the plate at two vertically spaced levels such that the wheels engage the upper and lower surfaces of the upper portion of the extension 130 as shown in FIG. 15A-15C, and a receiver or bracket 152 projecting outwardly from an outer face of the upper portion of the plate 144 via arms 154 for slidably receiving and supporting an end of one of the bows 25. As depicted, the bracket 152 is aligned with the bracket 146, e.g., at the same vertical level and the same outward disposition as the bracket 146, so that the tarp cover is uniformly supported by the brackets 146, 152, and the cover also encloses the guide assemblies 132, 134. Also, each of the brackets may have an opening or slot formed in the outer face thereof so that the brackets may tightly engage most of the periphery of each bow 2 except for the projection, and will correspondingly not interfere with the tarp cover 24 where it extends from the lobed groove within the projection.

Figure 16:
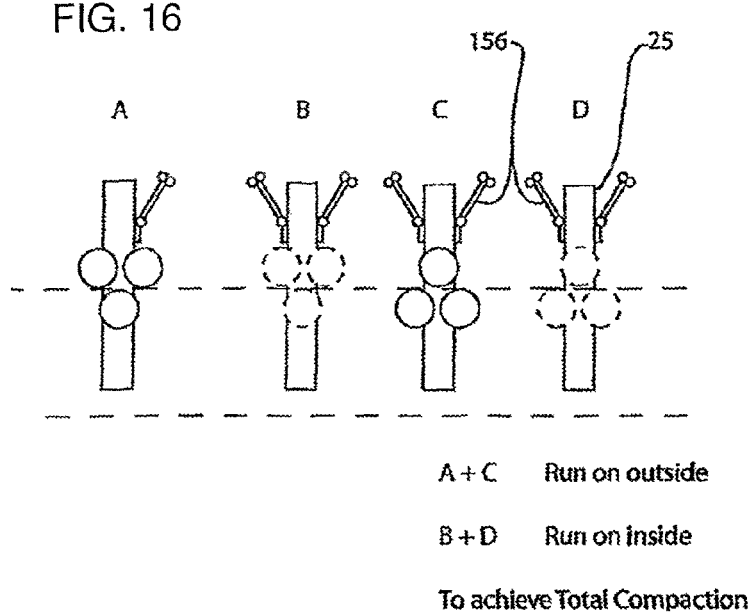
FIG. 16 is a simplified side view showing a plurality of guide assemblies supporting ends of the bows and operatively engaged with the upper rail.
Figure 18:
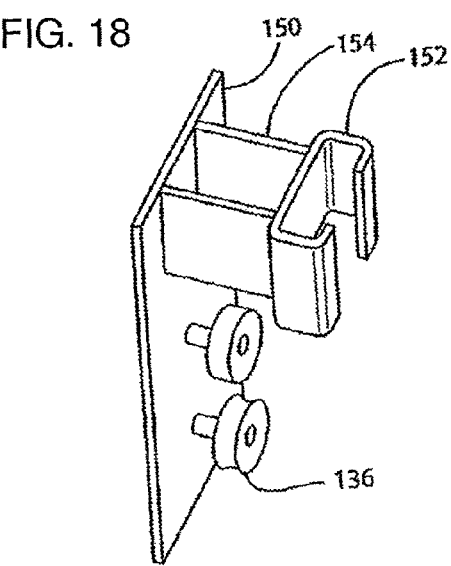
FIG. 18 is an enlarged perspective view of an inner guide assembly.

The inner and outer guide assemblies 132, 134 may be alternately disposed with each other in the longitudinal direction of the trailer, while approximately half of the triangular support plates 144, 150 may be oriented in one direction while the rest of the plates are oriented in the opposite direction, as shown in FIGS. 15A-15C and 16, to achieve a desirably compact arrangement of the tarp cover 24 and bows 25 in the fully retracted position of the cover, e.g., completely supported on the short, forward most sections of the rails 22'. Particularly, as shown in FIGS. 15B, 15C, and 16, the inner and outer guide assemblies 132, 134 may be alternately disposed with each other in the longitudinal direction of the trailer, while the support plates 144, 150 may be arranged such that two adjacent plates 144, 150 are disposed in one orientation, and the next two plates in the longitudinal direction are disposed in the opposite orientation, etc. In this manner, all of the bows 25 can be disposed closely adjacent to each other in the retracted position of the cover system because the guide assemblies will not interfere with other.

Of course, those skilled in the art will realize that other possible arrangements of the guide assemblies are possible, e.g., all guide assemblies may be positioned on the outer side of the extension 130. Similarly, other possible shapes and arrangements of the support plates are possible, e.g., rectangular shaped plates each supporting four of the wheels, triangular shaped plates which wherein each plate is disposed in the opposite orientation to the plate(s) adjacent thereto, etc.

Generally, the tarp cover 24 may tend to sag between the bows. To avoid this, lifter bows 156 may be provided in conjunction with the bows 25, wherein the lifter bows collapse adjacent to the bows 25 in the fully retracted position of the cover system, but pivot away from opposite sides of the bows 25 in the full covering position of the tarp cover, and upper horizontal portions of the lifter bows 156 may engage portions of the tarp cover, pushing the portions upwardly and thereby tensioning the cover to some extent. Additionally, the cover system may also include one or more mechanisms for tensioning the tarp cover in the full covering position thereof, as discussed further below, noting that a tensioned tarp is more aerodynamic and aesthetic than an un-tensioned tarp. Such tensioning mechanisms may operatively connect the front headboard 26 to the front-most bow 25 and/or operatively connect the end cap 28 to the rear-most bow 25.

With the disclosed rolling retraction system, the cover system may be easily and conveniently moved to a desired position by a person standing on the ground adjacent to the trailer. For example, if tensioning mechanism(s) other than lifter bows are used, the mechanisms may be manipulated by the person to release the tension, then one or both ends of the tarp cover may be released from being connected to the headboard 26 and end cap 28, after which the tarp cover 24 and supporting bows 25 may be simply moved to a desired position by the person using a pole, strap, etc. to engage a portion of the cover, one of the bows or one of the guide assemblies 132, 134, and then simply pulling or pushing the same as the operator walks alongside of the trailer. The rolling engagement between the wheels 136 of the guide assemblies and the extension 130 permit smooth, continuous movement of the cover system with little effort.

As with the other embodiment of the rails 22, in this embodiment the rails 22' may be removed if desired. Again, the tarp cover 24 and bows 25 may be compactly stored at one end of the trailer, e.g., the front end, on short sections of the rail 22' adjacent the headboard 26. Removal of the remaining sections of the rails 22' can be performed from the ground, e.g., the rail locking mechanisms can be released, the rail sections may then be raised off of the stakes 16 and panels 18 using a pole, and then lowered to the ground by a person standing next to the trailer. The rail sections 22' may be formed of relatively lightweight materials such as extruded aluminum, and may be stored on the flatbed when not in use, e.g., beneath the flat bed adjacent a longitudinal frame (not shown) of the trailer 12.

The tarp cover supported by the guide assemblies 132, 134 and the rail extension 130, as in the embodiment discussed above, is another important aspect of the invention. Such arrangement is much more convenient and aesthetic than the conventional bow-supported tarp cover draped over the upper portions of the stake-supported panels and secured with ropes, elastic cords and the like. Although rolling tarp cover systems for flatbed trailers are known, e.g., some of the present inventors have previously patented such systems as disclosed in U.S. Pat. Nos. 5,924,759, 5,152, 575 and 5,080, 422, the entire disclosures of which are incorporated herein by reference, such known systems typically include guide rails permanently mounted to the sides of the trailer's flatbed, and an enclosed cargo space defined between the tarp cover and the flatbed. The previously proposed cover systems are significantly larger than the movable tarp of the present invention because the previous systems fully cover a flatbed trailer, and include a tarp cover with long vertical sides as well as an upper substantially horizontal portion. None of the known rolling tarp systems are provided for use in conjunction with removable rails or with a removable, stake-supported panel cover system, nor are they disposed at an elevated level above stake-supported panels as in the present invention.

Figure 15D:
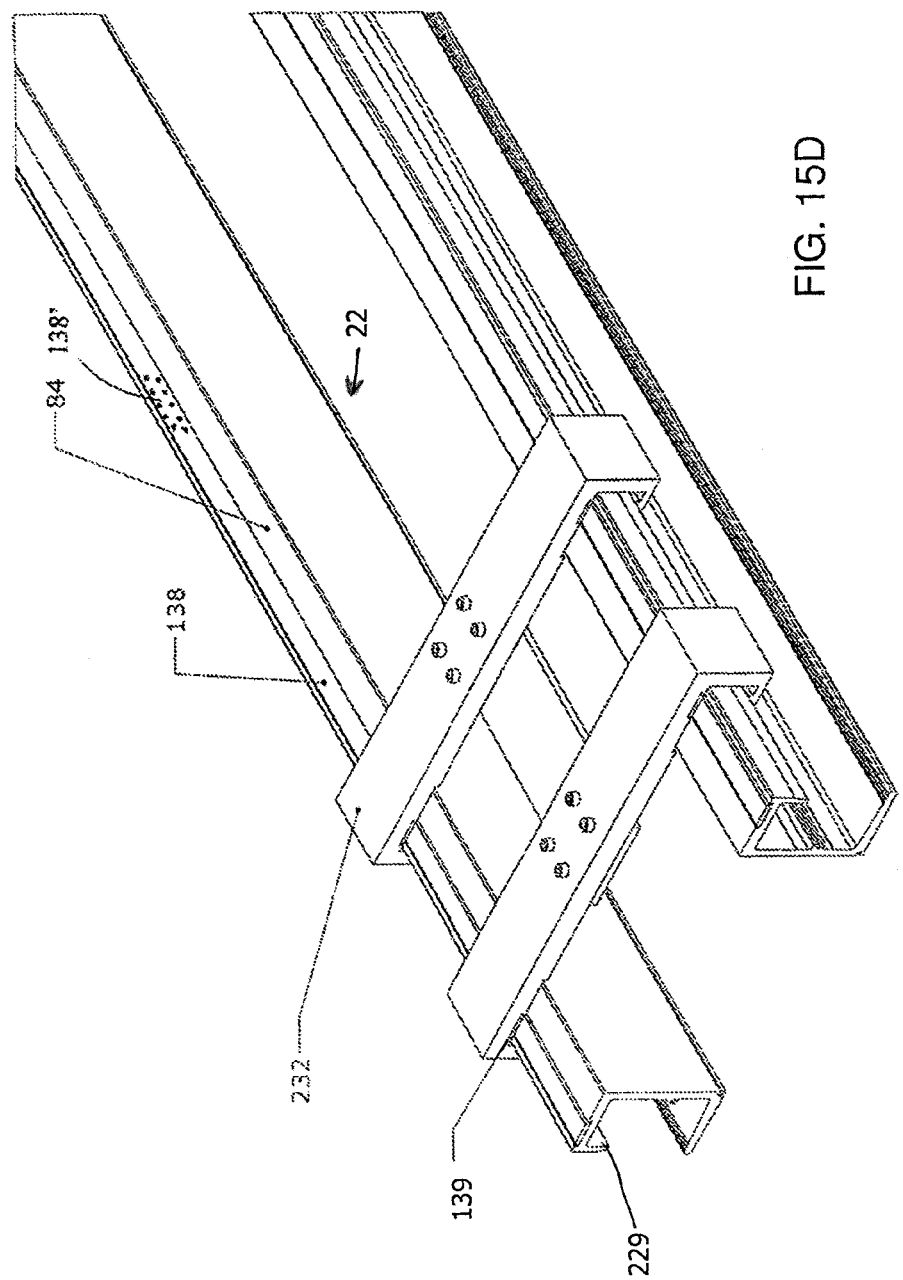
FIG. 15D is a perspective view of another embodiment of a top rail and sliding guide assembly according to the invention.
Figure 15E:
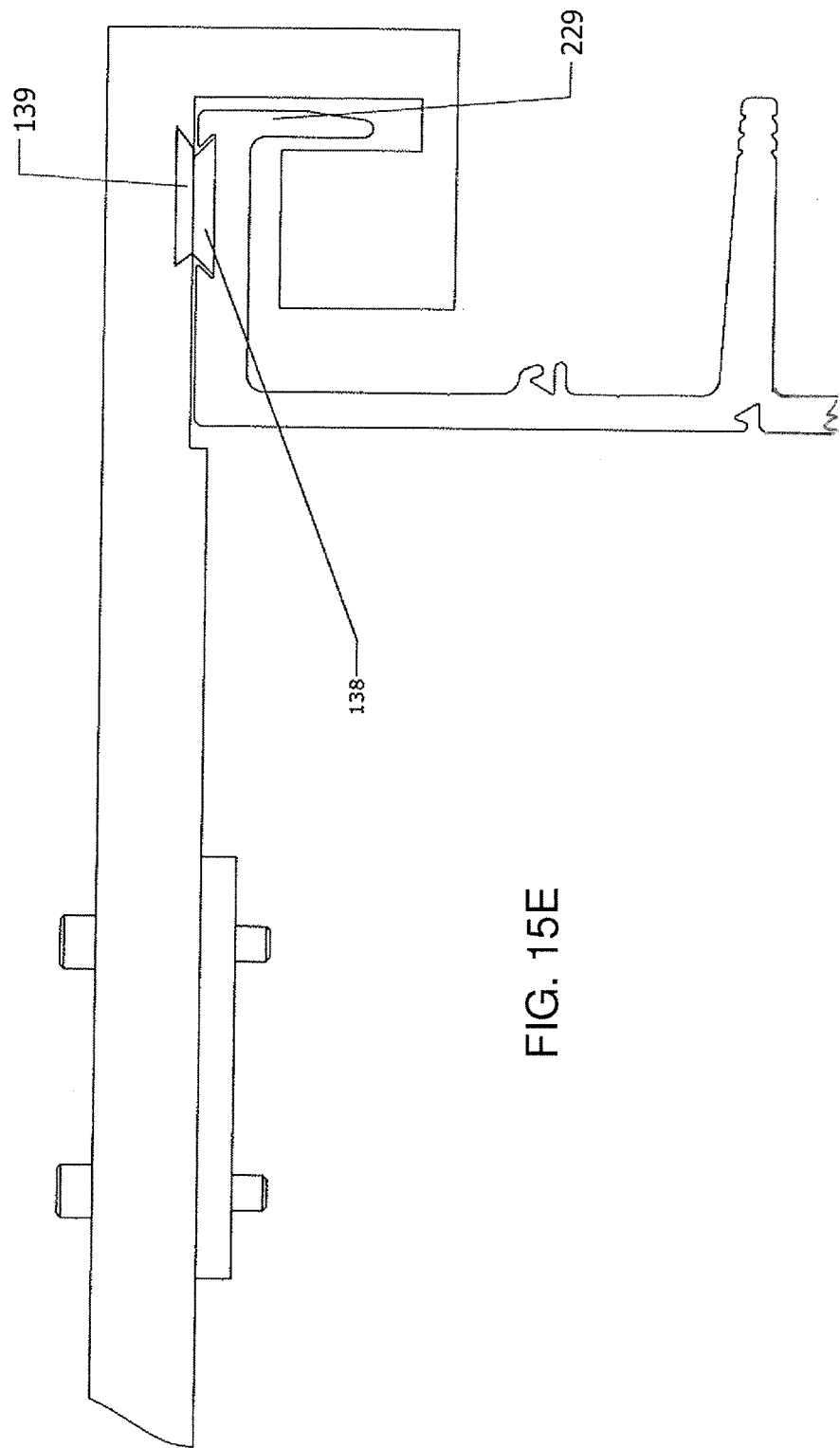
FIG. 15E is a side sectional view of the embodiment of FIG. 15D.

While the rolling-type movable tarp cover discussed above is effective and convenient, other types of movable systems may be used in which a guide assembly slides relative to the rail 22, rather than rolling along the rail. For example, a sliding-type movable tarp cover may be used such as shown in FIGS. 15D, 15E. As depicted such sliding-type movable cover may include a modified rail 22 having a hook-shaped upper extension 229, and a modified guide assembly 232 which is slidably connected to the upper extension for sliding movement relative thereto. The upper extension 229 may extend vertically upwardly from the horizontal surface 84 of the rail, then extends horizontally outwardly, and finally extends vertically downwardly a short distance such that there is a gap or opening between the free end of the upper extension and the surface 84. For facilitating sliding movement of guide assembly 232, an insert 138 formed of plastic or other appropriate material may be provided in the upper horizontal surface of the extension 229 and similarly another insert 238 formed of plastic or other appropriate material may be provided in a lower surface of the guide assembly in opposing relation to the insert 138 such that the two inserts engage each other and define a primary sliding contact area for the guide assembly along the upper extension. Because the inserts 138, 139 may be formed of relatively low friction plastics or other low friction materials, an amount of friction associated with the sliding movement of the guide assembly 232 is reduced. Also, if either of the inserts 138, 139 becomes worn with use over time, they may be easily replaced at relatively low cost. Suitable grease may also be applied to the engaging surfaces of the inserts for further reducing friction associated with sliding movement of the guide assembly 232. A lower structure of the rail 22 which operatively engages the stake and panels is omitted in FIGS. 15D, 15E.

For further facilitating movement of a movable tarp cover according to the invention, whether sliding-type, rolling type, etc., air or other suitable gas may be blown between engaging surfaces of the guide assembly and the rail. For example, as shown in FIG. 15D, numerous openings 138' may be formed through the insert 138 in a rolling-type system, and/or through the insert 138 and/or 139 in a sliding-type system, and pressurized air from a vehicle's pneumatic system may be channeled through a manifold to a back surface of the insert 138 or 139 for being selectively blown through the openings when the guide assembly is to be moved along the rail 22. Again, the pressurized air being blown into the space between the insert 138 and the engaging surface of the guide assembly, the rolling wheel 136 or the insert 139, further reduces friction associated with the movement of the guide assembly. The sliding system shown in FIGS. 15D, 15E is also suitable for use with larger rolling tarp systems such as shown in applicant's previous U.S. Pat. Nos. 5,924,759, 5,152,575 and 5,080,422.

Figure 15G:
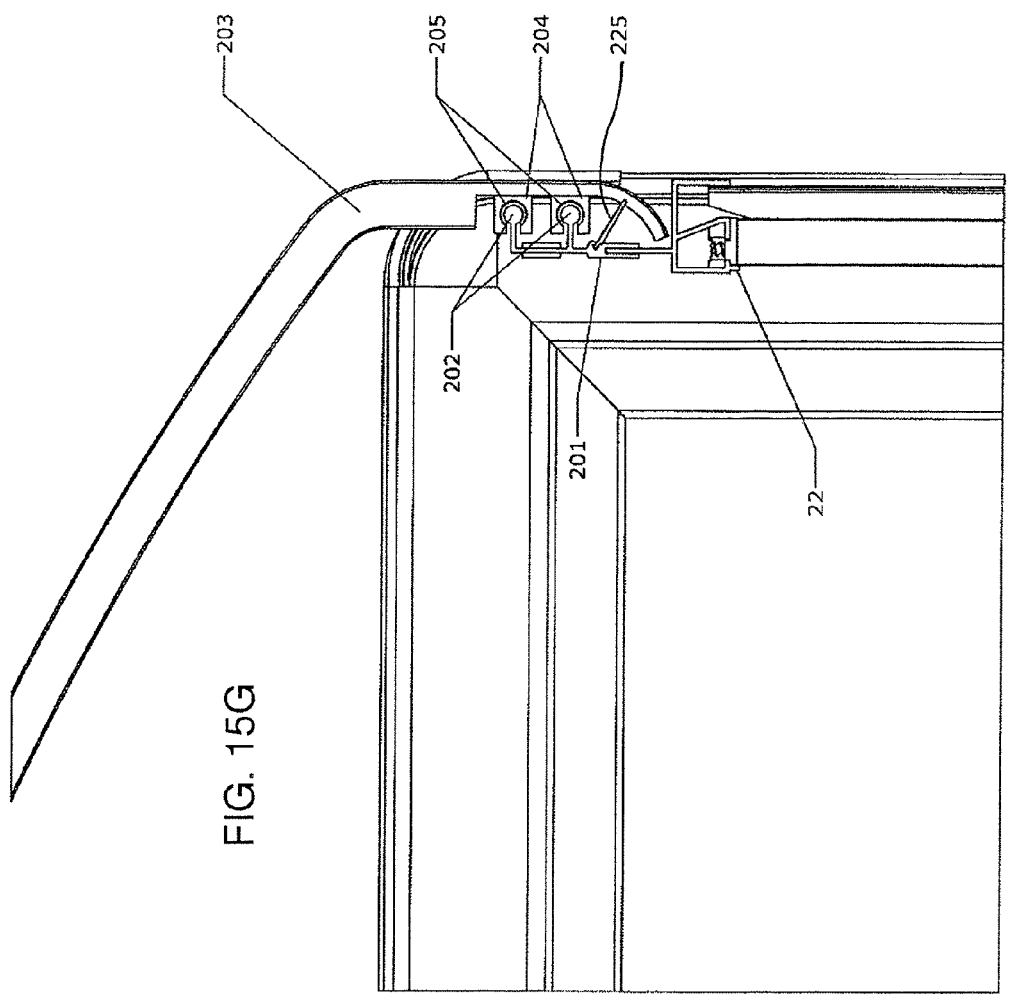
FIG. 15G is similar to FIG. 15F, but for the opposite end of the bow.

Another embodiment of a sliding tarp cover system according to the present invention is shown in FIGS. 15F, 15G, 15H. In this embodiment the rail sections 22 are provided with an extension 201 which integrally includes one or more (two are depicted) sliding support rods 202 which may be circular in cross section as depicted, while opposite ends of each of the bows 203 have a receiver 204 provided therewith which has a groove defined therein which is shaped to receive one of the sliding support rods therein such that each bow can be slid along the corresponding sliding support rod 202 to any desired position. For purposes of compactly arranging the bows 203 closely to each other when the tarp cover is in a retracted, non-covering position thereof, adjacent ones of the bows 203 may be guided on different ones of the rods 202, in a manner analogous to the arrangement of the rolling carriers shown in FIGS. 15B, 15C.

Sleeves 205 may be provided between the sliding support rods 202 and the grooved receivers 204 and may be made of an appropriate material such as plastic which has a natural lubricating effect and facilitates sliding movement of the bows along the support rods, and also reduce wear of the rods and receivers. If the sleeves become worn over time, they may be easily replaced. If desired, grease or other lubricant may also be provided between the rods 202 and receivers 204. The extension 201 may be formed from extruded aluminum and appropriately joined to the rail section 22 using bolts, rivets, welding, etc., or the extension may be formed integrally with the rail section 22. Similarly, the receivers 204 may be formed of extruded aluminum or other appropriate material and either connected to the bows or formed integrally therewith. Also, as with other embodiments, the rearmost bow 206 may have enhanced strength and rigidity as compared to the other bows because it supports the greatest load. For example, the rearmost bow may have a dual structure as depicted in FIG. 15H.

As depicted, the cross-sectional shape of the openings in the receivers 204 may not be exactly the same at the opposite ends of a bow, for the purpose of facilitating sliding movement of the bows. For example, while the shape of the opening of the receiver 204 on one end of the bow, e.g., the right side end shown in FIG. 15G, may closely conform to a circular cross-sectional shape of the rod 202, the shape of the opening of the receiver 204 on the opposite end of the bow, e.g., the left side end shown in FIG. 15F may not be as closely conforming to the circular shape of the rod. As depicted, the shape of the opening of the receiver 204 on the left side end shown in FIG. 15F may be somewhat oblong to permit some amount of movement of the receiver relative to the rod as the bow is slid back-and-forth along relative to the trailer. Generally, it is desirable and convenient for an operator to move the tarp cover relative to the trailer by applying a force (pushing or pulling) to one side of an end one of the bows, and as the end bow is moved, it also moves the other bows which are operatively pushed or pulled by the end bow as it is moved along, noting that all of the bows are interconnected by the tarp cover. When a pulling or pushing force is applied to only one side of a bow, the opposite side of the bow tends to lag somewhat behind, and such lagging motion may cause the receiver opening on the opposite side of the bow to bind on the rod it is moving along if the receiver opening is shaped to closely conform to the cross-sectional shape of the rod. According to the present invention, however, because the receiver opening on one side of the bow does not closely conform to the circular shape of the rod, but instead allows for some movement of the receiver relative to the rod, the bow receivers do not bind on the rods and continue to move smoothly therealong.

Locking and Tensioning Mechanisms

To secure the movable tarp system in an operative, fully closed position, as well as in a fully open, collapsed position thereof, the cover system may further include locking and/or tensioning mechanisms for securing endmost ones of the guide assemblies in rear-most and front-most positions thereof.

As one simple locking mechanism, the endmost guide assembly 132 may be provided with a set screw/pin 180 which may be selectively manipulated into a corresponding opening 182 formed in the rail 22 when the guide assembly is disposed at its endmost position, such as shown in FIG. 26. A plurality of the openings may be provided in spaced relation along an end portion of the rail 22 such that the screw/pin 180 may be selectively inserted in different ones of the openings to account for stretching or expansion of the tarp cover over time. Because two of the guide assemblies would be associated with the opposite ends of an endmost bow 25 on opposite sides of the trailer 12, both of the guide assemblies may be provided with the locking mechanism for stably securing both ends of the bow.

Figure 27:
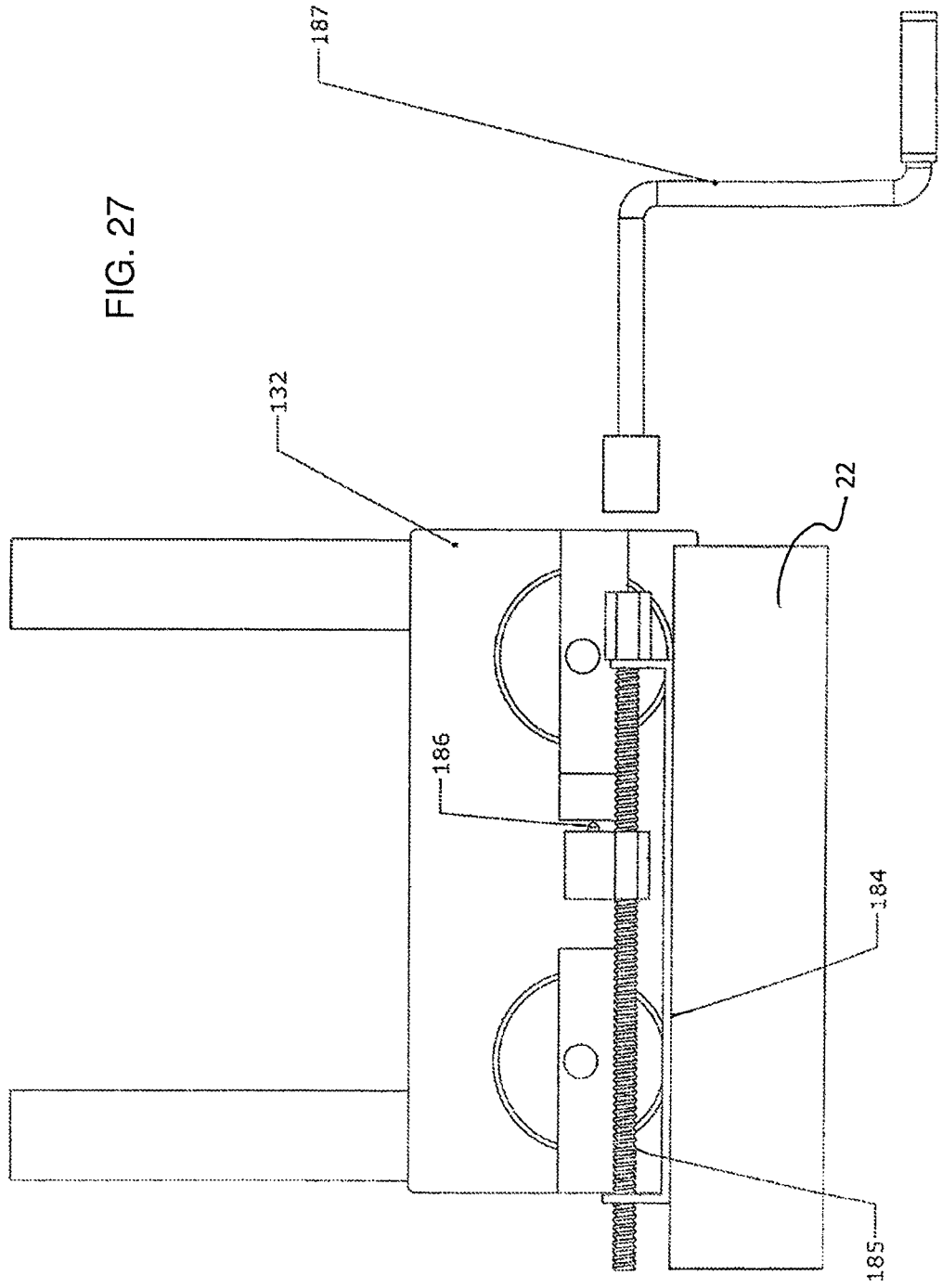
FIG. 27 is a front view of a guide assembly locking and tensioning mechanism according to an embodiment of the invention.
Figure 28:
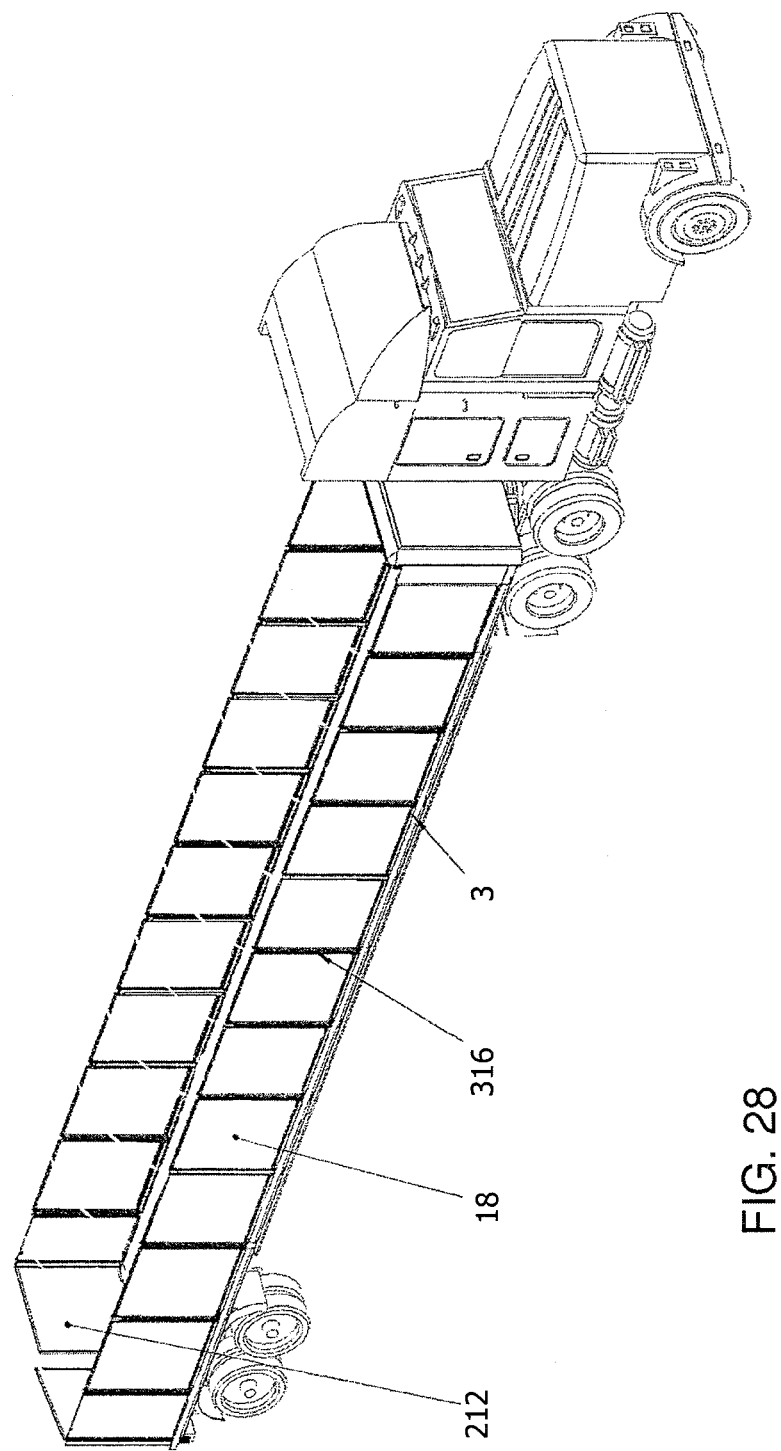
FIG. 28 is a perspective view of a cover system according to another embodiment of the invention mounted on a truck trailer.

With reference to FIG. 27, a different mechanism 184 may be provided which functions to both lock the guide assembly 132 in an endmost position thereof, as well as to forcibly move the guide assembly toward the endmost position thereby tensioning the tarp cover 24 in its operative, fully covering position. Such tensioning is desirable for improving the appearance, aerodynamic characteristics, and longevity of the tarp cover. The mechanism 184 may include a threaded rod 185 that is positioned generally parallel to the rail 22 on which the guide assembly 132 is supported for rolling movement and provides the tensioning force to move the guide assembly and end bow 25 towards the end of the truck/trailer, and thereby also drawing the tarp cover 24 and the other movable guide assemblies in the direction of the end position because the several parts are connected together. A hook 186 on the threaded rod 185 may engage a carriage portion of the guide assembly 132 and draw the end bow 25 towards the end of the truck/trailer when the rod is rotated by a removable crank handle 187 or the like. To release tension and unlock the bow from the rail, the rod may be rotated in the opposite direction.

Again, in this type of cover system the end bow 25 and other tarp-supporting bows of the system include a pair of ends on opposite sides of the trailer, and a pair of the tensioning and locking mechanisms 184 may be operatively associated with the two ends of the endmost bow 25 for jointly tensioning and locking both sides of the bow. In the present drawings, only one vertically extending side portion of the end bow 25 is shown in conjunction with one of the mechanisms 184, but the other side portion of the end bow would have another identical mechanism 184 operatively associated therewith, and another of the rails 22 would be on the opposite side of the trailer. Each of the mechanisms 184 may be operated independently of the other mechanism.

Although tensioning and locking mechanism 184 may be a manual device, as shown, it could alternatively or additionally be driven by a motor (not shown). It is also within the scope of the present invention that other devices may be used in place of device 184, including a ratcheting winch strap, a rack and pinion with a ratchet gear, a ratchet rack (without a pinion gear), an over-center cam lock, a pneumatic or hydraulic piston, an electric motor which winds/unwinds a cable, etc. In addition, the end bow 25 and its supporting carriage may be constructed larger and stronger than the intermediate bows 25 and intermediate carriages for additional strength at the ends and corners of the system. Further, while the mechanism 184 is described for use in relation to a rolling-type guide assembly, it may also be used in relation to a sliding-type guide assembly or other types of guide assemblies.

Headboard and End Cap

Flatbed trailers typically include a headboard such as headboard 26 shown in FIG. 1. According to the present invention the headboard 26 may be extended to provide a convenient place to stow components of the cover system when not deployed. As depicted, the headboard extension extends longitudinally and rearwardly of the trailer. The extension may include a rigid sidewall attached to each side of the headboard, and an arching rigid span extending between the two sidewalls. Optionally, the headboard may be provided with a door (not shown) to allow a user to enter the storage area thereof.

Again, an important aspect of the invention is the conveniently removable nature of components of the cover system by persons standing adjacent to the trailer, e.g., the stakes 16, panels 18 and rails 22 or 22', as well as the tarp cover 24 and bows 25 if the guide assemblies 132, 134 are not used for movably supporting the tarp cover.

Figure 20:
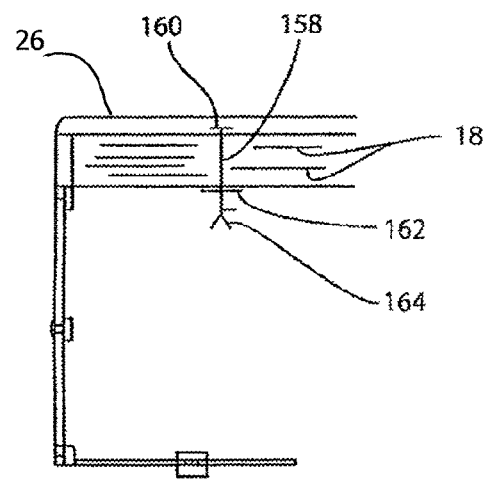
FIG. 20 is an end plan view of a front portion of the flatbed trailer and a headboard according to an embodiment of the invention.

As discussed above, the rails 22, 22' may be detached by releasing the rail locking mechanism 96 then removed and stored on the trailer. Depending on length(s) of the rails, they may be stored at various positions on the trailer, including within the space enclosed by the headboard and/or a space defined at a lower portion of the trailer, e.g., adjacent a longitudinally extending frame of the trailer. According to another aspect of the invention, the panels 18 and stakes 16 may be conveniently stored within the headboard, using an arrangement as shown in FIG. 20. Particularly, half of the panels 18 may be stored face-to-face on one side of the headboard, the other half of the panels may be similarly stored on the other side of the headboard, and then an appropriate mechanism is used to maintain the panels in such storage positions. As depicted, such a mechanism may include a rod 158 having one end secured/securable to the headboard, e.g., the end is hooked and is pivotally associated with a ring or bar 160 fixed to the headboard, the other end of the rod may be threaded and a large flat washer 162 and a wing nut 164 placed over the threaded end and manipulated until the panels are securely clamped between the washer 162 and the headboard. The stakes 16 may also be disposed in a vertical, side-to-side arrangement between the panels and the headboard 26, and commonly clamped with the panels between the washer 162 and the headboard. If the bows 25 are removed, they may also be conveniently stored within the headboard, e.g., within the arched upper portion thereof using appropriate securing mechanism(s).

As depicted, the end cap 28 may also be included with the cover system and may be substantially arch-shaped, and removably attached to the upper ends of the rear stakes and/or to the rear, transversely extending rail 22. For example, an attachment hole may be formed into the rail on both sides of the end cap and bracket(s) may be provided for each side of the end cap that can be attached by a bolt or other fastener to the attachment holes in the rails.

Referring to FIGS. 28-32A, there is shown another embodiment of a cover system cover according to the present invention mounted on a flatbed trailer 12 which is different from the system 10 of FIG. 1 relative to the structure of the headboard 226 and rear end structure thereof, and because the system does not include upper rails such as rails 22 in FIG. 1 or a retractable tarp cover, but instead includes bows having ends which are directly supported by the upper end of stakes 216 and a tarp cover which is provided over the bows and secured to the stakes without the use of conventional elastic straps and rope. The system without the tarp cover and bows is shown mounted on a truck trailer in FIG. 28.

As shown best in FIG. 31, the headboard 226 may include an extension 228' extending a short distance, e.g., one or two feet, rearwardly from the headboard at both sides thereof. The headboard extension 228' provides extra space for storing or securing components of the cover system when the components are not being used in operative positions thereof. Also, the extension may include a panel-retaining slot 227 on either side thereof for receiving and retaining a front edge of the front panels 218 at the sides of the trailer.

Figure 32:
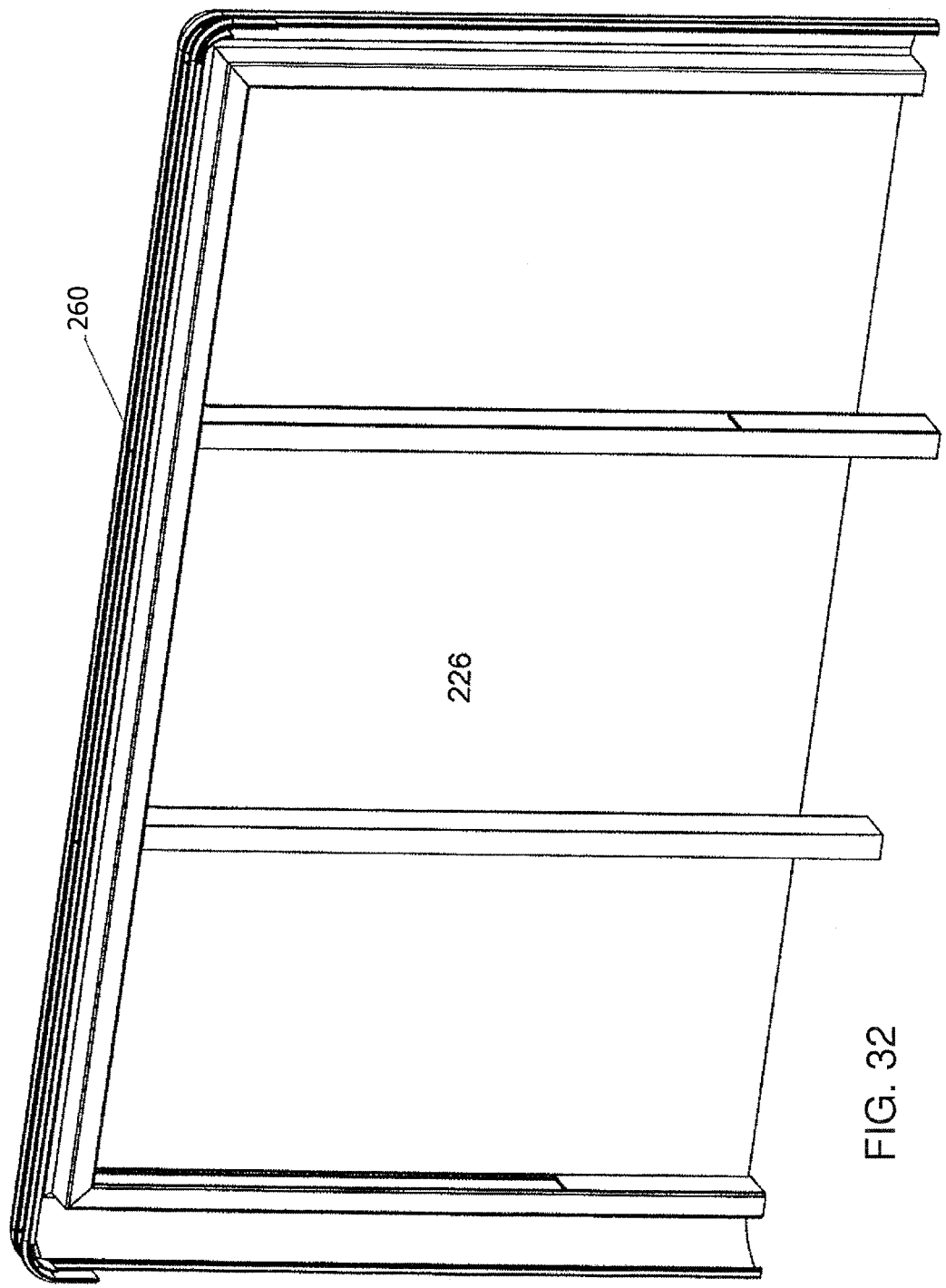
FIG. 32 is a perspective view of a headboard and tarp cover connecting mechanism of the cover system of FIG. 28.
Figure 32A:
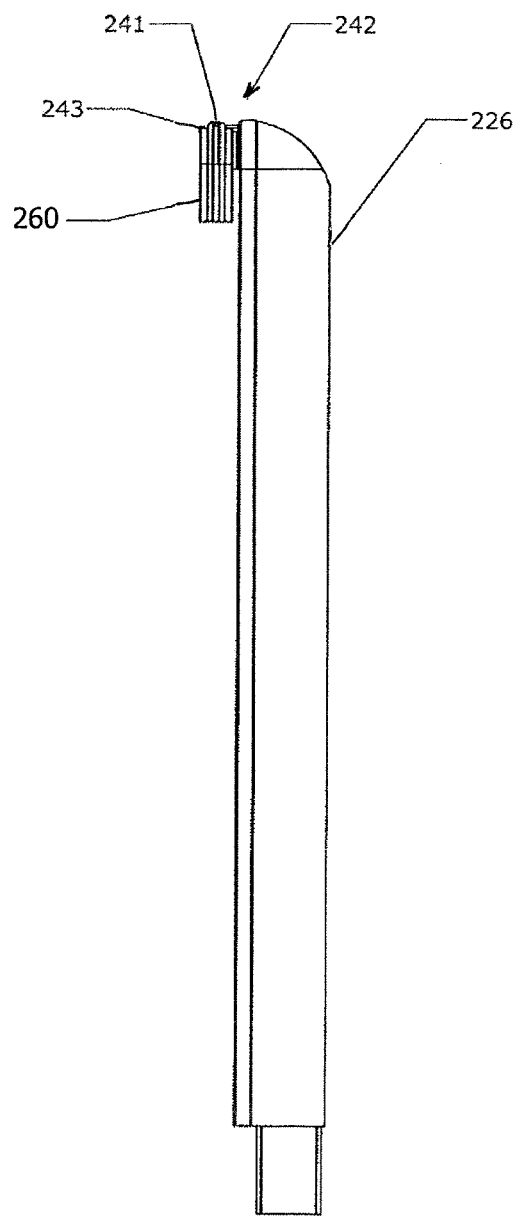
FIG. 32A is a side view of the connecting mechanism of FIG. 32.

With reference to FIGS. 32, 32A there is shown a structure for connecting a tarp cover, not shown but substantially corresponding to the cover 24, to the headboard 226. The structure may include a tarp edge securing member 260 and a latch mechanism 242 for securing the securing member to the headboard. The securing member may comprise an aluminum extrusion having an elongate central portion which extends horizontally along the rear edge of the headboard 226 and end portions which curve and extend downwardly a short distance from the central portion, and wherein the central and end portions have a groove 241 defined therein. The groove is adapted to receive an enlarged edge of the tarp cover similar to the groove 98 discussed in relation to FIG. 19 above, although the groove 241 has a single lobe for receiving a single edge of the tarp cover. Similar to retaining groove 98 in FIG. 19, the groove 241 slidingly receives and retains an enlarged front edge of the tarp cover such that the edge will not be displaced from the groove during normal operation of the system due to forces in the longitudinal direction of the trailer. Of course, the tarp edge may be intentionally slid out of the groove 241 for repair or any other reason if desired. The latch mechanism 242 may include a projecting member that extends beneath the securing member 260 and has a curved end 243 that is shaped to securely receive the rear edge of the securing member. The projecting member may be movable and latchable relative to the headboard such that an operator can readily secure and detach the tarp edge securing member relative to the headboard by manipulating the latch mechanism. A plurality of the latch mechanisms 242 may be used to collectively secure the tarp edge securing member 260.

Figure 33:
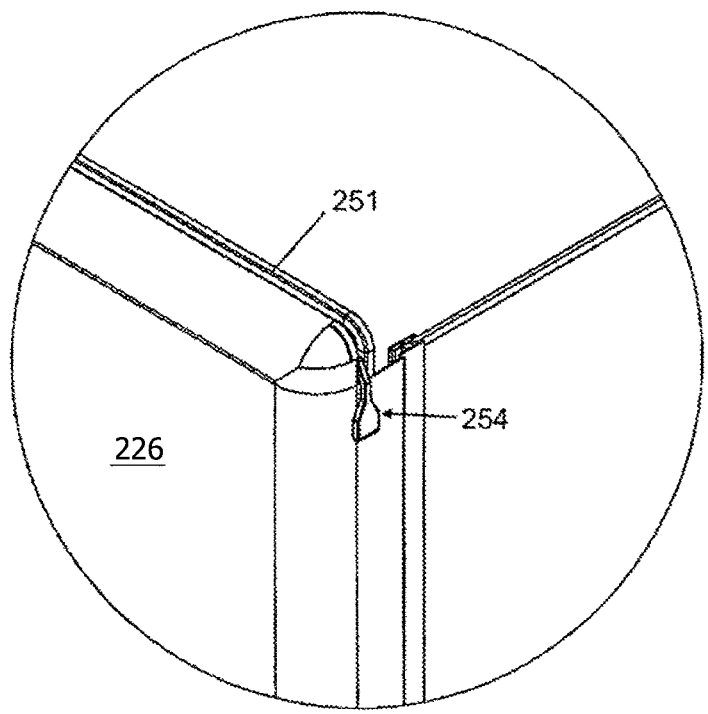
FIG. 33 is a perspective view of another embodiment of a latching mechanism for securing a front portion of the tarp cover to a trailer headboard.
Figure 33A:
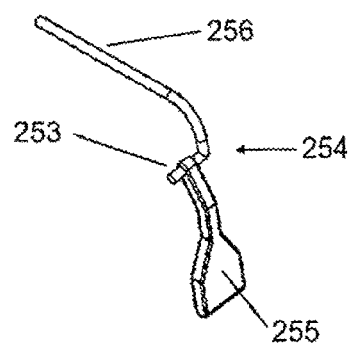
FIG. 33A is a perspective view of the latch in the mechanism of FIG. 33.

An alternative mechanism for securing the front end of the tarp cover to the headboard is shown in FIGS. 33, 33A. In this embodiment, the headboard 226 has a recess 251 formed near a rear end thereof, while the front edge of the tarp cover (not shown in this figure) may be enlarged by enclosing a piece of rope or tubing therein and is adapted to be received in the recess 251. Further, opposite sides of the tarp cover 20 have pockets formed therein which hang down laterally over the opposite sides of the headboard, such as the pockets 222 shown in FIGS. 24, 24A, 24B and latch mechanisms 254 are provided at opposite sides of the headboard which may be manipulated from inside of the headboard to operatively engage the pockets and retain them closely to the sides of the headboard, and thereby also securely retain the front edge of the tarp cover in the recess 251. Each latch mechanism may include a pivot shaft 253 which extends through the recess 251 and is fixed to the headboard, a pocket-gripping member 255 connected to the pivot shaft and extending outwardly of the headboard, and a handle 256 also connected to the pivot shaft and extending inwardly of the headboard. In use, a pocket of the tarp cover is disposed over the corresponding pocket-gripping member 255, the handle is pivoted upwardly, which causes the pocket-gripping member 255 to pivot downwardly together with the pocket closely against the side of the headboard. This process is then repeated for the latch mechanism on the other side of the trailer, which draws the front edge of the tarp cover laterally and downward at the opposite sides of the trailer. Thus, the enlarged edge of the tarp cover is securely retained in the recess 251, and the opposite sides of the front edge of the side cover are securely retained against the sides of the headboard. This makes the front portion of the tarp cover aerodynamic relative to the headboard, and also gives the cover system an aesthetic appearance. As with the latches shown in FIGS. 23-25, the latch mechanisms 254 which are at the rearmost and/or front most positions at the two sides of the trailer, may be constructed with an off-axis pivot axis such that tension will be applied to the tarp when the latch mechanisms are closed. The latch mechanism may also have a locking device to hold the mechanism in the operative latched position thereof. Also, the headboard and the front-most bow may be somewhat smaller in height than the rest of the bows so that the front end of the tarp cover tapers downwardly to the headboard for further improved aerodynamics.

As an alternative to securing the front edge of the tarp cover in the slot 251, a clamping mechanism (not shown) may be provided which securely clamps an enlarged front edge of the tarp cover between a rear upper surface of the headboard and a movable member which can be locked in a clamping position adjacent the headboard with the tarp edge secured therebetween. Such clamping mechanism could also be used together with the latch mechanisms 254.

Figure 29A:
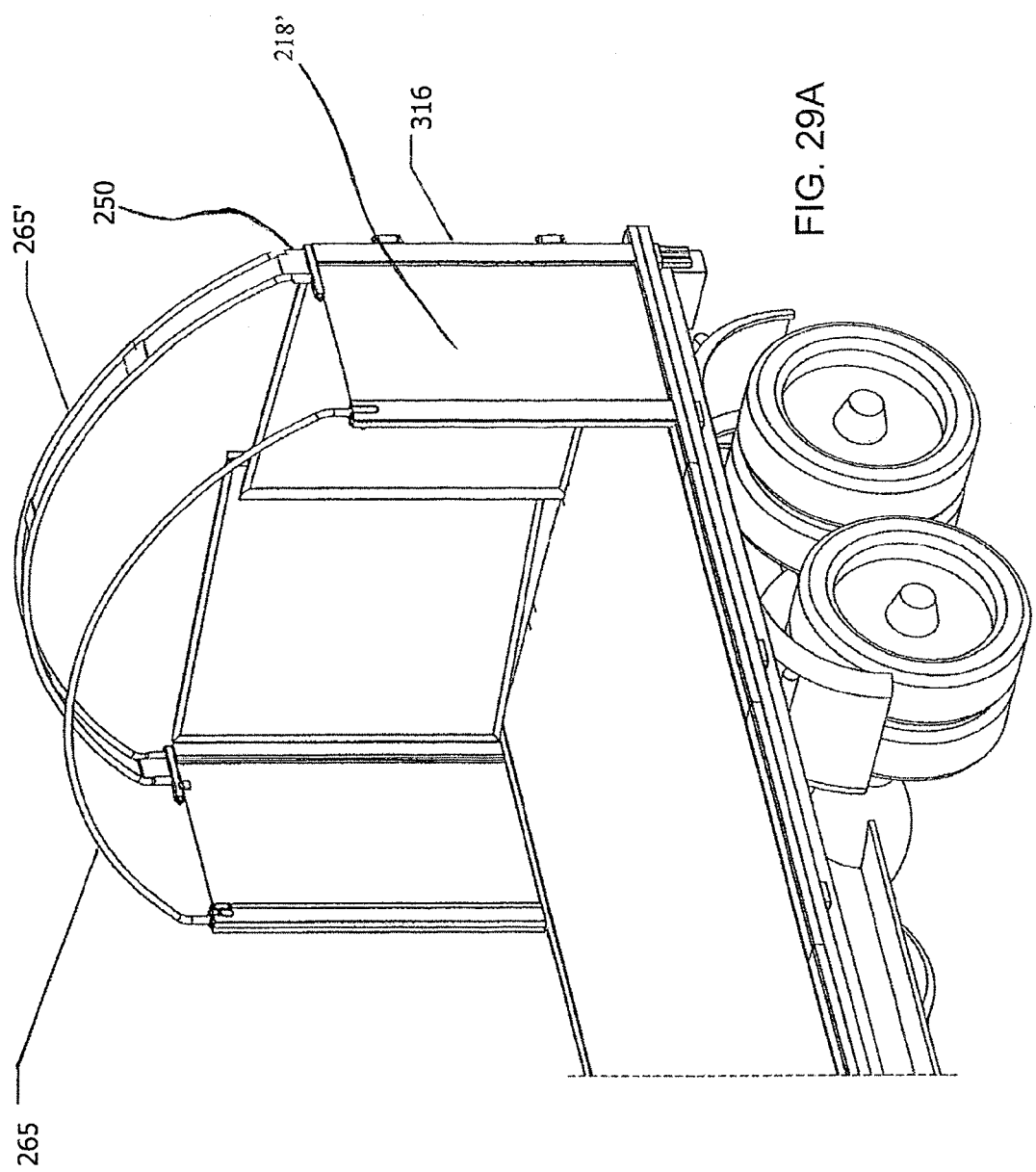
FIG. 29A is a perspective view of a rear portion of the cover system of FIG. 28.
Figure 29B:
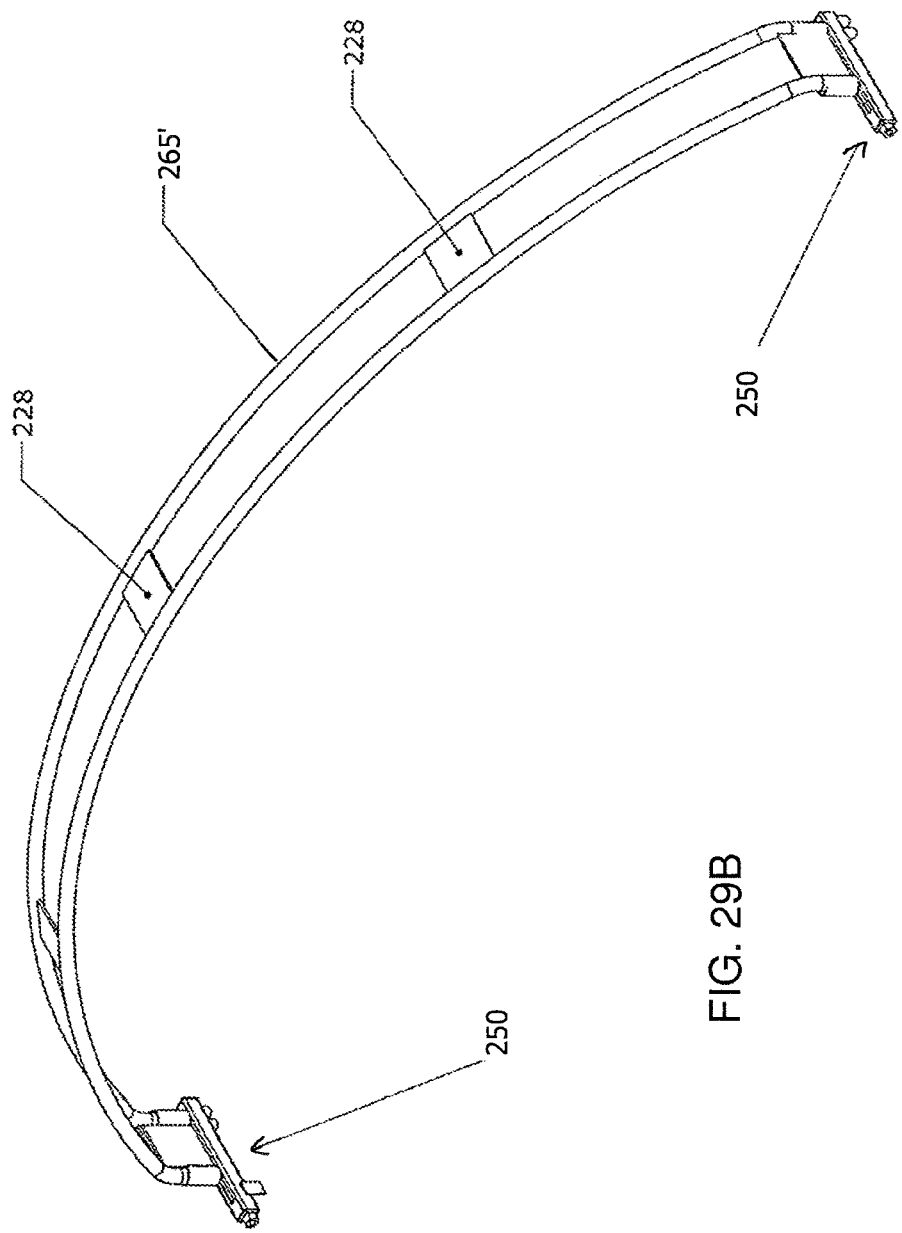
FIG. 29B is a perspective view of a rearmost bow of FIG. 29A.
Figure 29C:
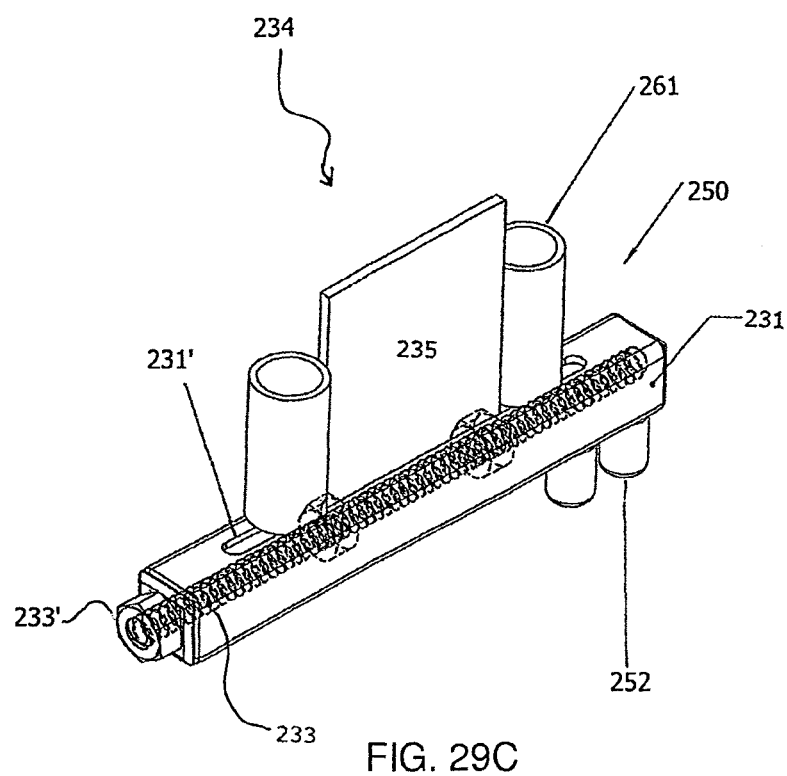
FIG. 29C is a perspective view of a tarp cover tensioning mechanism of the cover system of FIG. 28.
Figure 29D:
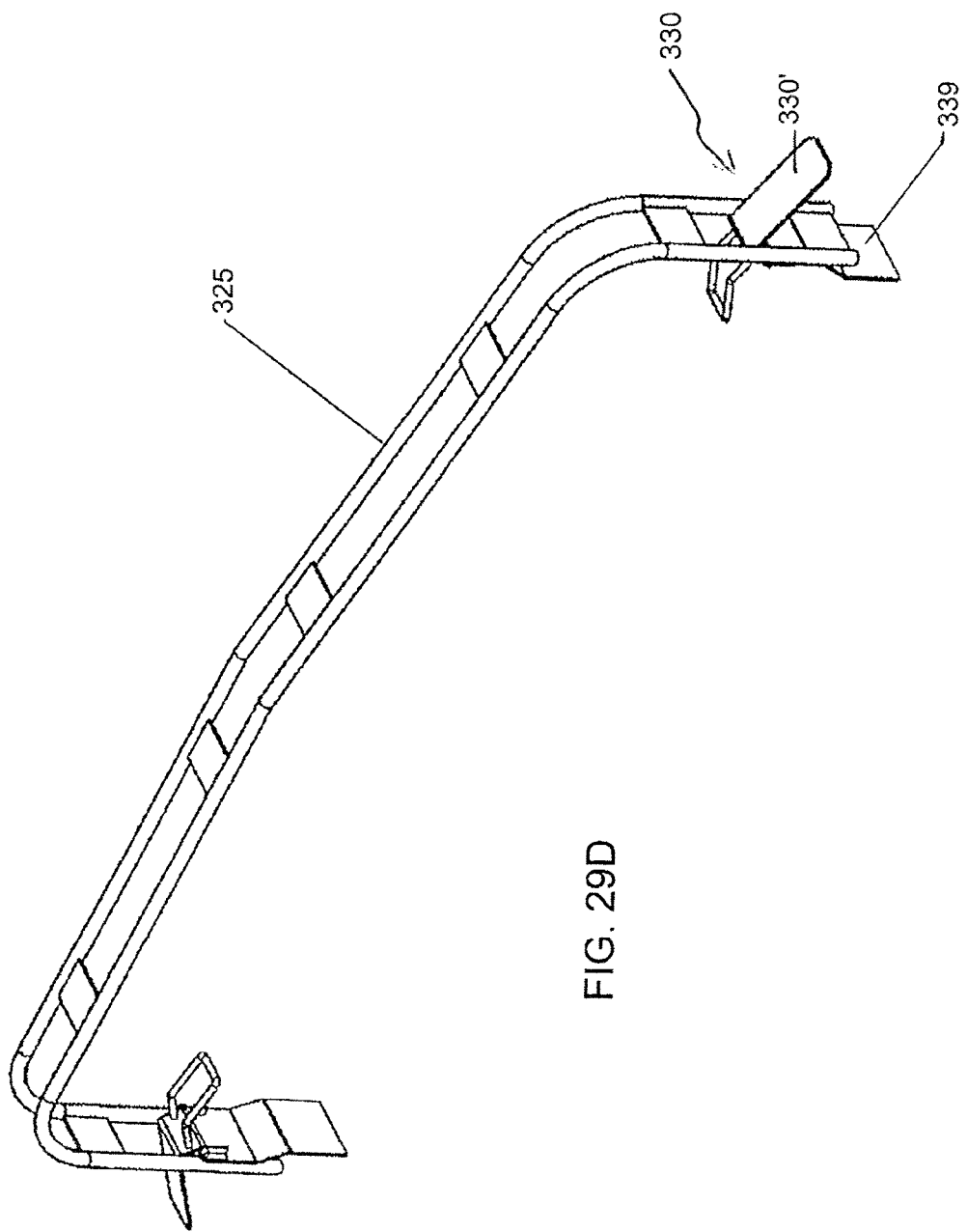
FIG. 29D is a perspective view of a rear-most bow according to an embodiment of the present invention.

Referring to FIGS. 29A-29C, the rear portion of the cover system may include: an enhanced rearmost bow 265', brace plates 218' of aluminum or other appropriate material connected between the rearmost bow 265' and the next adjacent bow 265, and tensioning mechanisms 250 operatively connecting the rearmost bow 265' to the rear corner stakes 316. The rearmost bow 265 may include a pair of individual bows 265 coupled together with connectors 228 formed of metal such as steel or aluminum. The brace plates 218' may be detachably or permanently connected to the endmost and next adjacent stakes 316 and, as previously discussed, the rearmost stake may be formed with enhanced strength and rigidity. The tensioning mechanism 230 may include housing 231, a screw shaft 233 operatively disposed in the housing for rotation relative thereto, and a bow carrier 234 which operatively interconnects the ends of the rearmost bow 225' to the screw shaft 233 for movement relative thereto. The housing 231 may be formed of steel, aluminum or other appropriate materials and may include one or more insert posts 252 extending from a rear bottom portion thereof that are adapted to be operatively received within appropriately sized openings formed in the upper end of the rearmost stake 316 or in a cap provided in the upper end of the stake, as well as an elongate opening 231' in an upper surface thereof. The screw shaft 233 may be formed of hardened steel or other appropriate materials, and may include a head portion 233' projecting from one end of the housing such that an operator may readily rotate the shaft 233 by manipulating a socket or wrench relative to the head portion 233'. The bow carrier 234 may include a support plate 235 which extends through the opening 231' and has threaded projections extending from a lower surface thereof and which operatively engage the screw shaft 233. The carrier 234 may also include receivers 261 which securely receive the ends of the rearmost bow 265'. With such structure, when the shaft is rotated in one direction the carrier 234 moves rearwardly relative to the housing 231 thereby tensioning a tarp cover (not shown) supported by and connected to the bows, and when the shaft is rotated in the opposite direction, the carrier moves forwardly relative to the housing 231 to relieve tension on the tarp cover. The provision of the tensioning mechanism is very advantageous for achieving better aerodynamics, appearance and longevity for the cover system.

Figure 29E:
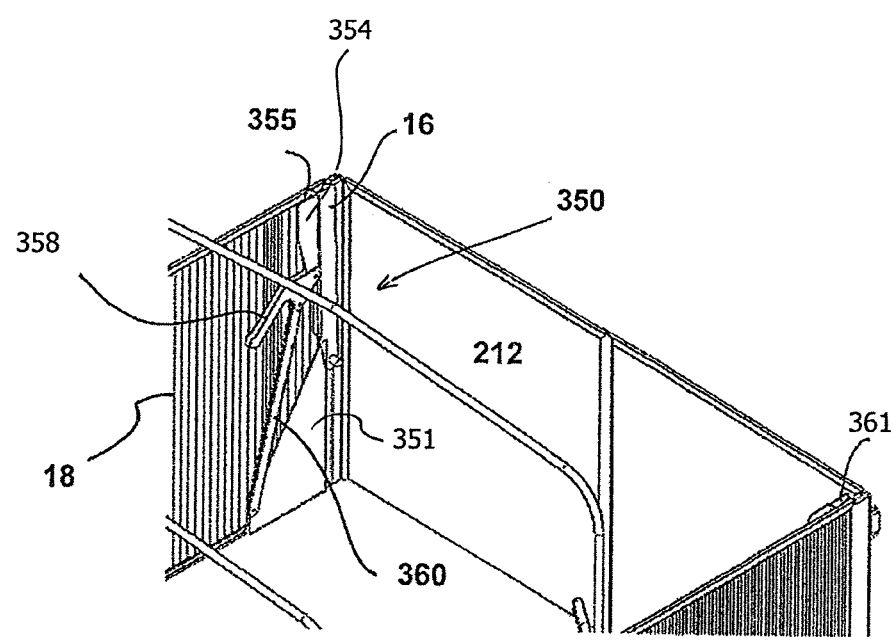
FIG. 29E is a perspective view of another embodiment of a tarp cover tensioning mechanism according to the present invention, the mechanism being mounted at the rear end of a trailer.
Figure 29F:
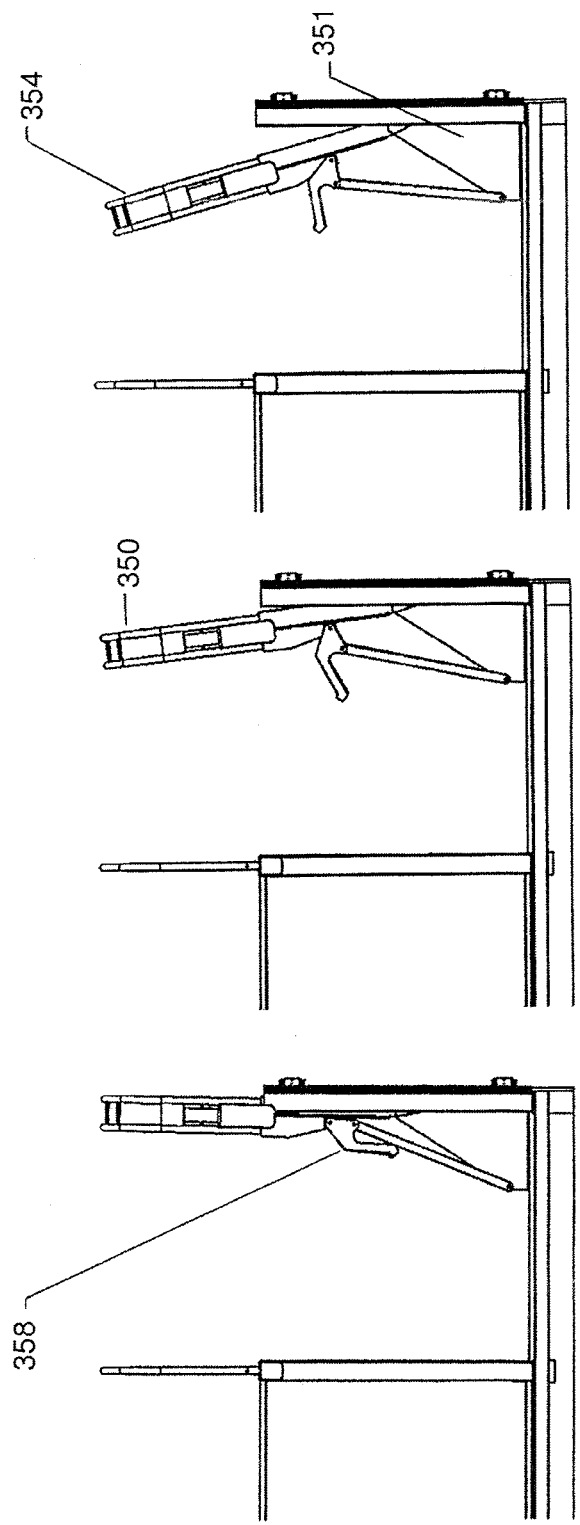
FIG. 29F is a view showing operation of the tensioning mechanism of FIG. 29E.

Referring to FIGS. 29D-29F there is shown another embodiment of the rear portion of the cover system according to the invention including a different tensioning mechanism and a different rear-most bow than those shown in FIGS. 29A-29C. The rear-most bow 325 is shown in FIG. 29D and is different from the bow 265' in FIG. 29B in that it integrally includes pivoting latch mechanisms 330 at opposite ends thereof, as well as lower projecting members 339 at the opposite ends thereof which function together with the tensioning mechanisms 350 shown in FIGS. 29E, 29F, but does not integrally include a tensioning mechanism such as mechanism 250 shown in FIGS. 29B, 29C. Each of the latch mechanisms 330 is pivotally connected to one end of the bow 325, includes a securing member 330' at the outside of the bow which fits in a pocket formed in the tarp cover such as the pocket 222 described above, and a handle at the inside of the bow which can be manipulated by an operator for engaging and disengaging the latch mechanism. The latch mechanism may also include an appropriate locking device (not shown) for maintaining the locking mechanism in its operative, latched position, e.g., a spring-biased catch which engages an opening formed in the bow. While a pair of tensioning mechanism is used to support the opposite ends of the rear-most bow 325, the following discussion only discusses one mechanism but the structure of the other mechanism is the same.

As best shown in FIGS. 29E, 29F the tensioning mechanism 350 may be disposed at a lateral side of a trailer adjacent the rear-most stake 16 and a rear door 212. The tensioning mechanism may be an over-center cam type mechanism as shown, and may generally include a lower portion 351 which can be removably fixed to the trailer, e.g., at the lateral side of the trailer outwardly of the flatbed surface and inwardly of the rearmost stake 16, using appropriate fasteners such as bolts, an upper portion 354 having its lower end pivotally connected to the upper end of the lower portion and which includes an opening 355 at the upper end thereof into which the projecting member 339 of the latch mechanism 330 can be securely inserted, and a cam mechanism interconnecting the upper and lower portions. In such position at the lateral side of the trailer outwardly of the flatbed surface, the tensioning mechanism desirably does not interfere with loads supported on the flatbed surface. All portions of the tensioning mechanism may be constructed of steel, aluminum or other appropriate materials. The cam mechanism may include a handle 358 having one end pivotally connected to the upper portion 354 and an opposite free end which can be gripped and manipulated by an operator, and a link member 360 pivotally connected between an intermediate part of the handle and the lower portion 351. The lower portion may be adjustably fixed to the trailer such that its position on the trailer can be adjusted in the longitudinal direction of the trailer if desired, e.g., if the tarp cover stretches over time.

In operation, once the tensioning mechanism 350 is fixed to the trailer, the projecting member 339 of the latch mechanism 330 is inserted into the opening 355 at the upper end of the upper portion 354 and the operator pushes downwardly on the handle 358 such that the upper portion pivots rearwardly to a substantially upright position thereof, and whereby the rearmost bow 325 and the tarp cover secured to the bow are also pulled rearwardly tensioning the tarp cover. Again, tensioning of the tarp is very desirable because it makes the system more aerodynamic and watertight, and increases the durability of the tarp cover because it is not flapping in the wind etc. As shown in FIG. 29F the tensioning mechanism 350 permits a relatively large pivoting movement of the of the upper portion 354, e.g., through approximately 20-35°. The overall height of the tensioning mechanism 350 may be substantially he same as the rear-most stake 16, e.g., approximately four (4) feet, such that the actual pivoting distance through which the upper portion moves may be six-twelve inches or more, which can impose significant tension on the tarp cover. When the handle 358 is moved to its lowest position, corresponding to the substantially upright position of the upper portion 354 of the tensioning mechanism, the handle may lock into such position by the several forces acting thereon. For removing tension on the tarp cover the operator simply pulls upwardly on the handle 358.

For added stability at the rear end of the cover system a brace (not shown) may be provided which extends between the upper ends of the rear-most stakes 16 at the opposite sides of the trailer. For example, a elongate brace could be provided with downward projections at the opposite ends thereof which may be inserted into and securely retained in upper openings 361 formed at the upper ends of the stakes.

Figure 30B:
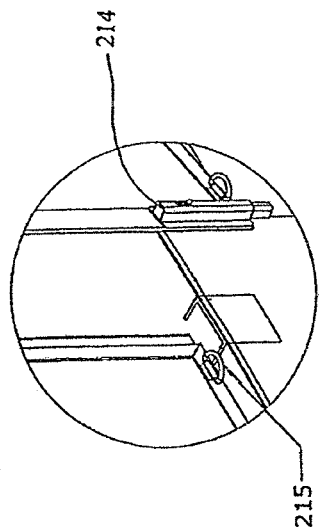
FIG. 30B is an enlarged view of a latch and a handle for the doors of FIG. 30A.
Figure 30A:
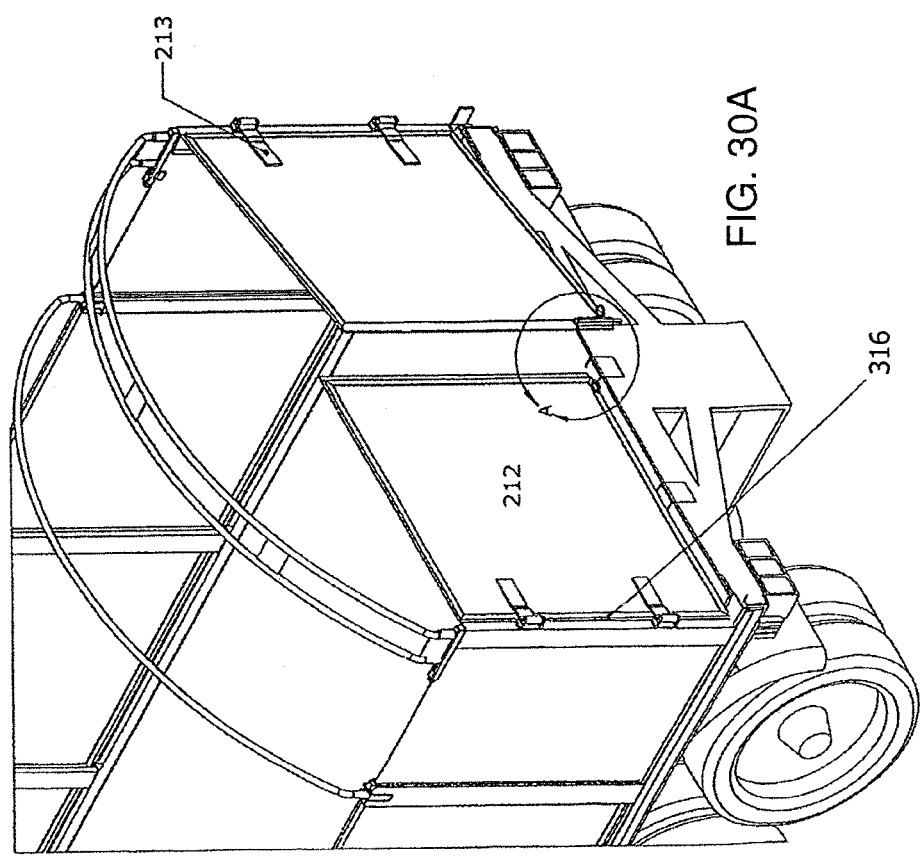
FIG. 30A is a perspective view of rear hinged doors of the cover system of FIG. 28.

Referring to FIGS. 30A, 30B the rear-hinged doors 212 facilitate loading and unloading of cargo at the rear end of the cover system. The doors may include hinges 213 detachably supporting the doors to rearmost stakes 316, a securing latch 214 which operatively latches to the end of the trailer, and handles 215 for facilitating manipulation of the doors, and may also be used for securing the doors in open positions thereof.

The present invention is not limited in its application to the details of construction and to the dispositions of the components set forth in the foregoing description or illustrated in the appended drawings in association with the present exemplary embodiments of the invention. The present invention is capable of other embodiments and of being practiced and carried out in various ways. In addition, it is to be understood that the phraseology and terminology employed herein are for the purposes of illustration and example, and should not be regarded as limiting.

As such, those skilled in the art will appreciate that the concepts, upon which this disclosure is based, may readily be utilized as a basis for the designing of other structures, methods and systems for carrying out the several purposes of the present invention. It is important, therefore, that the claims be regarded as including such equivalent constructions. For example, the stakes and retaining pockets according to the invention may be used to support panels other than on a trailer, e.g., they may be used to support clear plastic panels surrounding a hockey rink. In such application, the stakes may be disposed opposite to the disposition on a trailer, i.e., the surfaces of the clear plastic panels facing inwardly of the hockey rink would be substantially flush with the outer surface of the stake section facing inwardly of the rink.

Although the present invention has been described herein with respect to a number of specific illustrative embodiments, the foregoing description is intended to illustrate, rather than to limit the invention. Those skilled in the art will realize that many modifications of the preferred embodiment could be made which would be operable. All such modifications, which are within the scope of the claims, are intended to be within the scope and spirit of the present invention.

What we claim is:

1. A tarp cover securing device for use in a cover system for a substantially flat support surface on a vehicle including removable panels which extend substantially perpendicularly at sides of the support surface, a plurality of stakes for supporting the removable panels at the sides of the support surface, a tarp cover which extends over the support surface between the removable panels at opposite sides of the support surface, and a plurality of bows which are operatively connected to the stakes and support the tarp cover when the cover is extended over the support surface, the securing device comprising:

a plurality of latch members, each of which is configured to be pivotally connected to an upper end portion of one of said stakes or to an end of one of said bows, and which selectively secures an edge of the tarp cover closely adjacent to the bow end;

and a plurality of manually-actuatable locking mechanisms, with one of said locking mechanisms associated with each of said latch members, respectively, through which an operator can selectively lock selected ones of the latch members in an operative position securing the edge of the tarp cover closely adjacent to the bow end and selectively unlock the selected latch members for being pivotally moved from the operative position thereof about a substantially horizontal pivot axis without the use of a tool, wherein the latch members are disposed inwardly of the tarp cover;

wherein each of said latch members is configured so that one end of the latch member is manipulatable by an operator for pivoting the latch member relative to another component to which it is attached, and another end of the latch member is selectively insertable into and out of at least one receptacle selected from a recess formed in one of the stake members, and a pocket formed on an inner surface of the tarp cover;

and wherein the cover system is configured to permit an operator to pivotally open selected ones of said latch members while leaving other latch members in the operative position thereof, such that associated securing members are selectively withdrawn from said receptacle, thereby providing access to only part of said support surface.

2. The tarp cover securing device, according to claim 1, wherein each of the latch members is configured to be connected to an associated one of the bow ends, one end of each latch member is manipulatable by an operator for pivoting the latch member relative to the bow, and another end of each latch member is selectively insertable into and out of the pocket formed on the inner surface of the tarp cover.

3. The tarp cover securing device, according to claim 1, wherein ends of the bows are operatively connected to upper ends of the stakes, each latch member is configured to be connected to the upper end of one of the stakes, one end of each latch member is manipulatable by an operator for pivoting the latch member relative to the stake, and another end of each latch member is selectively insertable into and out of the pocket formed on the inner surface of the tarp cover.

4. The tarp cover securing device, according to claim 1, wherein each of the latch members is pivotable between the operative position thereof and a non-operative position thereof, and the locking mechanism includes a member that is configured to be manually disposed on a portion of the latch member to prevent the latch member from being pivoted.

5. The tarp cover securing device, according to claim 1, wherein the locking mechanism of each of said latch members includes a member that is insertable into an end of one said stake and a cam lever which the operator manipulates for selectively locking and unlocking the member relative to the end of said one stake.

6. The tarp cover securing device, according to claim 1, wherein each latch member of the securing device is selectively connectable to an upper end of one of the stakes, respectively, and includes a securing member configured to be inserted in a pocket formed on an inner surface of the tarp cover when the latch member is connected to the upper end of the one stake.

7. The tarp cover securing device, according to claim 6, wherein the securing device includes an opening through which a portion of the securing device is configured to receive the bow end therethrough.

8. The tarp cover securing device, according to claim 6, wherein the locking mechanism of each of said latch members selectively fixes the latch member to the upper end of an associated stake.

9. The tarp cover securing device, according to claim 8, wherein the locking mechanism of each of said latch members includes a spring-biased, pivotable lever having a pin provided at one end portion thereof and a handle at another end portion thereof and an opening provided in one said stake into which the pin may be selectively inserted for securing the latch member to an associated stake.

10. A tarp cover securing device for use in a cover system for a substantially flat support surface on a vehicle including removable panels which extend substantially perpendicularly at sides of the support surface, stakes for supporting the removable panels at the sides of the support surface, a tarp cover which extends over the support surface between the removable panels at opposite sides of the support surface, and bows which are operatively connected to the stakes and support the tarp cover when the cover is extended over the support surface, the securing device comprising a latch member which is configured to be connected near an end of one said bow and selectively secures an edge of the tarp cover closely adjacent to the bow end, wherein the latch member is disposed inwardly of the tarp cover, wherein the cover system further includes rails which extend substantially parallel to the support surface and interconnect upper ends of the stakes at the opposite sides of the support surface, ends of the bows are operatively connected to the upper ends of the stakes by the rails, the latch member is configured to be connected to one said rail, one end of the latch member is manipulatable by an operator for pivoting the latch member relative to the one said rail, and another end of the latch member is selectively insertable into and out of a pocket formed on an inner surface of the tarp cover.

* * * * *